(12) United States Patent
Dhadwal et al.

(10) Patent No.: US 12,360,541 B2
(45) Date of Patent: Jul. 15, 2025

(54) METHODS AND APPARATUS FOR HEATING AND SELF-HEATING OF BATTERIES AT LOW TEMPERATURES

(71) Applicant: Omnitek Partners LLC, Ronkonkoma, NY (US)

(72) Inventors: Harbans Dhadwal, Setauket, NY (US); Jahangir S Rastegar, Stony Brook, NY (US)

(73) Assignee: OMNITEK PARTNERS LLC, Ronkonkoma, NY (US)

( * ) Notice: Subject to any disclaimer, the term of this patent is extended or adjusted under 35 U.S.C. 154(b) by 0 days.

(21) Appl. No.: 17/468,310

(22) Filed: Sep. 7, 2021

(65) Prior Publication Data
US 2022/0113750 A1 Apr. 14, 2022

Related U.S. Application Data

(60) Provisional application No. 63/078,251, filed on Sep. 14, 2020.

(51) Int. Cl.
| | |
|---|---|
| *H01M 10/615* | (2014.01) |
| *G05D 23/20* | (2006.01) |
| *H01G 11/18* | (2013.01) |
| *H01M 10/48* | (2006.01) |
| *H01M 10/625* | (2014.01) |
| *H01M 10/63* | (2014.01) |
| *H01M 10/6571* | (2014.01) |

(52) U.S. Cl.
CPC .............. *G05D 23/20* (2013.01); *H01G 11/18* (2013.01); *H01M 10/486* (2013.01); *H01M 10/615* (2015.04); *H01M 10/625* (2015.04); *H01M 10/63* (2015.04); *H01M 10/6571* (2015.04); *H01M 2220/20* (2013.01)

(58) Field of Classification Search
CPC .............. H01M 10/615; H01M 10/63; H01M 10/6571; H01M 10/486
See application file for complete search history.

(56) References Cited

U.S. PATENT DOCUMENTS

| | | | |
|---|---|---|---|
| 2020/0176835 A1* | 6/2020 | Rastegar | H01M 10/63 |
| 2020/0403416 A1* | 12/2020 | Yen | H02J 7/007194 |
| 2022/0014137 A1* | 1/2022 | Lee | H01M 10/625 |

FOREIGN PATENT DOCUMENTS

TW I691142 B * 4/2020 .......... H01M 10/443

* cited by examiner

*Primary Examiner* — James Lee

(57) ABSTRACT

A heating circuit for an energy storage device having internal surface capacitance between inputs storing electric field energy between internal electrodes that are coupled to the inputs, with one of the internal electrodes coupled to one of the inputs having characteristics of a series coupled resistor and inductor to a voltage source. The heating circuit including: a power source couplable to one input, wherein the power source provides positive and negative input currents at the input, the positive input current flows into one of the inputs and the negative input current flows out of one of the inputs; and a controller for controlling the power source to provide alternating current between the positive and the negative input currents at one of the inputs at a frequency sufficient to effectively short the internal surface capacitance of the energy storage device to generate heat and raise a temperature of the electrolyte.

15 Claims, 61 Drawing Sheets

METHODS AND APPARATUS FOR HEATING AND SELF-HEATING OF BATTERIES AT LOW TEMPERATURES

CROSS-REFERENCE TO RELATED APPLICATION

This application claims the benefit of earlier U.S. Provisional Application No. 63/078,251, filed on Sep. 14, 2020, the entire contents thereof being incorporated herein by reference.

BACKGROUND

1. Field

The present invention relates generally to energy storage devices, such as supercapacitors and lithium ion batteries, for fast charging and operation at high rate at very low temperatures, more particularly to methods and apparatus for fast charging of energy storage devices, such as supercapacitors and lithium ion batteries and to supercapacitors and lithium ion batteries that are designed to be charged at high rates as well as for high discharge rate operation at very low temperatures. Herein, by very low temperature it is meant the temperatures at which an electrolyte in an interior of such energy storage devices at least hinders charging, such as at temperatures where the electrolyte becomes nearly solid in super-capacitors, usually around −45 degrees C., but as low as −54 degrees C. or below.

2. Prior Art

A supercapacitor (SC), sometimes referred to as an ultra-capacitor, and formerly referred to as an electric double-layer capacitor (EDLC) is a high-capacity electrochemical capacitor with capacitance values up to 10,000 Farads at 1.2 volt that bridge the gap between electrolytic capacitors and rechargeable batteries (each of which are collectively referred to herein as a "supercapacitor"). Such supercapacitors typically store 10 to 100 times more energy per unit volume or mass than electrolytic capacitors, can accept and deliver charge much faster than batteries, and tolerate many more charge and discharge cycles than rechargeable batteries. They are however around 10 times larger than conventional batteries for a given charge. The construction and properties of many different types of supercapacitors are well known in the art.

In certain applications, such as in munitions, supercapacitors may be required to be charged as well as discharge at very low temperatures, sometimes as low as −40 to −65 degrees F. or even lower. Similar very low charging and operating temperatures may also be faced in many commercial applications, such is in supercapacitors used in vehicles for direct powering or for regeneration circuits used during braking. At such very low temperatures, the supercapacitor electrolyte becomes solid, thereby hampering or preventing ion transportation within the electrolyte. As a result, the supercapacitor rate of charge and discharge is greatly diminished. As a result, the user may be unable to charge or when the temperature levels are not very low and the supercapacitor is not provided with enough thermal insulation protection, must wait a relatively long time to charge the supercapacitor. It is appreciated by those skilled in the art that this is the case for all currently available supercapacitors.

Similarly, charging methods and devices for currently available rechargeable batteries, such as lithium ion batteries, cannot be used for charging these batteries at low temperatures. Although applicable to any rechargeable battery having an electrolyte interior, reference below will be made to lithium ion batteries by way of example. However, such low temperatures with regard to lithium ion batteries can be much higher than that discussed above with regard to supercapacitors, such as close to zero degrees C., and still hinder charging, damage the battery and even cause fire hazard because the components of a lithium ion battery are highly sensitive to temperature. At low temperature, the "viscous" resistance of the electrolyte to the movement of lithium ions increases. This increase in resistance causes higher losses during charging and discharging of the lithium ion battery. Low temperature charging passes (relatively high) currents through the components representing the battery electrical-chemical reactions, and is well known to result in so-called lithium plating, which is essentially irreversible, prevents battery charging, and permanently damages the battery.

SUMMARY

It is therefore highly desirable to have methods and apparatus for rapid charging of energy storage devices, such as supercapacitors and lithium ion batteries available for storing electrical energy in military products such as munitions and in commercial products such as in electric and hybrid vehicles, in vehicle regeneration circuitry and power tools, in which the charging rate is critical for achieving the required system performance.

It is also highly desirable to have energy storage devices, such as supercapacitors and lithium ion batteries, with the capability of being charged and discharged at significantly faster rates at the aforementioned very low temperatures.

It is also highly desirable that the energy storage devices, such as supercapacitors and lithium ion batteries, could be readily implemented in almost any of the currently available designs to minimize the amount of changes and modifications that have to be done to current manufacturing processes for their production.

A need therefore exists for the development of methods and apparatus for rapid charging and discharging of energy storage devices, such as supercapacitors and lithium ion batteries, of different types and designs at very low temperatures of sometimes −65 to −45 degrees F. or sometimes even lower.

There is also a need for methods to design and construct energy storage devices, such as supercapacitors and lithium ion batteries, which can be charged and discharged significantly faster than is currently possible at very low temperatures.

Such methods and apparatus for rapid charging and discharging of currently available energy storage devices, such as supercapacitors and lithium ion batteries, of different types and designs at very low temperatures of sometimes −65 to −45 degrees F. or sometimes even lower will allow munitions and vehicles or other devices to be charged and/or discharged significantly faster and readied for operation. In commercial applications, such as vehicles in which supercapacitors and/or lithium ion batteries are used, such methods and apparatus for rapid charging the same at very low temperatures of sometimes −65 to −45 degrees F. or sometimes even lower will allow the operation of the vehicles and the like at such very low temperatures.

Such methods to design and construct energy storage devices, such as supercapacitors and lithium ion batteries, that can be charged and discharged significantly faster than is possible will allow munitions and/or vehicles using the same to be charged significantly faster and readied for operation at very low temperatures of sometimes −65 to −45 degrees F. or sometimes even lower.

Herein are described novel methods and apparatus for rapid charging and discharging of currently available energy storage devices, such as supercapacitors and lithium ion batteries, of various types and designs at very low temperatures of sometimes −65 to −45 degrees F. or sometimes even lower.

Herein are also described novel methods and apparatus for the design and construction of energy storage devices, such as supercapacitors and lithium ion batteries, that are designed with the capability of being charged and discharged very rapidly at very low temperatures of sometimes −65 to −45 degrees F. or sometimes even lower.

In addition, herein are also described methods and apparatus for rapid charging and/or discharging of the energy storage devices, such as supercapacitors and lithium ion batteries, that are designed with the capability of being charged and discharged very rapidly at very low temperatures of sometimes −65 to −45 degrees F. or sometimes even lower.

Although the novel methods and apparatus are described with regard to very low temperatures as low as −65, such methods and apparatus are applicable in all low temperature environments, including slightly below 0 degrees C., to provide increased charging and discharging performance.

Accordingly, a method is provided for heating an energy storage device having a core with an electrolyte. The method comprising: providing the energy storage device having inputs and characteristics of a capacitance across the electrolyte and the core and internal surface capacitance between the inputs which can store electric field energy between internal electrodes of the energy storage device that are coupled to the inputs; switching between an input voltage and a grounding input provided to one of the inputs at a frequency sufficient to effectively short the internal surface capacitance of the energy storage device to generate heat and raise a temperature of the electrolyte; and discontinuing the switching when the temperature of the electrolyte is above a predetermined temperature that is considered sufficient to increase a charging efficiency of the energy storage device.

The method can comprise providing the input voltage through a first switch and providing the grounding input through a second switch, wherein the switching comprises simultaneously coupling the input voltage to the one input through operation of the first switch and decoupling the grounding input from the one input through operation of the second switch during a first time interval and thereafter, simultaneously decoupling the input voltage from the one input through operation of the first switch and coupling the grounding input to the one input during a second time interval through operation of the second switch, wherein the first interval and the second interval are subsequently repeated at the frequency sufficient to effectively short the internal surface capacitance of the energy storage device. The first switch can be a normally closed switch that couples the input voltage to the one input when a first switching voltage is below a first predetermined voltage and/or the second switch can be a normally open switch that decouples the grounding voltage from the one input when a second switching voltage is below a second predetermined voltage. The providing of the grounding input can comprise coupling the one input to a circuit ground through the second switch and a sink resistor. The method can comprise selecting the input voltage and a resistance of the sink resistor such that nearly the same charge of the energy storage device occurs during the first time interval as discharge from the energy storage device occurs during the second time interval.

The predetermined temperature can be a first predetermined temperature, where the method can comprise initiating the switching when the temperature of the electrolyte is below a second predetermined temperature that is considered to at least reduce the charging efficiency of the energy storage device, wherein the second predetermined temperature is a lower temperature than the first predetermined temperature.

The method can comprise obtaining at least one of a measurement and an approximation of the temperature of the electrolyte. The obtaining can comprise directly measuring the temperature of the electrolyte with a temperature sensor positioned at one or more of the electrolyte and a surface of the energy storage device. The obtaining can comprise: applying an initial charging input to the energy storage device, measuring a rate of charging using the initial charging input, and determining a charging rate at the initial charging input, wherein if a rate of charging is determined to be less than a predetermined charging rate, the electrolyte temperature is approximated as being less than the predetermined temperature.

The method can comprise providing a controller for controlling the switching and the discontinuing. The method can comprise obtaining by the controller at least one of a measurement and an approximation of the temperature of the electrolyte. The obtaining can comprise directly measuring the temperature of the electrolyte with a temperature sensor coupled to the controller and positioned at one or more of the electrolyte and a surface of the energy storage device. The obtaining can be performed periodically.

The method can comprise producing the input voltage from an AC source provided through an AC to DC converter.

The method can comprise: obtaining an energy storage type for the energy storage device; and retrieving from a look-up table the predetermined temperature that corresponds to the obtained energy storage type, wherein the look-up table correlates different energy storage types with corresponding predetermined temperatures.

The method can comprise coupling the input voltage to the one input to charge the energy storage device while the temperature of the electrolyte is above the predetermined temperature.

The energy storage device can be a lithium ion battery or a supercapacitor.

Also provided is a method for charging an energy storage device having a core with an electrolyte. The method comprising: providing the energy storage device having inputs and characteristics of a capacitance across the electrolyte and the core and internal surface capacitance between the inputs which can store electric field energy between internal electrodes of the energy storage device that are coupled to the inputs; switching between an input voltage and a grounding input provided to one of the inputs at a frequency sufficient to effectively short the internal surface capacitance of the energy storage device to generate heat and raise a temperature of the electrolyte; periodically obtaining a measurement that correlates to the temperature of the electrolyte, wherein the switching is initiated when the measurement indicates that the temperature of the electrolyte is below a low temperature threshold that is considered to at least reduce the charging efficiency of the energy storage device, wherein the switching is discontinued when the measurement indicates that the temperature of the electrolyte is above a high temperature threshold that is considered sufficient to increase a charging efficiency of the energy storage device, and wherein the low temperature threshold is a lower temperature than the high temperature threshold; and providing the input voltage to the one input to charge the energy storage device while the measurement indicates that the temperature of the electrolyte is above the high temperature threshold.

The application of high frequency current direct heating battery core, mainly the electrolyte, allows the use of almost all currently available battery types as well as super-capacitors at temperatures as low as −60 degrees C. and even lower. High frequency current flow through a battery causes a corresponding high frequency oscillatory motion of the ions in the electrolyte, which generates heat, thereby increasing the electrolyte and the battery core temperature. Typically, the applied current frequency can range from a few hundred Hz to several MHz, depending on the battery type and chemistry. To prevent any damage to the battery and super-capacitor, the high frequency current that is passed through the battery and super-capacitor must be symmetric, i.e., have no or negligible net DC component.

Accordingly, methods and examples of their circuit implementation are described that are used to construct the aforementioned direct battery and super-capacitor heating devices for low temperatures that pass the desired high frequency current through the battery or super-capacitor while automatically keep the high frequency current symmetric with no or negligible DC component.

It is also highly desirable to have a simple and highly efficient device that can be used to keep batteries and super-capacitors at temperatures at which they can operate at their peak performance levels while the environmental temperature is below such temperatures. For example, in very cold environments, the batteries of a vehicle may be initially heated by externally provided power so that it could be charged or that the vehicle could become operational. However, when the vehicle begins to travel, external power is no longer available and the batteries may cool down below their full operational performance levels and even become nearly non-operational. In such conditions, it is highly desirable to provide a very efficient device that can heat the vehicle battery as needed from its own power (self-heating) so that it is kept operational at or close to peak performance levels.

It is also appreciated that vehicles, such as trucks or passenger cars, or tractors, snow removal and snow blower trucks, etc., are routinely parked for certain amount of time or even overnight outdoors at very low temperatures, particularly during the winter time. In such cases, external power sources are usually not available, and if their batteries are very cold, they may not be able to provide enough power to start their engine after several hours or overnight parking. In such cases, the operator has the choice of keeping the engine running while in parking at the cost of wasting a considerable amount of fuel and causing unnecessary environmental pollution or using heating blankets over the batteries and use the battery power to power the heating blankets. The former route is costly as well as an environmentally unsound and is banned in many states to run the engine idle. The latter solution is highly inefficient since most of the generated heat is lost to the environment and therefore can only be used for a relatively short periods of times and definitely not for overnight heating of the batteries.

It is appreciated that most heavy equipment such as trucks use large lead-acid batteries, which when cooled below −10 deg. C., they can only provide a fraction of their full room temperature power. For this reason, if such equipment must operate at temperature that may reach −20 to −30 deg. C. or lower, they may have to carry more batteries so that collectively could provide enough power to start their engine. It is, therefore, highly desirable for such vehicles to be provided with the means to efficiently and with minimal use of the battery power keep the vehicle batteries above certain temperature at which they could provide enough power to start the vehicle engine after a long periods of parking, such as overnight parking.

Such battery self-heating methods and apparatus are also highly desirable to be capable of operating while the vehicle engine is running so that the battery temperature would not drop below a predetermined threshold so that the battery stays at or close to its peak performance levels.

It is appreciated by those skilled in the art that numerous other systems can also use such self-heating capability to keep them fully operational at low temperatures.

Accordingly, methods and examples of their circuit implementation are described that are used to construct highly efficient and simple self-heating devices for batteries and super-capacitors.

BRIEF DESCRIPTION OF THE DRAWINGS

These and other features, aspects, and advantages of the apparatus of the present invention will become better understood with regard to the following description, appended claims, and accompanying drawings where:

DETAILED DESCRIPTION

All currently available supercapacitor types and designs exhibit internal resistance and inductance, which can be modeled as being in series. Both internal resistance and inductance of supercapacitors are relatively low. The inductance of supercapacitors is significantly higher for wound supercapacitors as compared to those that are flat and stacked in construction. The leakage current may be represented by a separate resistor in parallel with the capacitor. In general, the supercapacitor resistance may be ignored in short term operations. The supercapacitor inductance can also be ignored for low frequency operations.

Figure 1:
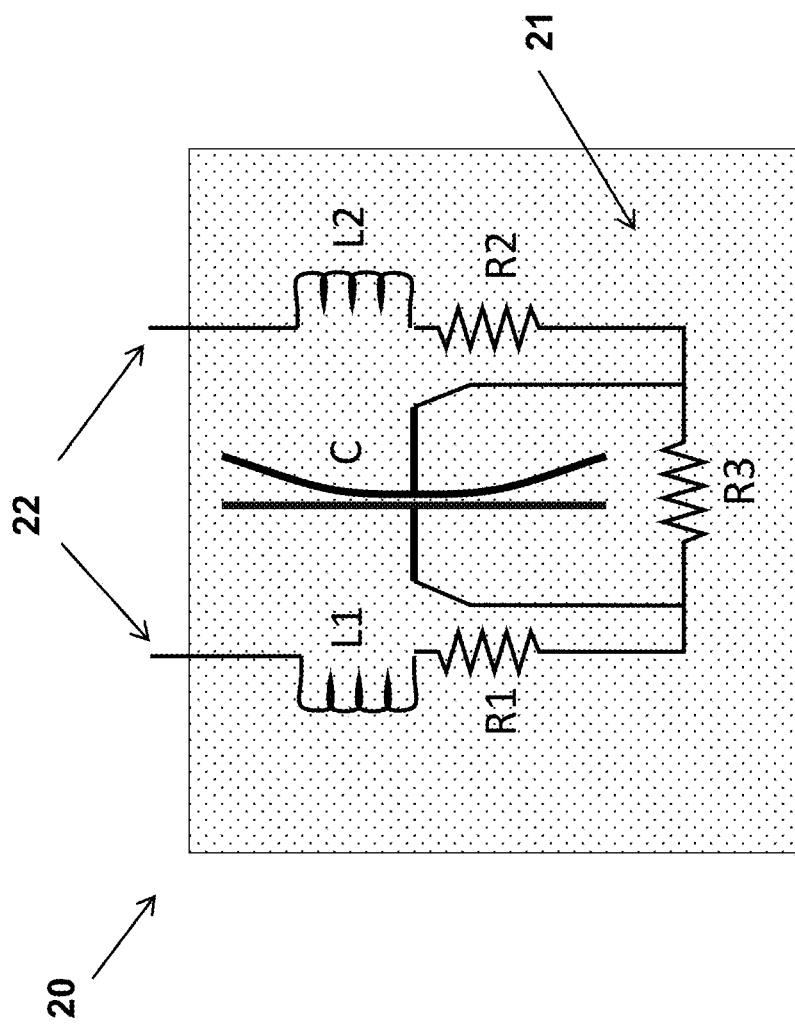
FIG. 1 is a schematic of a simplified supercapacitor shown with a lumped core with its equivalent lumped internal resistance and inductance elements.

In the schematic of FIG. 1, a simplified model of a supercapacitor 20 is shown with a lumped capacitor core 21 within which the aforementioned equivalent internal resistance and inductance are shown as two pairs of in-series resistors and inductors, which are connected to the supercapacitor capacitance C. In FIG. 1, the in-series resistor and inductor pairs are indicated by the resistances R1 and R2 and inductances L1 and L2. In most supercapacitors, the resistances of the resistors R1 and R2 are very low. In the present model, the pairs of lumped in-series resistors and inductors are connected on one end to the supercapacitor capacitance C and on the other end to the supercapacitor terminals 22. In FIG. 1, the internal resistance of the supercapacitor, which is the cause of leakage is modeled as a lumped resistor R3. In FIG. 1 and for the sake of simplicity and since the simplification does not affect the methods and apparatus for charging and discharging supercapacitors to be described, the electrical model of the supercapacitor is considered to be as shown in FIG. 1.

Figure 2:
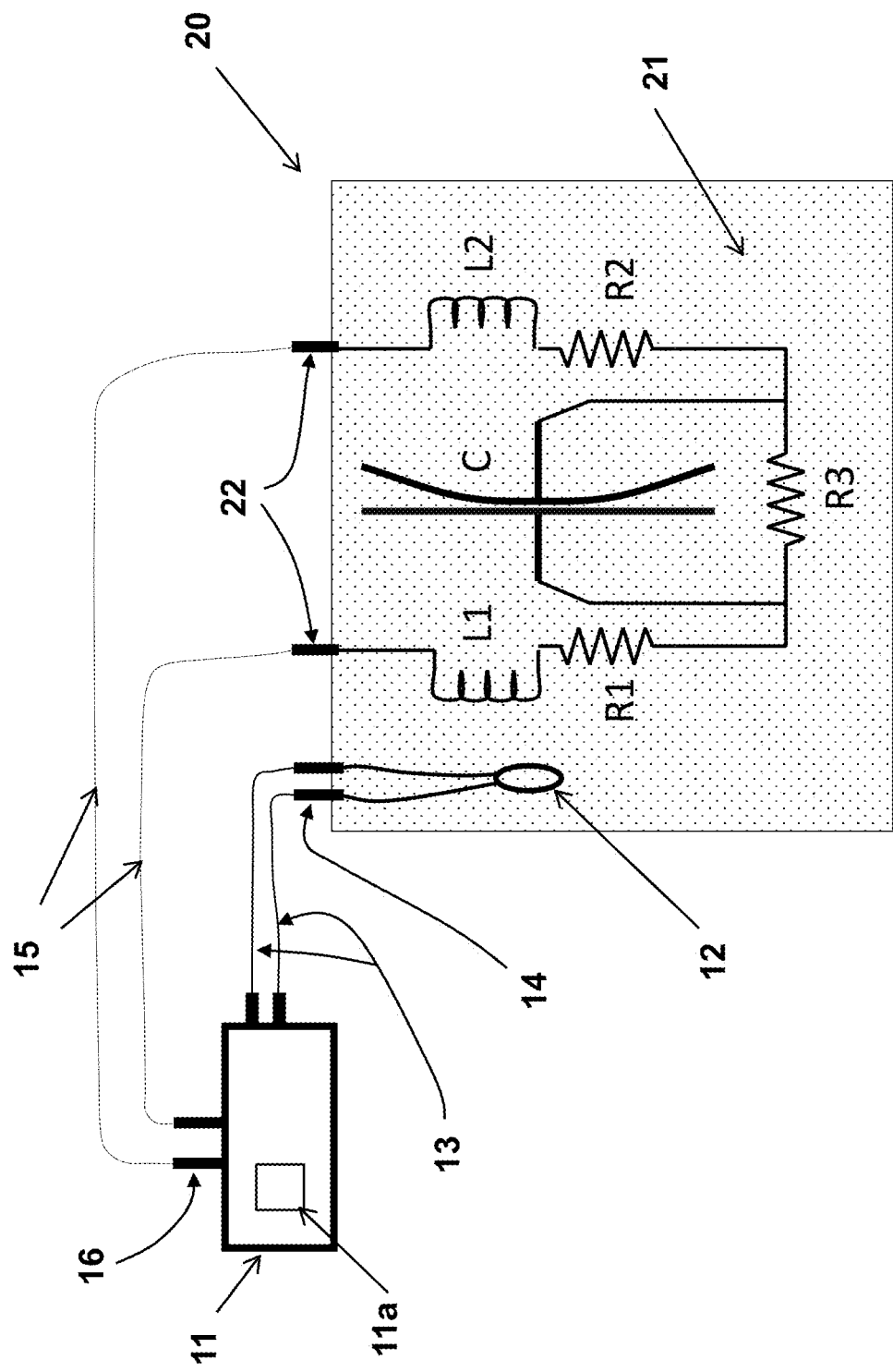
FIG. 2 illustrates a schematic of an embodiment of a supercapacitor rapid charging system for charging at very low temperatures and super capacitor to be charged at very low temperatures.
Figure 3:
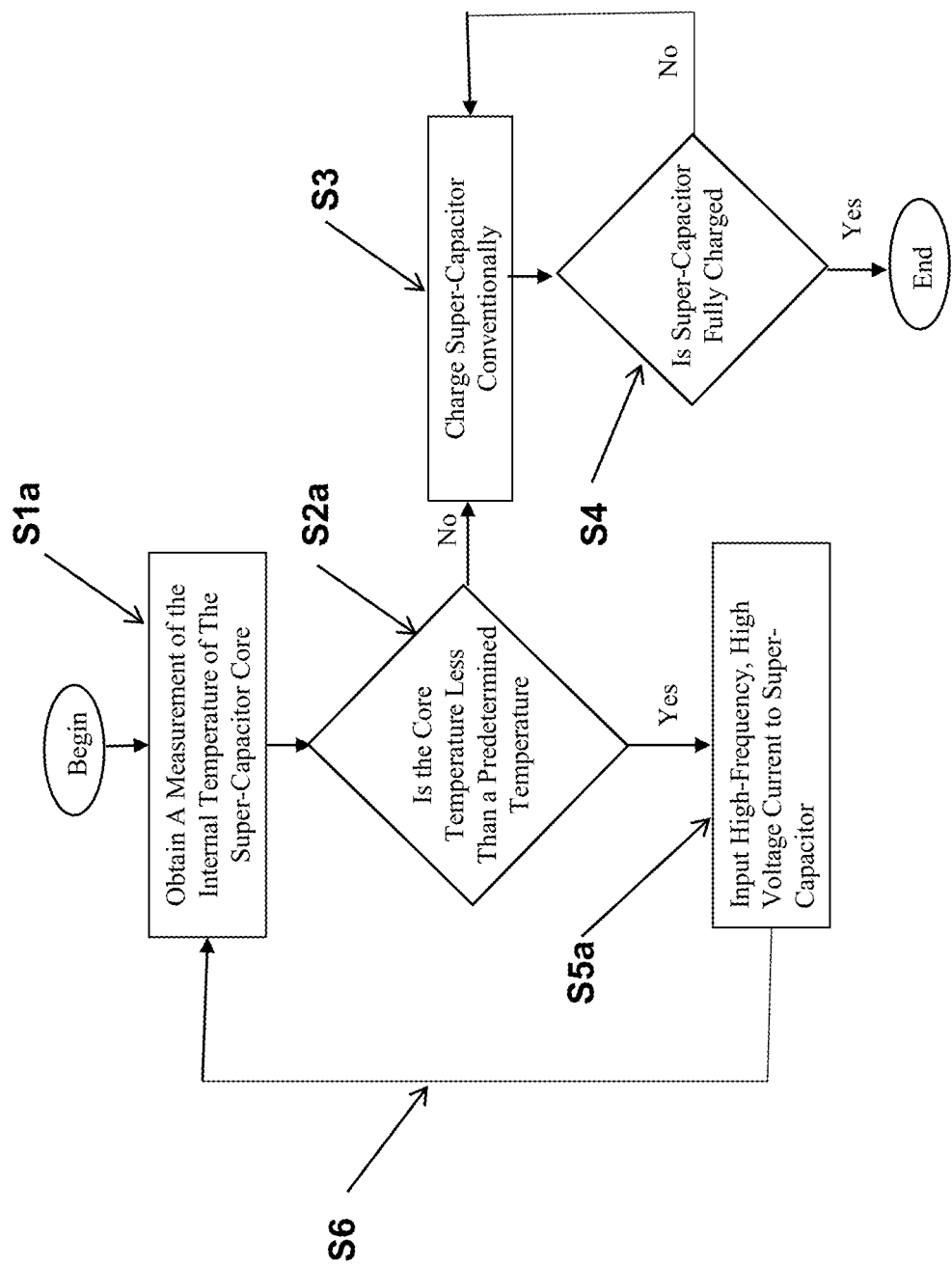
FIGS. 3-7 illustrate embodiments of flow charts of methods for charging supercapacitors at very low temperatures.
Figure 5:
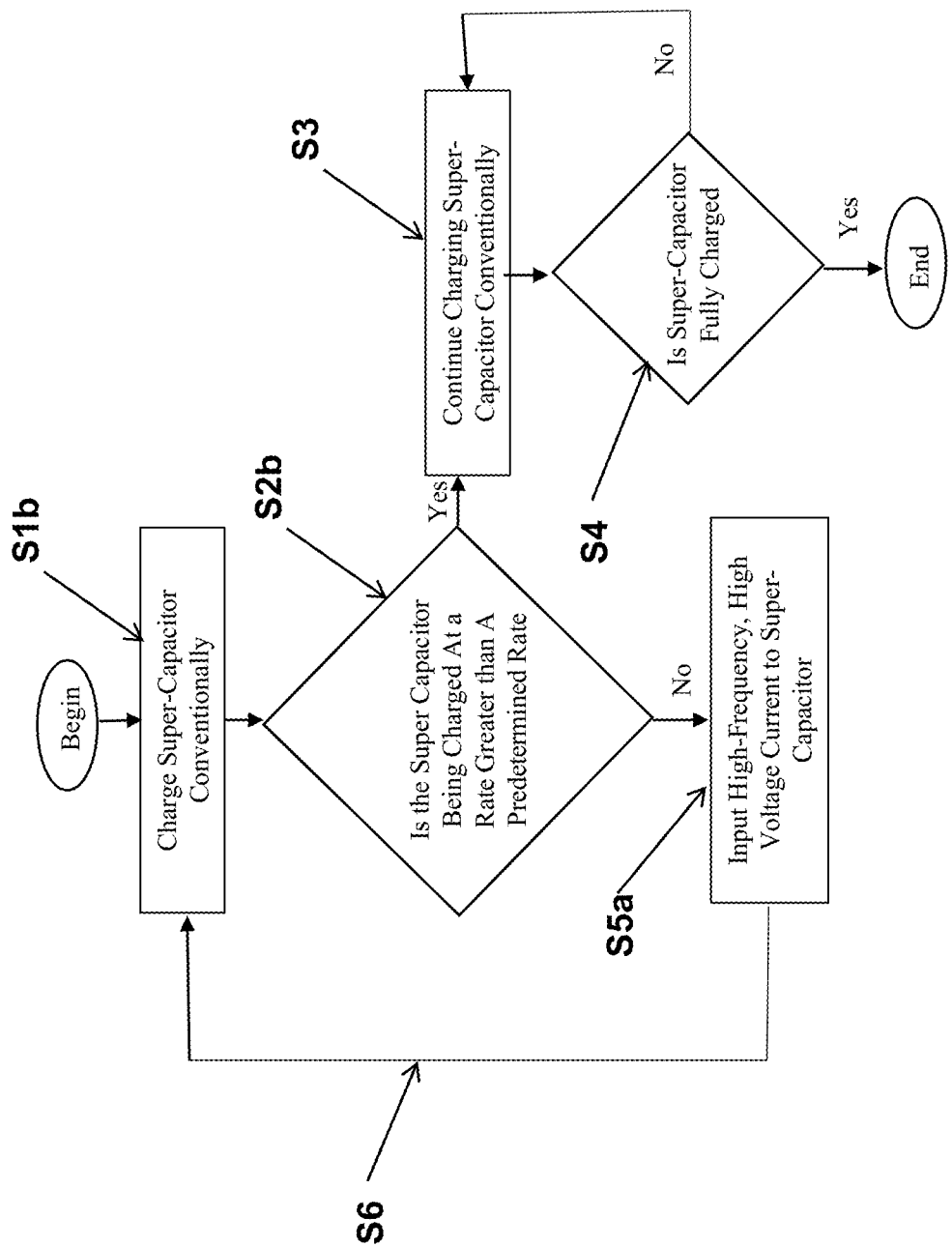

In the first embodiment shown schematically in FIGS. 2, 3 and 5, a supercapacitor charger unit 11 having an internal processor 11a would first obtain the internal temperature of the supercapacitor core at step S1a or S1b. Such processor comprises a hardware, component such as a PLC or CPU and can include software and a memory storing such software and also storing data such as predetermined values used in the methods described below. In applications, such as munitions in which the munitions has been stored at the ambient temperature, the supercapacitor core temperature may be obtained by measuring the ambient temperature at step S1a and approximating the internal temperature of the supercapacitor core using some function of the ambient temperature, such as equating the ambient temperature to the supercapacitor core temperature. Alternatively, the supercapacitor core temperature can be directly measured by an internal sensor 12 (such as a thermocouple based sensor or other temperature measurement sensors known in the art), with the measured temperature signal being provided to the processor 11a via wiring 13 connected to the sensor capacitor terminals 14. The sensor 12 is used by the processor 11a to determine if the supercapacitor can be charged at its regular rate or if the core temperature is so low that the supercapacitor electrolyte has become solid or very close to it, thereby hampering or preventing ion transportation within the electrolyte and preventing the supercapacitor from being rapidly charged at its regular (liquid electrolyte state) rate. As yet another alternative, the temperature sensor can be positioned on an exterior surface of the supercapacitor and the obtained temperature used to approximate the internal temperature of the supercapacitor core using some function of the exterior surface temperature, such as equating the exterior surface temperature to the supercapacitor core temperature.

Alternatively, as shown in FIG. 5, the supercapacitor core temperature may be obtained based on an assumption, such as by applying the regular charging voltage (or any appropriate initial voltage level) to the super capacitor via the charging unit 11 at step S1b and if the processor 11a determines that the supercapacitor does not charge at its regular rate at step S2b, i.e., for example, the measured charging current is significantly lower than a known regular charging current rate, then the processor 11a can assume that the supercapacitor core temperature is very low and below that where the same can be charged at its regular (liquid electrolyte state) rate.

Hereinafter, as discussed above, very low temperature is used to indicate temperature levels at which the supercapacitor electrolyte is rendered solid or effectively incapable of allowing relatively free transport of its ions.

It will be appreciated by those skilled in the art that for safety reasons, the processor 11a of the charger unit 11 can also determine the charge level of the supercapacitor prior to the start of the charging cycle. In addition, the temperature sensor 12 can be employed to ensure that a low charging rate is in fact due to low supercapacitor core electrolyte temperature level as was earlier described.

In the schematic of FIG. 2, the charger unit 11 is shown to be powered internally, such as by a battery. In many applications, however, the charger unit 11 can be powered by an external source (not shown). The charging unit 11 functions similarly irrespective of the source of charger unit 11 power.

Then, once the processor 11a has determined that the supercapacitor core temperature is very low and that due to the very low temperature level the supercapacitor (which can also be determined not to be fully charged) cannot be rapidly charged at either step S2a or S2b, the charger unit 11 can begin to charge the supercapacitor at step S5a. In the schematic of FIG. 2 the charger unit 11 is shown to be connected to the supercapacitor 20 via wires 15 connecting the terminals 22 of the supercapacitor 20 to the corresponding terminals 16 of the charger unit 11.

However, if the processor 11a determines the core temperature of the super capacitor is not less than a predetermined temperature (e.g., the core is at a temperature above which normal charging can be conducted) at step S2a or S2b (the determination at step S2a or S2b is NO), the charger unit would charge the supercapacitor conventionally at step S3, and continue to do so until the super capacitor is determined to be fully charged at step S4 or charging is otherwise terminated.

On the other hand, if the determination at step S2a or S2b is YES, the charger unit 11 can input one or more of a predetermined voltage and current to the terminals 22 of the supercapacitor which will cause internal components of the energy storage device to generate heat. As a first exemplary input, the charger unit 11 can apply a relative high frequency voltage to the supercapacitor at step S5a. The high frequency voltage can be at a peak voltage of around the maximum allowable charging supercapacitor voltage or even significantly higher. Here, high frequency means a frequency at which the supercapacitor capacitor effectively shorts and inductances L1 and L2 and resistances R1 and R2 are caused to generate heat. The processor 11a can then periodically continue to obtain the supercapacitor core temperature by any of the methods discussed above, such as at some predetermined intervals (shown by line S6 in FIGS. 3 and 5). The periodic obtainment of the supercapacitor core temperature can be by direct measurement or assumption as discussed above, such as by measuring the internal temperature with the temperature sensor 12 at step S1a or by attempting to charge the capacitor at the regular charging voltage at step S1b and measuring the charging rate from the charging current. Alternatively, more than one method can be used, such as both methods (S1a and S1b) for measuring the core temperature until either the core (the supercapacitor electrolyte) temperature has reached a desired level for proper charging of the supercapacitor or until the supercapacitor nominal charging rate has been reached. At which time the applied high frequency voltage signal is terminated at step S2a and/or S2b and the processor 11a instructs the charging unit 11 to conventionally charge the supercapacitor to the desired level at steps S3 and S4. The temperature level and/or charging rate measurements may be repeated as needed, such as at regular intervals, particularly at very low ambient temperature conditions to ensure that the process of charging is not interrupted by "re-freezing" of the supercapacitor electrolyte.

Figure 4:
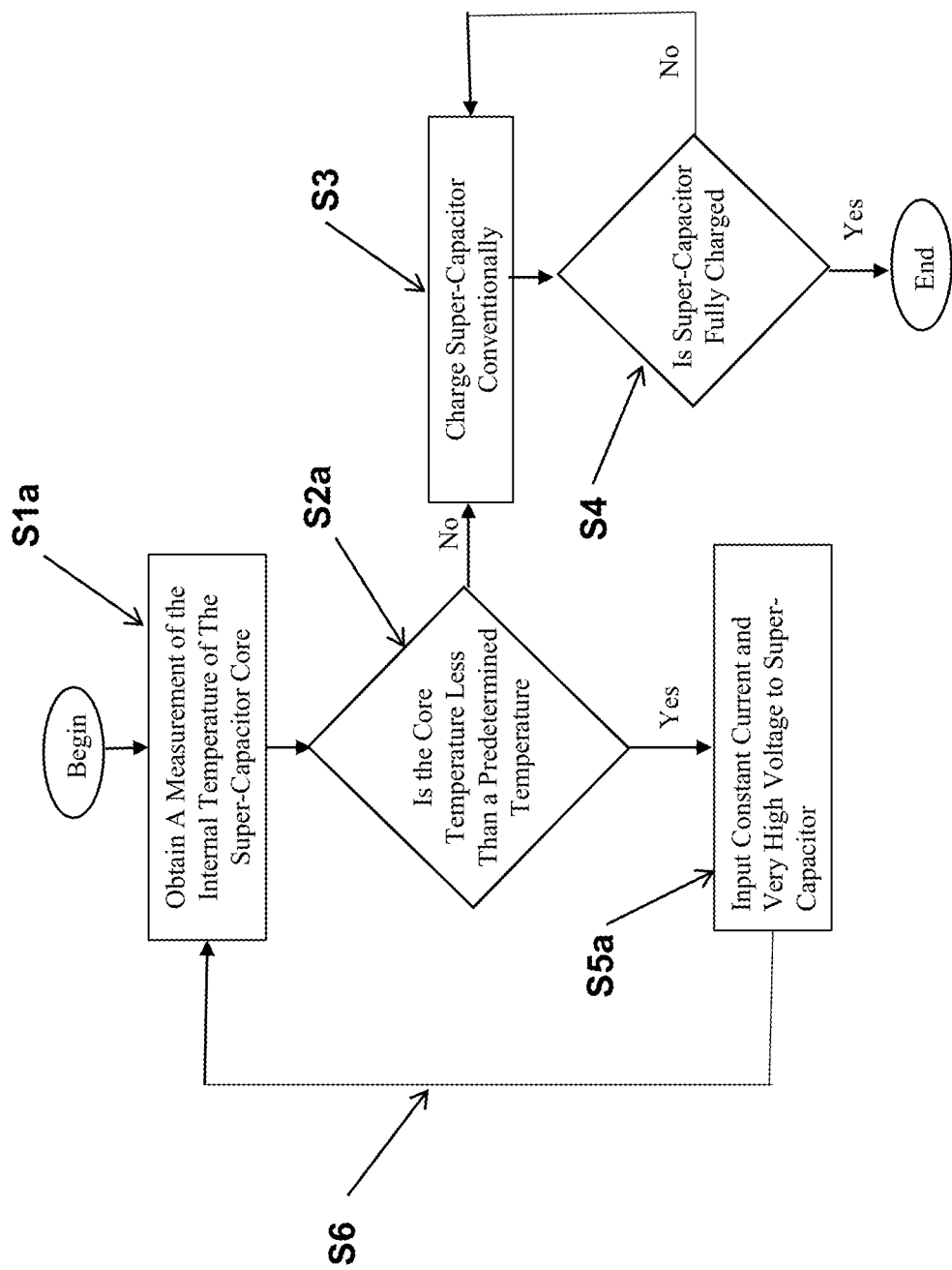
Figure 6:
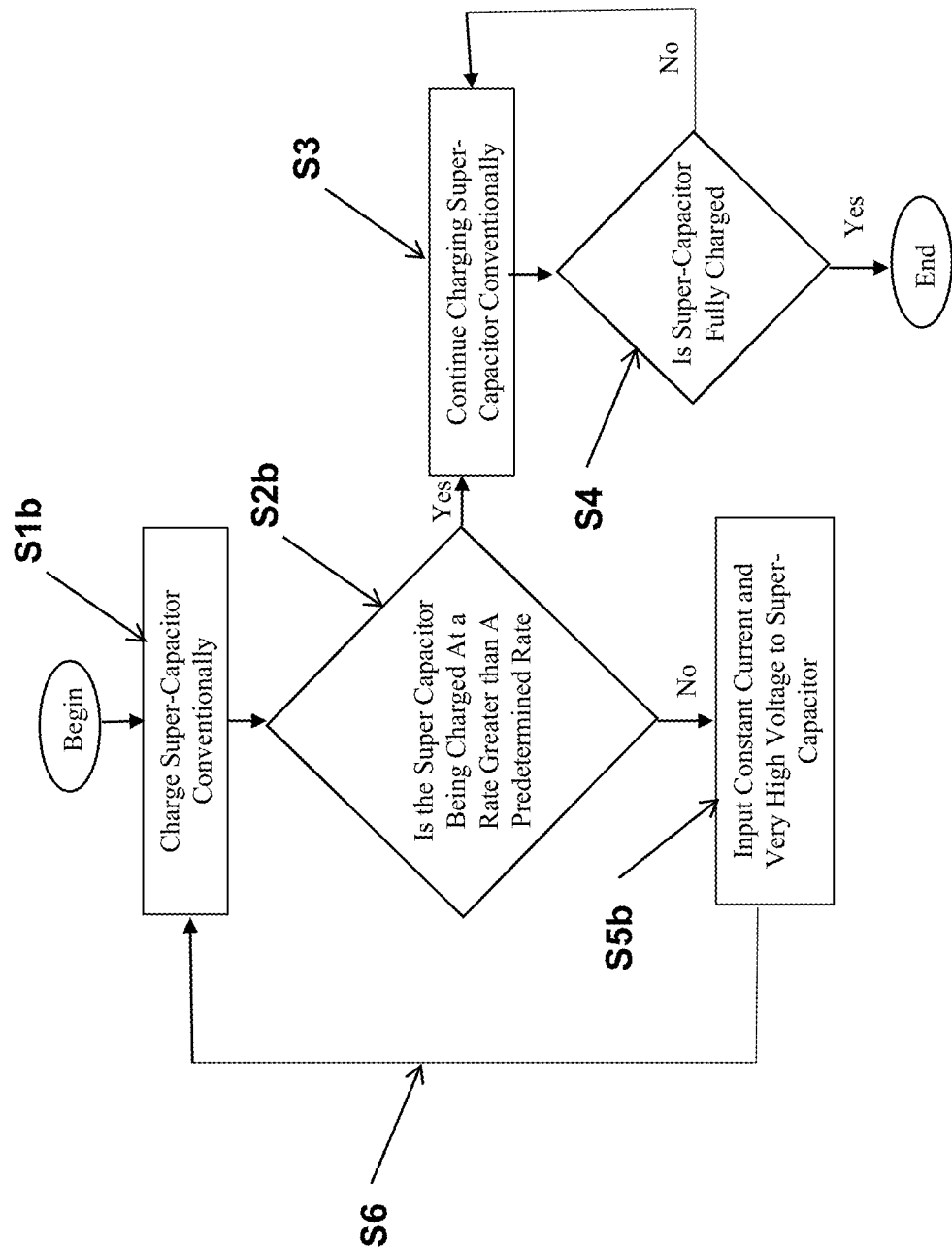

An alternative embodiment is now described using the schematic of FIG. 2 and the flow diagrams of FIGS. 4 and 6 in which similar steps are numbered similarly to those illustrated in FIGS. 3 and 5, respectively. In the alternative embodiment, once the core 12 of the (not fully charged) supercapacitor 20 is determined to be at very low temperature at step S2a or S2b using any one or combinations of aforementioned techniques, the processor 11a instructs the charging unit 11 to heat the core 12 at step S5b by passing a constant current through the equivalent internal resistance R3 through the supercapacitor terminals 22 and the aforementioned two pairs of serially connected resistors and inductors. The current is generated by the charging unit 11 through the wiring 15. In general, and depending on the type and design of the supercapacitor 20 and its charging state and the electrolyte temperature, the current may be applied at voltages that are significantly higher than the voltage rating of the supercapacitor. This is usually possible since frozen electrolytes of a capacitor with low level of charge can withstand significantly higher voltages. When using the heating voltages that are above the rated voltage of the supercapacitor, the processor 11a can regularly monitor the core temperature and the charging state of the supercapacitor at S6 and properly lower the heating voltage as the supercapacitor begins to be charged at or close to its nominal rate.

In general, due to the very high internal resistance level R3 of most supercapacitors, the methods illustrated in FIGS. 3 and 5 of providing heat to the supercapacitor core via the equivalent inductances L1 and L2 of the supercapacitor may be more effective. Such methods illustrated in FIGS. 3 and 5 may also be safer since the high frequency current may be applied at or even above the rated voltage of the supercapacitor. However, it will be appreciated by those skilled in the art that since the inductor core in this case is in effect the conductive supercapacitor electrolyte, the amount of heat that may be generated in many supercapacitors could be relatively low.

In the lump model shown in FIG. 1, the aforementioned heat generated per second (P) by the application of a constant voltage to the supercapacitor terminals is given by $$P = \frac{V^2}{R_1 + R_2 + R_3} \quad (1)$$

As can be seen from the above equation, since the leakage resistance R3 is very large, the amount of heat that can be generated per second for a relatively low voltage that can be applied to a supercapacitor (with, for example, a rate voltage of 2.7 Volts) is very small. For example, for a typical 100 F supercapacitor with a rated voltage of 2.7 V and with a serial resistance R1+R2=50 mΩ, and leaking resistance R3=10 kΩ, will, according to equation (1) above only generate heat at a rate of:

$$P = \frac{(2.7V)^2}{(10 \text{ k}\Omega + 50 \text{ m}\Omega)} = 0.73 \text{ mW}$$

Figure 7:
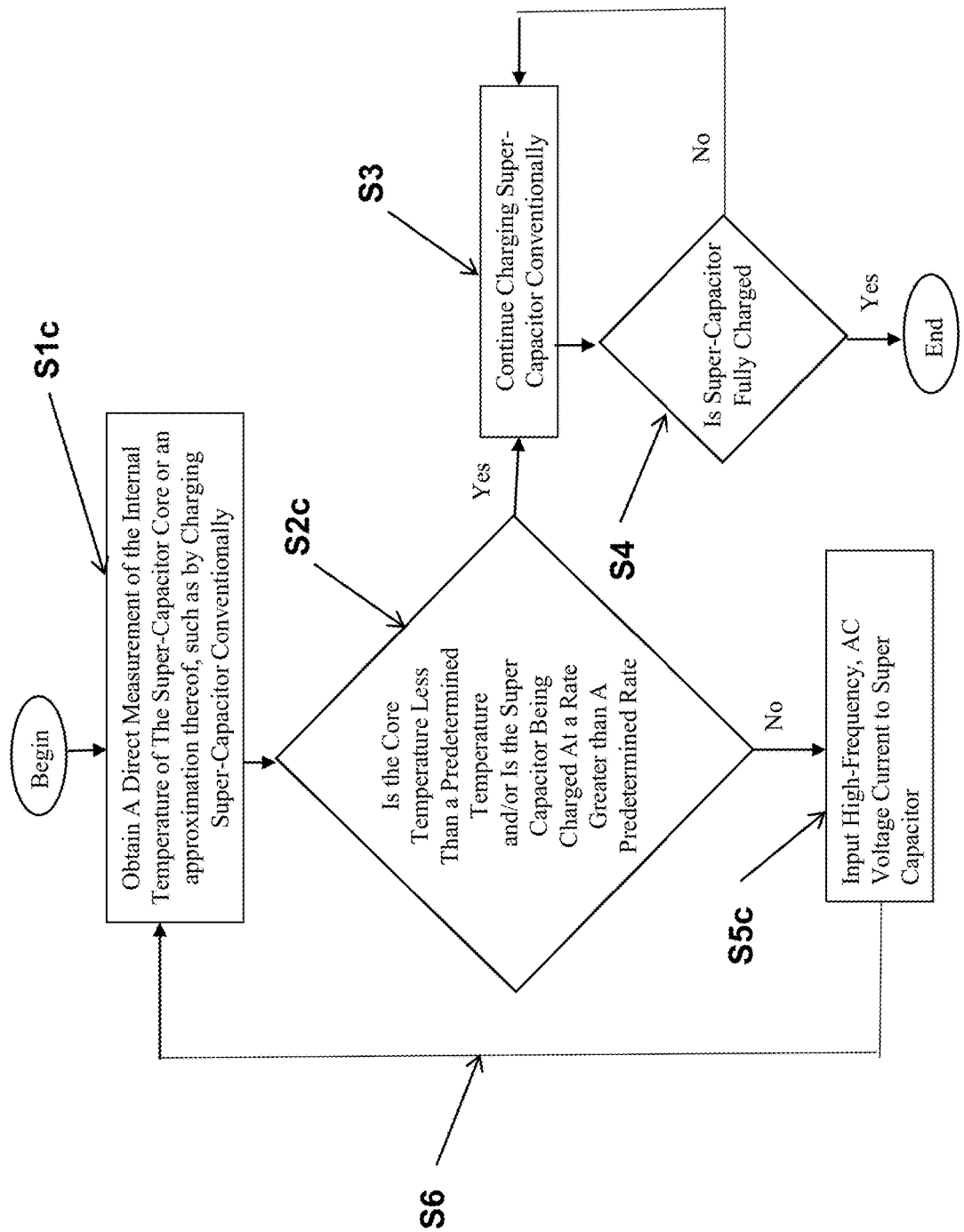

In another alternative embodiment, the following method can be used instead of the previously described application of a constant voltage to significantly increase the above rate of heat generation within the core 21 of a typical supercapacitor 20, such as the one shown schematically in FIG. 1. In this method, shown in FIG. 7, once the charger unit 11 has determined that the battery is not charged completely and that the battery core is at a very low temperature at steps S1c and S2c, as was previously described, then the charger unit 11 would apply an alternating current (AC) with a peak voltage of $V_p$ at a high frequency f to the terminals at step S5c. The behavior of the lumped circuitry (consisting of the resistors R1, R2 and R3 and inductors L1 and L2 as shown in FIGS. 1 and 2) will now be very different than that indicated by the above equation (1). At a high frequency f, the capacitor C provides very low impedance, effectively shorting the leakage resistor R3 which is in parallel with it. As a result, the total resistance to the applied current becomes very small since the resistances R1 and R2 are very small. As a result, the total heat generated per second becomes very large and therefore the very cold supercapacitor core electrolyte can be heated very rapidly to the temperature at which it can be charged at or close to its nominal charging rate. It is noted that at such very high frequencies, the inductors L1 and L2 also provide high impedance but would usually contribute significantly less heat in a supercapacitor environment than those generated by low resistances R1 and R2. The heat generated per second (power P) is given approximately by the equation (2) below.

$$P = \frac{1}{2} \frac{V_p^2}{R_1 + R_2 + 2\pi f(L_1 + L_2) + \frac{R_3}{1 + 2\pi fCR_3}} \quad (2)$$

For the aforementioned 100 F supercapacitor with a typical total inductance of L1+L2=0.06 µH and R1+R2=50 mΩ, and leaking resistance R3=10Ω, with an applied AC voltage of $V_p$=1 V at frequency f=1,000 Hz, the heat generated per second can reach 9.3 W. It is noted the above calculations are approximate and does not consider change in the supercapacitor capacitance at very low temperatures and with the applied high frequency voltage.

It will be appreciated by those skilled in the art that the charger unit 11 would require not only the processor 11a but any electronics and logic circuitry for the core temperature measurement and for providing the indicated currents and voltage inputs for the described supercapacitor heating process as well as safe charging of the supercapacitor. These technologies are widely used in practice and are considered to be well known in the art.

In the above embodiments, the inductance or the internal resistance of the supercapacitors is used by the described charging unit to heat up the supercapacitor core (mainly its electrolyte) to a temperature at which electrolyte ions are provided with enough mobility to allow rapid charging of the supercapacitor. It consists of a series resistance and an inductance, and the leakage current is represented by a resistor in parallel with the capacitor, FIG. 1. The series resistance (R1 and R2 in FIG. 1) ranges from a few milliohms to several tens milliohms. The inductance (L1 and L2 in FIG. 1) depends on the construction and can be ignored for low frequency operation. The leakage resistance can also be ignored for short-term operation. The electrolyte in supercapacitors forms a conductive connection between the two electrodes which distinguishes them from electrolytic capacitors where the electrolyte is the second electrode (the cathode). Supercapacitor electrodes are generally thin coatings applied and electrically connected to a conductive, metallic current collector. Electrodes must have good conductivity, high temperature stability, long-term chemical stability, high corrosion resistance and high surface areas per unit volume and mass. Other requirements include environmental friendliness and low cost.

Figure 8:
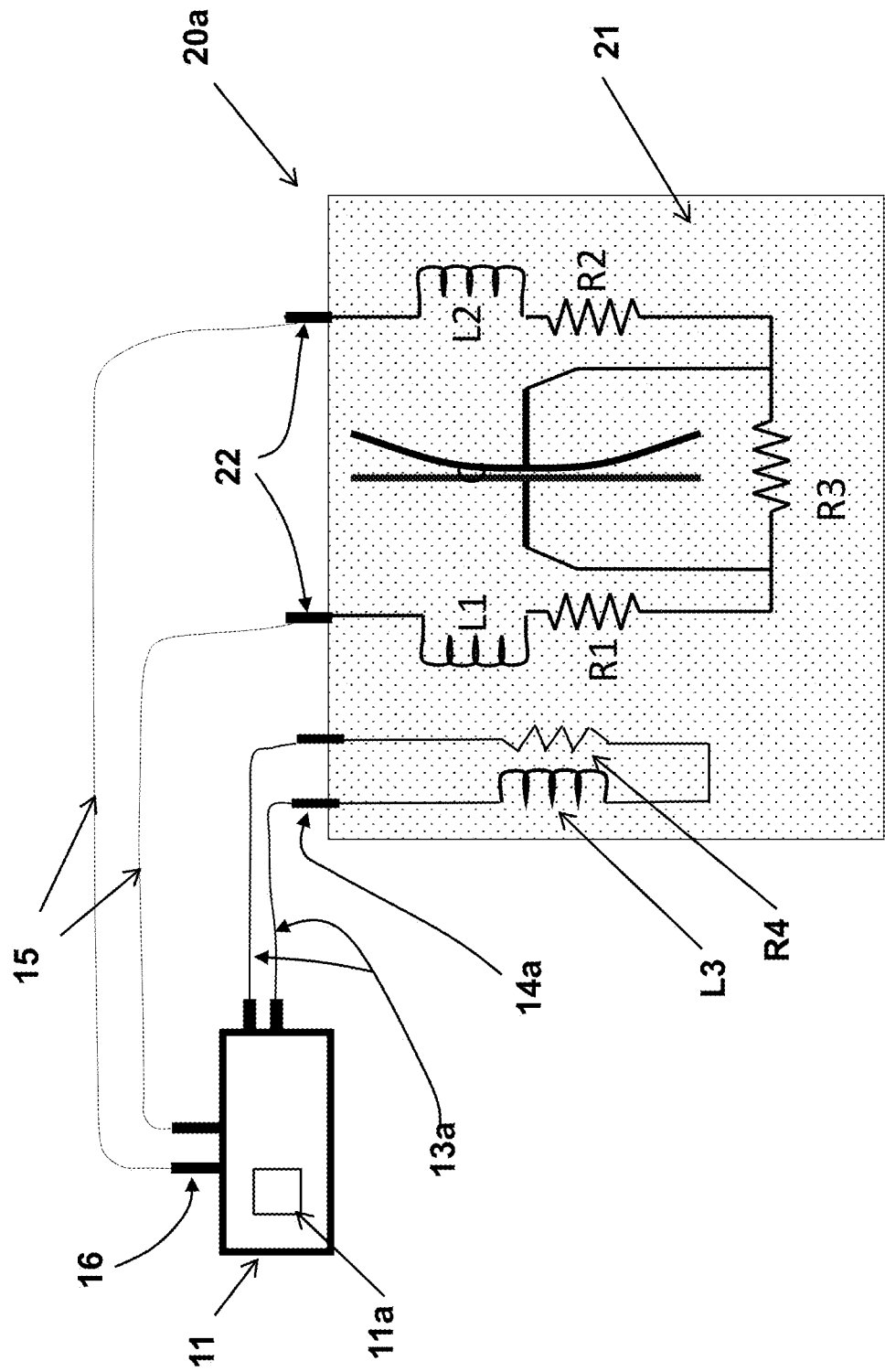
FIG. 8 illustrates an embodiment of a supercapacitor to be charged at very low temperatures.

Referring now to FIG. 8, no matter the type and design of the super-conductor and its electrodes, another embodiment relates to additional resistive and/or inductive elements added to the supercapacitor electrode surface or otherwise distributing such resistive and/or inductive elements throughout the supercapacitor core. Similarly, such additional resistive and/or inductive elements can also be added to a rechargeable battery, such as a lithium ion battery. These added resistive and/or inductive elements can be electrically insulated by dielectric materials to prevent them from interfering with the operation of the energy storage device. The added resistive R4 and/or inductive elements L3 can be distributed throughout the core and as close as possible to its electrolyte material. Then when the core temperature is determined to be low as was previously described, passing current through the added resistances generates heat to increase the temperature of the electrolyte and thereby allowing charging at its nominal rate once the core temperature rises above some predetermined temperature or charging ability. When an inductive element is added, an alternating current of high enough frequency can be used for the heating of the electrolyte thereby facilitating the process of rapid charging at very low temperatures. With such a supercapacitor 20a, additional terminals 14a can be provided for inputting the required electrical input for heating the core though independent wiring 13a from the charger unit of electronic logic can be provided to use only one set of terminals 22 to both charge the supercapacitor 20a and input the additional inductor(s) L3 and resistor(s) R4 for heating the core.

Figure 9:
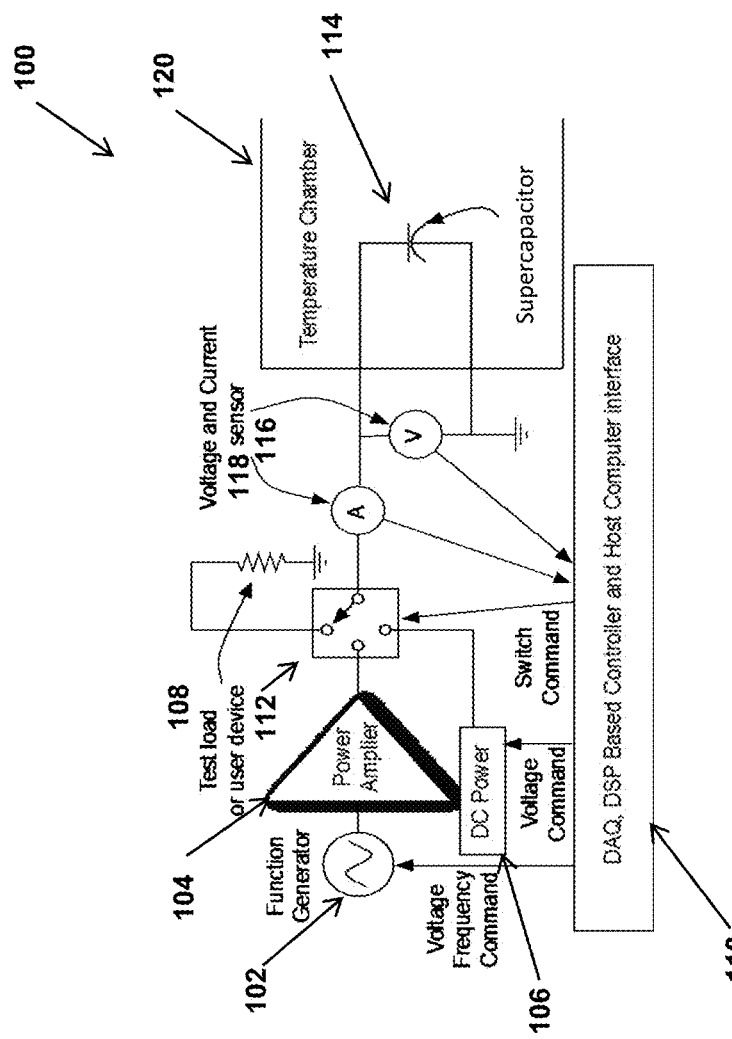
FIG. 9 illustrates a schematic of a supercapacitor charging unit.

A block diagram of a supercapacitor testing unit 100 is shown in FIG. 9. A function generator 102 is provided, such as a 25 MHz arbitrary waveform generator. A power amplifier 104 is also provided and can be constructed by modifying an available 2-30 MHz RF power amplifier by matching the supercapacitor impedance and the required power range as described below. The DC power source 106 is provided by a regulated source with output voltage and current limit setting. The test load or user device 108 can be a high power resistor, which is used to measure the available energy stored in the supercapacitor.

The function generator frequency and the power amplifier voltage amplitude can be manually set. A host computer 110 equipped with a DAQ and DSP board can provide the means of controlling the process and for data collection and online analysis and feedback. A DSP board clock can be used to provide for fast input/output operations and sampling time. The provided system can allow continuous measurement of the voltage and current across the load and the consumed power, thereby the load impedance. The DC power source 106 can also be controllable by the DSP based controller 110 to achieve a desired charging profile. The test load can be used to measure an amount of energy the charged supercapacitor can provide following charging. A switch 112, controlled by the DSP controller 110, can be used to connect the supercapacitor 114 to the desired circuitries. A set of voltage and current sensors 116, 118 report their values to the DSP A/D converter via the DAQ. The controller 110 can communicate with a host computer to exchange the command and status of each device. The DSP controller 110 can also generate charging pulses.

The supercapacitor testing unit can be designed to apply a high frequency sinusoidal AC voltage signal with and without DC bias to the supercapacitor load. The voltage and frequency of the AC signal can be manually or automatically controlled. The voltage across the load and the current passing through the supercapacitor load and their phase are measured. The power applied to the load and the impedance of the load can then be calculated.

Figure 10:
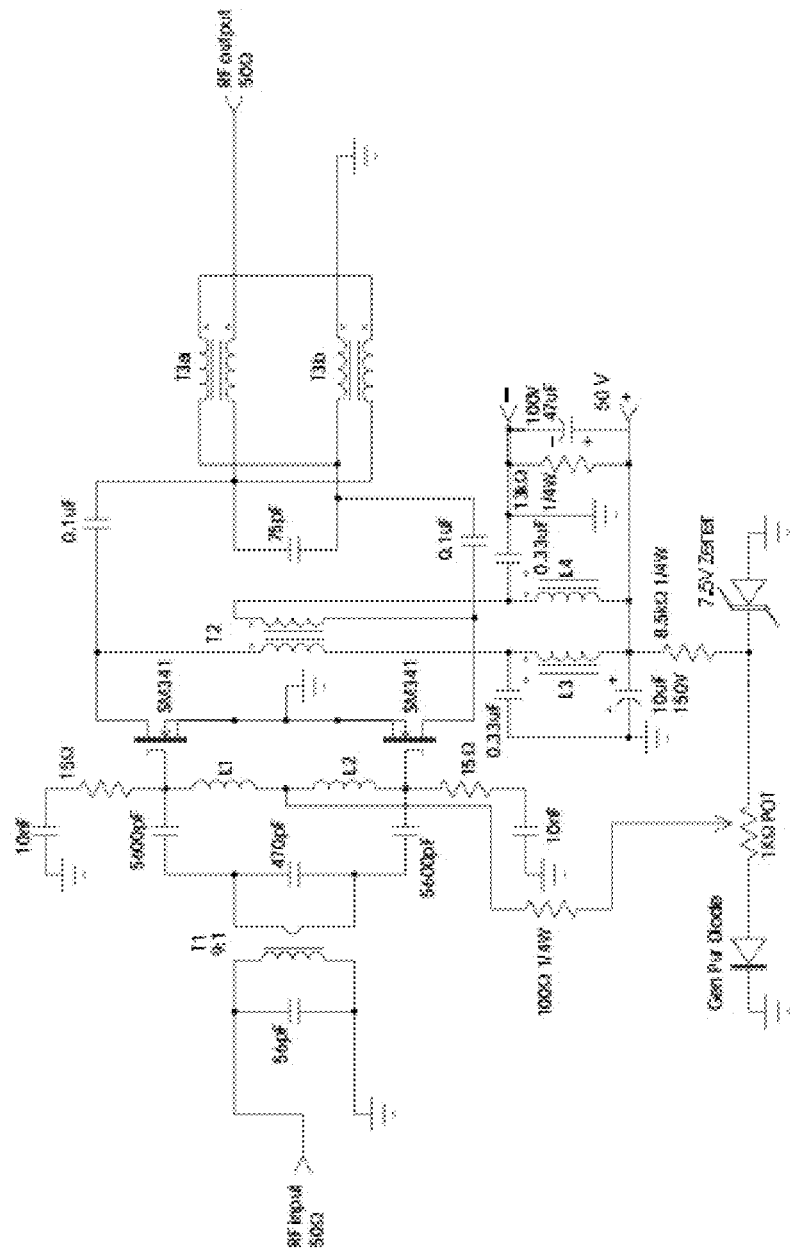
FIG. 10 illustrates a circuit diagram of a 2-30 MHz RF Power Amplifier.

The high frequency 25 MHz function generator 102 can be used as an input to the power amplifier 104. The power amplifier 104 can be constructed by the modification of the input and output impedance of an existing RF power amplifier. A circuit diagram of an existing 2-30 MHz RF power amplifier design is shown in FIG. 10. The nominal power output of this device can be 30 Watt, which is appropriate for superconductor charging.

An existing host computer will be provided with a DAQ and a DSP board for this purpose. The required software for running the system with proper data communication, sensor data acquisition and processing and generating the required control signals can be stored in a memory (not shown) accessible by the controller 110.

The charging unit 100 can measure the impedance of the supercapacitor 114 at different AC frequency, temperature and voltage. The function generator 102 can be used to generate sinusoid with adjustable voltage signal, for example up to 25 MHz. The power amplifier 104 will then produce and apply an AC voltage at a predetermined (preset) voltage level to the supercapacitor. The switch 112 controlled by the pulse generator will be used to apply the AC voltage to the supercapacitor 114 for a predetermined time period, such as an adjustable short duration of 10 to 100 microseconds depending on the AC voltage frequency. The short duration of the input power ensures that the total input energy is negligible. The input voltage and current waveform is then measured and used to calculate the supercapacitor impedance.

Tests of the superconductor charging can be conducted at various temperatures, such as at −20° C., −25° C., −35° C., −45° C., −48° C., −54° C., and −65° C. The tests can also use various AC voltage amplitudes, such as 2.7 V, 3.2 V, 4.5 V, 6 V, 8 V and 10 V. The AC voltage frequency range can be 2 MHz to 25 MHz, and testing can be performed in 0.5 MHz steps.

As was previously described, the application of high frequency AC voltage to the supercapacitor is for the purpose of heating the supercapacitor core at low temperatures, in particular its electrolyte, before charging it with an applied DC voltage.

An objective of the testing device is to determine at what point the AC voltage must cease and the DC charging should begin so as to build a database for use in the methods described above. At very low temperatures of below around −45° C. to 48° C., the electrolyte is nearly frozen solid and the impedance of the supercapacitor is very high. But as the electrolyte becomes active (melt), the rapid increase in the effective capacitance of the supercapacitor causes the impedance to rapidly drop, thereby causing the passing current level to increase accordingly. In the tests, the AC current level is measured and after it has increased by a factor of 10, 25, 50, 75 and 100 then the AC voltage can be switched off and the DC charging voltage applied to the supercapacitor. In the test, for example, the supercapacitor can be charged at 3.2 V until the charging current drops to 20 mA, at which point the supercapacitor will be considered to be fully charged. The available stored energy is then measured by discharging the stored energy in the supercapacitor through the test load 108.

The AC current and voltage profiles and the DC charging time are recorded. The tests can be performed while the supercapacitor is inside a temperature chamber 120. The tests can be performed with the capacitor wrapped in a typical thermal insulation jacket and without thermal insulation to mimic a supercapacitor installed within a housing that provides certain level of thermal insulation against heat loss and outside of any housing, respectively.

During the tests, the supercapacitor 114 will be considered damaged if the stored energy is less than 95% of the expected available stored energy.

Such testing can be used to optimize the above described methods for charging supercapacitors at low temperature to achieve full charge in minimum amount of time and used to formulate a general time optimal strategy for charging supercapacitors at low temperatures. A range of AC voltage and frequency for preheating of the supercapacitor and its follow up DC charging and the expected optimal AC to DC switching point can be determined for different low temperature levels which can be tested and fine-tuned to obtain the desired time-optimal strategy for implementation.

Thus, the above testing device and methods can be used to obtain statistical information regarding the time needed to charge various size and configuration supercapacitors to full charge at various low temperatures. The statistical information generated can include the mean time required to charge a capacitor at a given temperature and its standard deviation at a certain confidence level, such as 95%.

It will be appreciated by those skilled in the art that the disclosed testing device and method for charging supercapacitors at low temperatures can be applied to the other methods described above (such as at FIGS. 3-6) and/or for different types of commonly known supercapacitors, ultracapacitors and so-called hybrid capacitors and the like as well as to rechargeable batteries, such as lithium ion batteries.

The above method and devices for rapid charging of supercapacitors at low temperatures can also be used to similarly enable and/or significantly increase the charging rate of lithium-ion and other similar rechargeable batteries at low temperatures. As discussed above, low temperature charging is in general even more an issue for lithium-ion and other similar rechargeable batteries since their rate of charging is low at even higher temperatures than supercapacitors, usually even a few degrees below zero C.

In the case of lithium-ion and other similar rechargeable batteries, similar to the previously described method for supercapacitors, the charging process includes similar steps. After determining that the lithium ion battery requires charging and that its core is at a low temperature that prohibits/minimizes charging, the battery electrolyte and electrodes are heated by similar methods as described above with regard to FIGS. 3-7, by inputting one or more of a predetermined voltage and current input to terminals of the battery causing internal components thereof to generate heat, such as with the application of an AC high frequency voltage, usually in the order of 1-10 MHz and sometimes higher depending on the battery size and construction. Then once the battery core, particularly its electrolyte, has reached a desired predetermined temperature or charging ability, which may be detected directly with a temperature sensor as described above or assumed, such as by detecting the charging rates with AC and/or DC voltages, as also described above, the battery can be charged conventionally using DC voltages following well known electronic and logic circuitry and procedures to ensure safe and rapid charging.

It will be appreciated by those in the art that in many cases in lithium-ion and other similar rechargeable battery charging (including supercapacitor charging), the optimal charging time can be achieved by overlapping AC voltage and DC voltage charging during a portion of the time, usually before switching from the AC to DC voltages.

Figure 11:
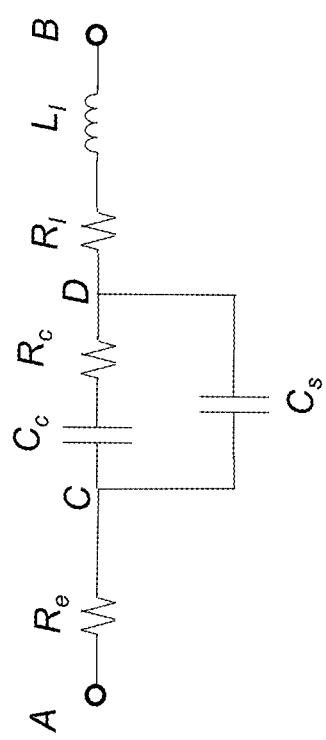
FIG. 11 illustrates an equivalent circuitry of a lithium ion battery.

A basic operation of Lithium ion batteries may be approximately modeled with the equivalent (lumped) circuitry shown in FIG. 11. In this model, the resistor $R_e$ is considered to be the electrical resistance against electrons from freely moving in conductive materials with which the electrodes and wiring are fabricated. The equivalent resistor $R_I$ represents the ("essentially viscous") resistance to free movement of lithium ions by the battery electrolyte. The equivalent inductor $L_I$ represents the ("essentially inertial") resistance to change in its state of motion, which is insignificant until the frequency of the required motion becomes extremely high. The capacitor $C_s$ is the surface capacitance, which can store electric field energy between electrodes, acting similar to parallel plates of capacitors. The resistor $R_c$ and capacitor $C_c$ represent the electrical-chemical mechanism of the battery in which $C_c$ is intended to indicate the electrical energy that is stored as chemical energy during the battery charging and that can be discharged back as electrical energy during the battery discharging, and $R_c$ indicates the equivalent resistor in which part of the discharging electrical energy is consumed (lost) and essentially converted to heat. The terminals A and B are intended to indicate the terminals of the lithium ion battery and C and D are other internal points in the circuitry.

It will be appreciated by those skilled in the art that many different Lithium ion types and designs and different chemical compositions are currently available. It is also appreciated by those skilled in the art that other models of the Lithium ion batteries have also been developed. The model presented in the schematic of FIG. 11 does however represent the basic components of Lithium ion batteries as far as the disclosed method and apparatus for charging such batteries at low temperatures are concerned. Therefore the methods and apparatus described herein applies to all different types and designs of Lithium ion batteries with all different design structures and chemistries and not just those having the configuration represented by FIG. 11. The reasons that currently available Lithium ion battery charging methods and devices cannot be used for charging these batteries at low temperatures of even close to zero degrees C. are briefly described above and well described in the published literature and have been shown to damage the battery and even cause a fire hazard if used.

In the approximated equivalent (lumped) circuitry model of Lithium ion batteries shown in FIG. 11, three components of the battery, namely $R_I$, $R_c$ and $C_c$, are highly sensitive to temperature. At low temperature, the resistance of the resistor $R_I$ increases due to the increase in the "viscous" resistance of the electrolyte to the movement of lithium ions. This increase in resistance causes higher losses during charging and discharging of the lithium ion battery. Low temperature charging passes (relatively high) currents through the indicated components $R_c$ and $C_c$ representing the battery electrical-chemical reactions, and is well known that results in so-called lithium plating, which is essentially irreversible, prevents battery charging, and permanently damages the battery.

An embodiment of a method for charging lithium ion batteries at low temperatures can be described as follows. Consider the circuit model of FIG. 11. If an AC current with high enough frequency is applied to the battery, due to the low impedance of the capacitor $C_s$, there will be no significant voltage drop across the capacitor, i.e., between the junctions C and D, and the circuit effectively behaves as if the capacitor $C_s$ were shorted. As a result, the applied high frequency AC current is essentially passed through the resistors $R_e$ and $R_I$ and not through the $R_c$ and $C_c$ branch to damage the electrical-chemical components of the battery. Any residual current passing through the $R_c$ and $C_c$ branch would also not damage the battery due to a high frequency and zero DC component of the applied current. The high frequency AC current passing through the resistors $R_e$ and $R_I$ will then heat the battery core, thereby increasing its temperature. If the high frequency AC current is applied for a long enough period of time, the battery core temperature will rise enough to make it safe to charge using commonly used DC charging methods.

Furthermore, when the demanded frequency of AC current becomes high, the inductance $L_I$ indicates high AC voltage potential requirement from the charging device. In other words, while there is an AC voltage limitation on the charging device, the inductance $L_I$ would become dominate when the frequency is high enough so that all voltage potential drop falls across it. Even though there is still part of the energy being transferred into heat from this inductor, it is far less than from $R_I$. Therefore, the high frequency AC current can be chosen with the inductance $L_I$ taken into consideration.

In the device designed to provide the aforementioned high frequency AC current to raise the battery core temperature to a safe charging temperature, provision can be made to periodically assess the temperature status of the battery core and determine if a safe charging temperature level has been reached.

Although temperature sensors can be used, similarly to that discussed above with regard to the supercapacitor of FIG. 12, in the method and apparatus for charging Lithium ion batteries at low temperatures, two basic methods may be used to assess the battery core temperature without the need for temperature sensors (thus, not requiring a special configuration of the lithium ion battery for use in such methods or with such apparatus). In one method, as the aforementioned high frequency AC current is applied to the battery, the battery impedance is regularly measured. Since the resistance of the resistor $R_I$ is high at low temperatures, the level of battery impedance indicates if the battery core temperature is low or around a safe temperature for charging. When using this method, the impedance of the battery can be measured a priori for the charger to use to determine when the battery core safe charging temperature has been reached.

A second method for determining if the battery core temperature has reached a safe charging temperature level while applying the aforementioned high frequency AC current is as follows. In this method, the high frequency AC current is periodically turned off and current is discharged from the battery through a resistive load for a very short duration. If the battery core is still cold, then the voltage across the load will be low.

It will be appreciated by those skilled in the art that both methods described above can be readily incorporated in the battery charging unit. In fact, the electrical and electronic circuitry required to apply the aforementioned high frequency AC current as well the above one and/or both methods of assessing the Lithium ion battery core temperature for safe charging may be readily incorporated in one single charging unit. Such a unit can also use commonly used methods to charge the battery once the battery core temperature has been raised to a safe charging level.

Furthermore, once DC charging has begun, the charging unit may be programmed to periodically assess the battery core temperature and if detects that the temperature is approaching an unsafe (low) temperature, then the high frequency AC current would be turned on and the DC charging current is turned off. Alternatively, a high frequency AC current may be superimposed on the charging DC current.

The Lithium ion battery may also be provided with a temperature sensor to measure its temperature such as those used in some currently available Lithium ion batteries. The temperature sensor input, which can be in addition to one or both aforementioned methods, may then be used to determine the safe charging temperature of the battery.

The aforementioned high frequency AC current may also be used to increase Lithium ion battery core temperature at low temperatures to achieve higher discharge rates. As such, the present method provides the means of charging Lithium ion batteries at low temperatures as well as providing the means of increasing the performance of Lithium ion batteries, i.e., increasing their discharge rate, at low temperatures.

Figure 12:
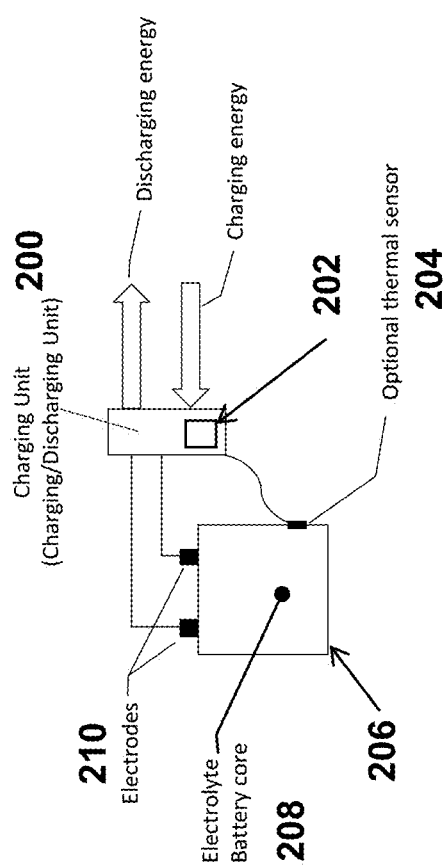
FIG. 12 illustrates a block diagram of a structure of a method of charging/discharging a lithium ion battery at low temperatures.

The block diagram of the apparatus using the present novel method for charging and/or discharging Lithium ion batteries 206 having an electrolyte battery core 208 at low temperature is shown in FIG. 12. The charging/discharging unit 200 (collectively referred to herein as a "charging unit") is provided with electrical and electronic circuitry to provide the aforementioned high frequency AC current and the charging DC current, both with voltage controls, and can include a processor 202, such as a microprocessor or CPU for controlling the process of measuring the battery core temperature as previously described and increasing the core temperature if below the battery safe charging temperature and charging when the battery core temperature above the said safe charging temperature. The charging unit 200 having wiring to connect to the terminals 210 of the battery 206. The process steps for carrying out such methods can be stored as software on a memory device accessible by the processor 202. The charging unit 200 would periodically check the temperature by using one or both aforementioned methods based on the battery impedance and/or alternatively from an external or internal battery temperature sensor source 204 to properly direct the charging process.

Alternatively, the charging unit of FIG. 12 may function as a charging and discharging control unit and increase the battery core temperature when it is below the aforementioned safe charging temperature for charging by applying an appropriate high frequency AC current to the battery to be followed by a DC charging current. And if the battery temperature is low enough to significantly degrade its performance, i.e., its desired discharge rate, the charging unit 200 would also apply the high frequency AC current to the battery 206 to increase its core temperature to increase its discharge rate.

Figure 13:
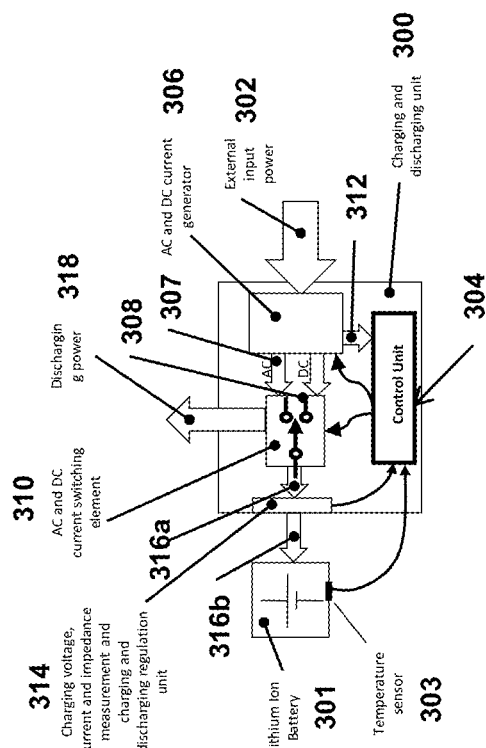
FIG. 13 illustrates a block diagram of main components of an embodiment of a processor controlled lithium ion battery charging and discharging unit at low temperatures.

An embodiment 300 of the Lithium ion charging and discharging unit is shown in the block diagram of FIG. 13. Although the unit 300 can be used to solely charge lithium ion batteries at low temperatures, the unit 300 is intended for use as a charging and discharging unit for Lithium ion batteries at all temperatures including at low temperatures.

It is appreciated here that for Lithium battery charging low temperature is intended to indicate those battery core temperatures at which DC currents (continuous or pulsed or other variations known in the art or the like) causes damage to the battery or that the battery cannot effectively be charged. In the Lithium ion battery discharging process, low temperature is intended to indicate temperatures at which the Lithium ion battery discharge rate is significantly lower than its normal rate. In Lithium ion batteries the latter temperatures are generally lower than those for safe charging of the battery.

The unit 300 is powered by an external power source as shown schematically by arrow 302, which might for example be an outlet provided outdoors for charging the Lithium ion batteries of an electric car. A microprocessor-based controller 304 (alternatively referred to herein and in FIG. 13 as a "control unit") is used for determining the status of the battery 301 which may or may not have an internal or external temperature sensor 303 as was previously discussed while being charged and which when its battery core is determined to be below a safe charging temperature would instruct the AC and DC current generator 306 to output high frequency AC current, shown schematically by arrow AC 307) and when it is safe to charge, would instruct the AC and DC current generator 306 to output DC current, shown schematically by arrow DC 308 using the indicated switching element 310. The control unit 304 may be programmed (the instructions of which may be stored in a memory provided in the unit 300 and accessible by the control unit 304) to increase the internal temperature of the battery 301 a safe amount to allow the battery 301 to be charged at faster rates. The high frequency AC and DC currents are generated by the indicated AC and DC current generator 306, which is powered from the unit input power 302, and which is in direct communication with the control unit 306 as indicated by the arrow 312. The control unit 304 is also in constant communication with the AC and DC current switching element 310 and can determine if one or the other of the AC or DC current needs to be turned on or off. In this embodiment only one of the AC or DC current can be turned on simultaneously.

In the embodiment 300 of FIG. 13, when either the AC or the DC current is turned on, the current is passed through a charging voltage, current and impedance measurement and charging and discharging regulation unit 314 as indicated by arrow 316a, which is used to determine the aforementioned current, voltage and impedance measurements needed for the control unit 304 to control the charging process as was previously described. The charging voltage, current and impedance measurement and charging and discharging regulation unit 314 also regulates the charging current during the charging cycles and the discharging current during the discharging cycles as directed by the control unit 304 to ensure proper and safe operation of the battery 301 and the charging and discharging unit 300. The charging and discharging connections between the above charging voltage, current and impedance measurement and charging and discharging regulation unit 314 and the Lithium ion battery 301 are indicated schematically by arrow 316b. The battery discharge is routed through the AC and DC current switching element 310 as shown schematically by arrow 318. The control unit 304 is also in communication with all the system units as shown in FIG. 13 as well as the battery temperature sensor 303 if such a sensor is provided. Although shown separately, the charging voltage, current and impedance measurement and charging and discharging regulation unit 314 can be integrated into the control unit 304.

Once the battery core temperature has reached a safe charging level, the battery can then be charged using a DC current or any other currently available technique for example with or without charging pulses, etc., that are well known in the art and are used for efficient and safe charging of Lithium ion batteries. Any one of the well-known methods for safeguarding the discharging process may also be employed. Similarly, different hardware designs are also well known in the art and may be used in the design of the charging and discharging circuitry of this and the following embodiments after the aforementioned safe core temperature levels (measured directly or via the aforementioned impedance related techniques) have been reached for charging the battery and when the desired core temperature (measured directly or via the aforementioned impedance related techniques) has been reached for efficient discharge (usually in terms of fast discharge rates and lower internal losses which are higher at low temperatures).

Figure 14:
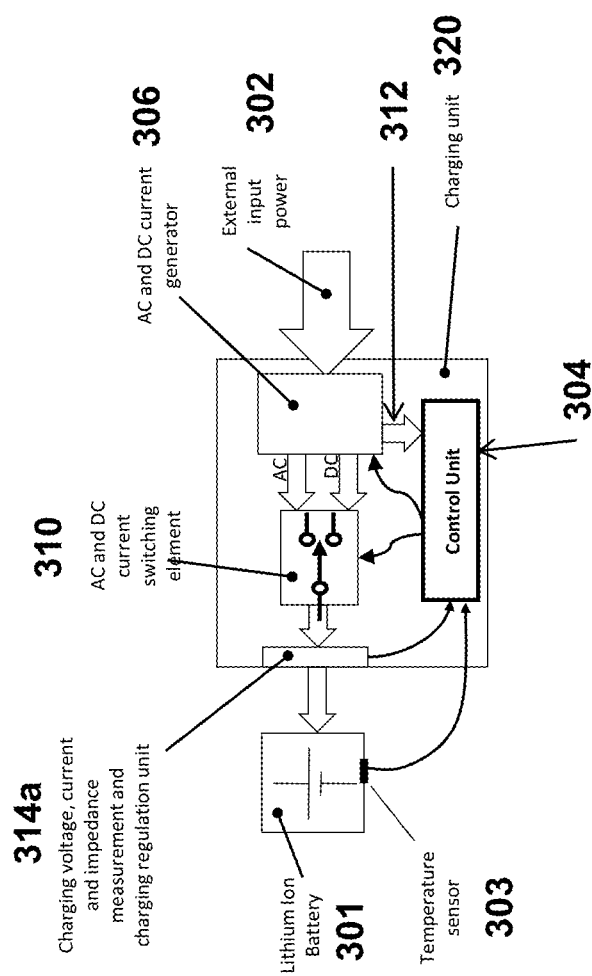
FIG. 14 illustrates a block diagram of an alternative embodiment of a processor controlled lithium ion battery charging and discharging unit for low temperature of FIG. 13 for use only as a lithium ion battery charging unit for all temperatures including at low temperatures.

A block diagram of an alternative embodiment of a microprocessor controlled lithium ion battery charging and discharging unit 320 for low temperatures is shown in FIG. 14. The embodiment 320 is intended for use as the means for just charging Lithium ion batteries at all temperatures including at low temperatures when the battery core temperature is below its safe charging temperature level. All components of the embodiment 320 are the same as those of the embodiment 300 of FIG. 13 except that in the embodiment 320, the charging voltage, current and impedance measurement and charging and discharging regulation unit 314a is modified to eliminate its discharging regulation function. The Lithium ion charging unit 320 functions as previously described to charge the battery using a DC current (continuous or pulsed or other variations known in the art or the like) while the battery core temperature is above its safe charging temperature as measured using one or more of the previously described methods. If the battery core temperature is determined to be below or approaching the battery safe charging temperature, then the charging DC current is disconnected and the high frequency AC current is applied as was previously described for the embodiment of FIG. 13 to raise the battery core temperature above its safe charging temperature. The core temperature measurement can be made either continuously or at short enough intervals of time to ensure that the battery core temperature does not drop below its safe charging temperature during its charging.

A block diagram of another alternative embodiment of the microprocessor controlled lithium ion battery charging and discharging unit 340 for low temperatures is shown in FIG.

15. All components of the embodiment 340 are the same as those of the embodiment 300 of FIG. 13 except that in the embodiment 340, the AC and DC current switching element 310 of FIG. 13 is replaced by an AC and DC current mixing element 342. Depending on the detail design of the charging voltage, current and impedance measurement and charging and discharging regulation unit 314b, some routine modifications may be made to its design to accommodate the mixed AC and DC current signals.

Figure 15:
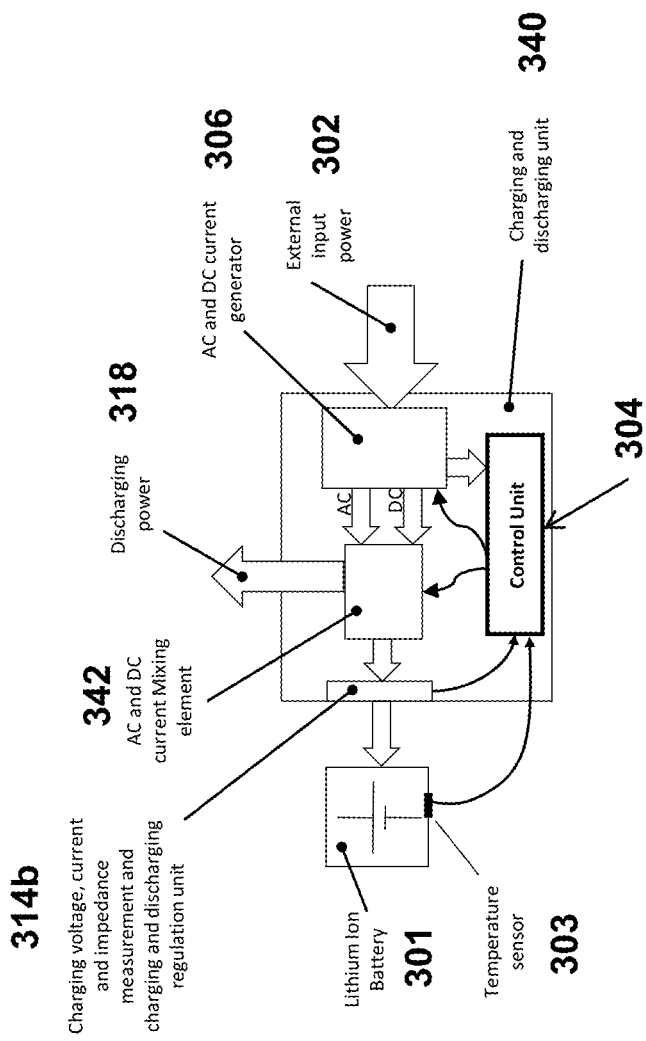
FIG. 15 illustrates a block diagram of an alternative embodiment of a processor controlled lithium ion battery charging and discharging unit for low temperature of FIG. 13 and for maintaining the battery core temperature during charging and discharging processes.

The operation of the microprocessor controlled lithium ion battery charging and discharging unit 340 of FIG. 5 is similar to that of the embodiment 300 of FIG. 13 except for the following. In the embodiment 300 of FIG. 13 and during a battery charging cycle, the unit 300 can either apply a high frequency AC current or a DC current to the battery. During low temperature charging, the unit 300 applied the high frequency AC current until a safe battery core temperature is reached. The charging DC current (continuous or pulsed or other variations known in the art or the like) is then applied to charge the battery 301. In the embodiment 340 of FIG. 15, when the battery core temperature is below its safe charging temperature, the unit will similarly apply a high frequency voltage to the battery to raise its core temperature to a safe charging level. However, the provision of the AC and DC current mixing element allows the embodiment 340 maintain the battery core temperature at a safe charging temperature level when it is detected to be dropping close to the safe charging temperature. Whenever such a condition is detected, by adding the high frequency AC current to the charging DC current, the core temperature is raised above its safe charging temperature. By continuous or frequent measurement of the battery core temperature, the temperature can be maintained above the battery safe charging temperature and be continuously charged. This situation is regularly encountered when the Lithium ion battery is exposed to a very cold environment and particularly if the battery is relatively small and has a geometrical shape in which the ratio of its surface area to volume is relatively high such as in batteries that are relatively thin with large surface areas.

The high frequency AC current may also be applied to the battery 301 during the discharging cycles when the battery core temperature is below or is dropping to levels close to a predetermined optimal level for efficient discharge (usually determined in terms of achievable discharge rates and lower internal losses, which are higher at low temperatures). In this embodiment, the battery core temperature can be measured at least periodically via temperature sensor(s) if provided and/or using the aforementioned impedance related measuring techniques.

Figure 16:
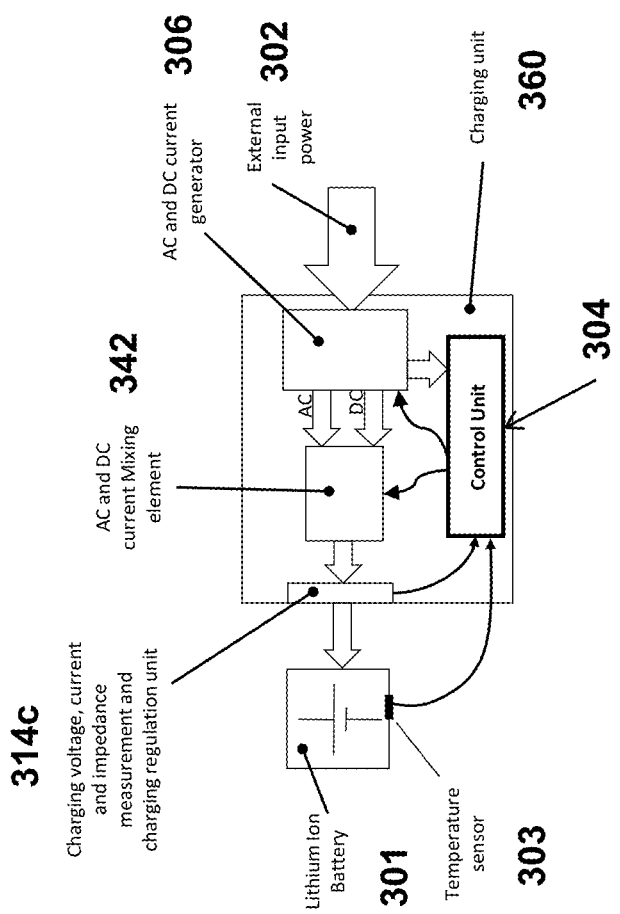
FIG. 16 illustrates a block diagram of an alternative embodiment of a processor controlled lithium ion battery charging and discharging unit for low temperature of FIG. 15 for use only as a Lithium ion battery charging unit for all temperatures including at low temperatures.

A block diagram of an alternative embodiment of the microprocessor controlled lithium ion battery charging and discharging unit 360 for low temperatures is shown in FIG. 16. The embodiment 360 is intended for use as the means for just charging Lithium ion batteries at all temperatures including at low temperatures when the battery core temperature is below its safe charging temperature level. All components of the embodiment 360 are the same as those of the embodiment 340 of FIG. 15 except that in the embodiment 360, the charging voltage, current and impedance measurement and charging and discharging regulation unit 314c is modified to eliminate its discharging regulation function. The Lithium ion charging unit 360 functions as described for the embodiment 340 of FIG. 15 to raise the battery core temperature to a safe charging temperature level, to be followed by charging using a DC current (continuous or pulsed or other variations known in the art or the like) while the battery core temperature is above its safe charging temperature as measured using one or more of the previously described methods. Then whenever the battery core temperature is detected to have dropped to close to its safe charging temperature, the control unit 304 instructs the AC and DC current generator to add a high frequency AC current to the charging DC current, thereby raising the battery core temperature above the safe charging temperature. By continuous or frequent measurement of the battery core temperature, the core temperature can be maintained above the battery safe charging temperature while continuously charging the battery.

Figure 17:
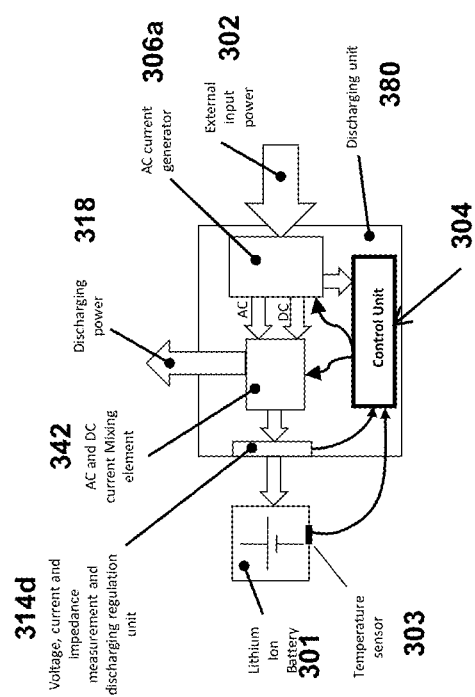
FIG. 17 illustrates a block diagram of another alternative embodiment of a processor controlled lithium ion battery charging and discharging unit for low temperature of FIG. 15 for use to keep the core temperature of a Lithium ion battery above a prescribed temperature for efficient discharging at all temperatures including at low temperatures.

A block diagram of another alternative embodiment of the novel microprocessor controlled lithium ion battery charging and discharging unit 380 for low temperatures is shown in FIG. 17. The embodiment 380 is intended for use as the means for keeping the core temperature of a Lithium ion battery above a prescribed level for efficient discharging at all temperatures including at low temperatures. All components of the embodiment 380 are the same as those of the embodiment 360 of FIG. 15 except that in the embodiment 380, the charging voltage, current and impedance measurement and charging and discharging regulation unit 314d is modified to only provide discharge regulation and voltage, current and battery impedance measurements functionality. While the battery 301 is being used to power certain load, i.e., while electrical energy is being discharged from the battery, the high frequency AC current may also be applied to the battery whenever the battery core temperature is measured to be below or if it is dropping close to levels predetermined to be optimal for efficient battery discharge (usually determined in terms of achievable discharge rates and low internal losses, which are higher at low temperatures). In this embodiment, the battery core temperature can be measured at least periodically via temperature sensor(s) 303 if provided or using the aforementioned impedance related measuring techniques.

In the embodiment 380 of FIG. 17, the high frequency AC current producing generator element 306a is powered from an external source 302. External powering of the AC current generator 306a may be necessary in certain situations, for example when the charged battery core is at such a low temperature that cannot provide enough power to the AC current generator 306a or that it cannot provide enough power to raise the core temperature to the required operating temperature in short enough period of time. If such situations are not expected to be encountered, the AC current generator 306a may be powered directly by the Lithium ion battery 301 itself or after an initial external powering period. The embodiment of FIG. 18 illustrates such a discharging control unit 400 in which the AC current generator 306a of the discharging control unit is powered by the battery 301 itself.

Figure 18:
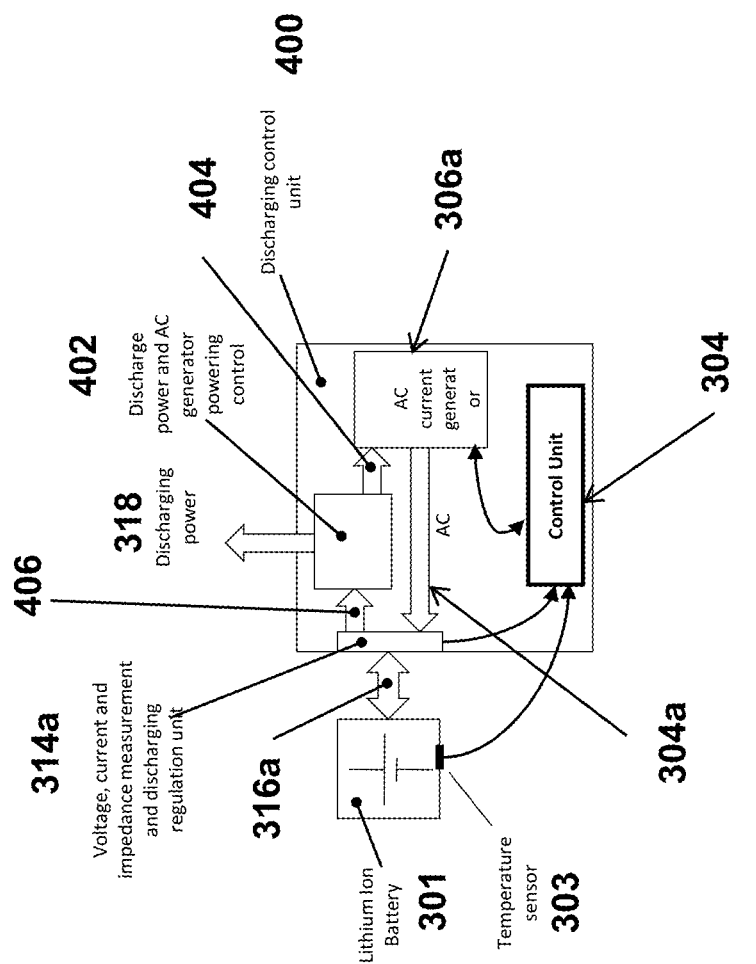
FIG. 18 illustrates a block diagram of an alternative embodiment of a processor controlled lithium ion battery charging and discharging unit for low temperature of FIG. 17 for use to keep the core temperature of a Lithium ion battery above a prescribed temperature for efficient discharging at all temperatures including at low temperatures.

The embodiment 400 shown in FIG. 18 is similar in functionality and design to the embodiment 380 of FIG. 17 except for the source of AC current generator powering. In the embodiment 400, the AC current generator 306a is powered from the device discharge power and AC generator powering control unit 402 as shown by the arrow 404. The AC current generator 306a is in direct communication with the system control unit 304 as shown in FIG. 18. The discharge power and AC generator powering control unit 402 gets its power from the battery via the voltage, current and impedance measurement and discharging regulation unit 314a as indicated by arrow 406. The input and output currents to the battery 301 are via the connection indicated by the two-way arrow 316a. The battery discharge is through the discharge power and AC generator powering control unit 402 as shown by the discharging power arrow 318. The generated AC current is provided to the voltage, current and impedance measurement and discharging regulation unit 314a, which is in communication with the system control unit 304, for increasing the battery core temperature when it is or about to fall below a prescribed temperature level.

Figure 19:
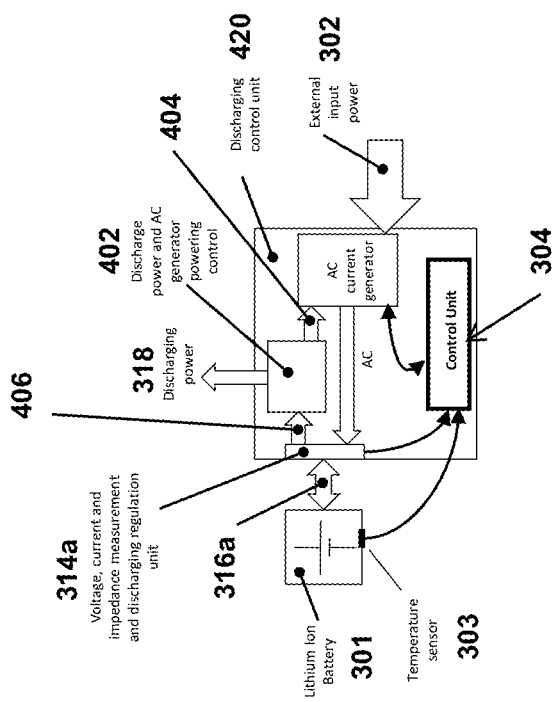
FIG. 19 illustrates a block diagram of an alternative embodiment of a processor controlled lithium ion battery charging and discharging unit for low temperature of FIG. 18 for use to keep the core temperature of a Lithium ion battery above a prescribed temperature for efficient discharging at all temperatures including at low temperatures.

The embodiment 400 of FIG. 18 may also be provided with an external source of powering for its high frequency AC current generator similar to the embodiment 380 of FIG. 17. The device will then have the capability of using the external power source, particularly as an initial source of power to bring the battery core temperature to a prescribed level before switching to an internal mode of powering as shown in the embodiment of FIG. 18. Such a configuration is shown in the embodiment 420 shown in FIG. 19, which is similar in functionality and design to the embodiment 400 of FIG. 18 except for the source powering the AC current generator 306a. In the embodiment 400 of FIG. 18, the AC current generator 306a is only powered by the arrow 404. However, in the embodiment 420 of FIG. 19, the AC current generator 306a also can take energy from the external input power 302, and depending on the situation, select one or both of the power sources to heat the battery 301.

Figure 20:
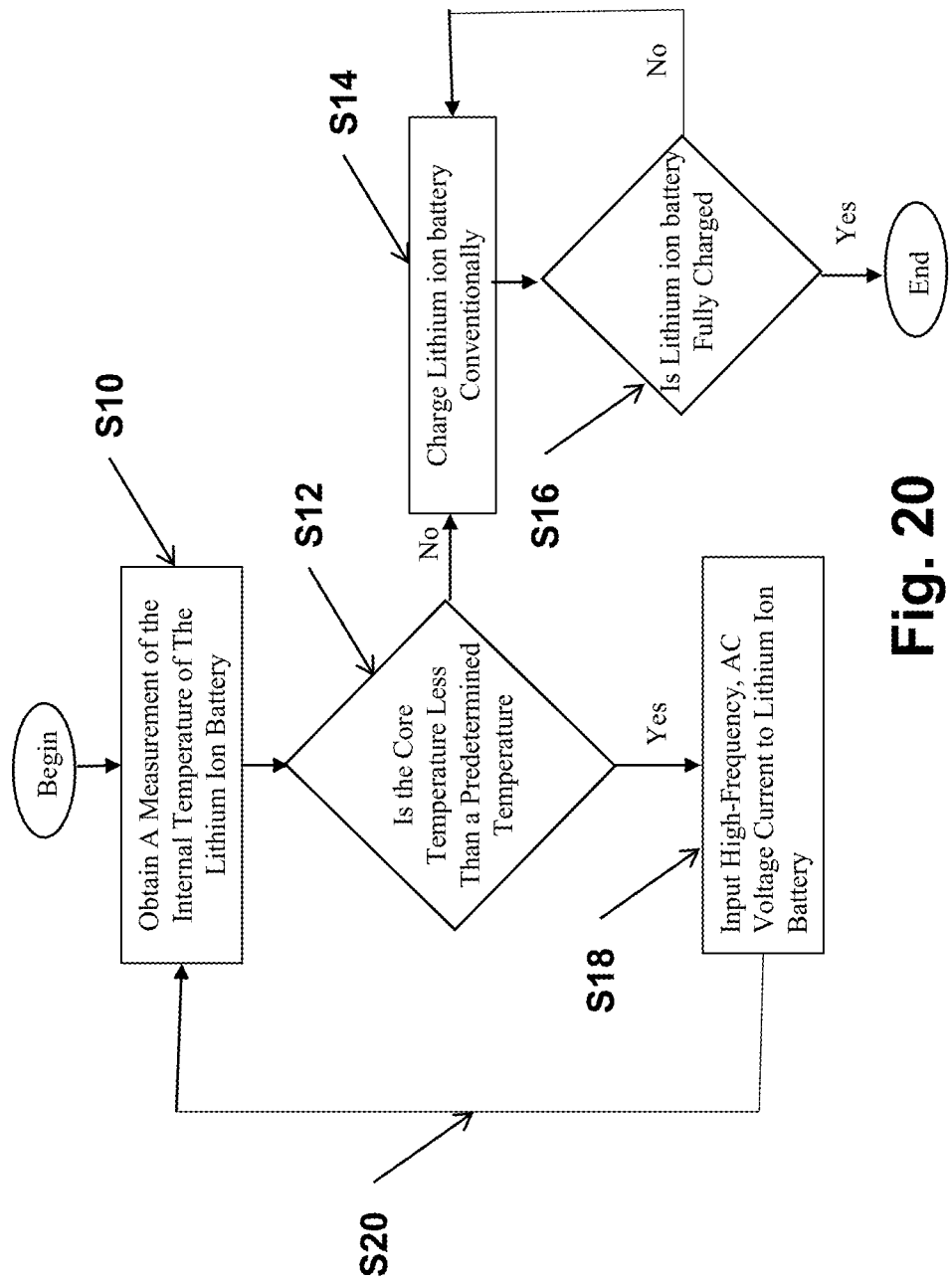
FIG. 20 illustrates a flow chart diagram for charging a lithium ion battery for low temperature by keeping the core temperature of the Lithium ion battery above a prescribed temperature for efficient charging at all temperatures including at low temperatures.
Figure 21:
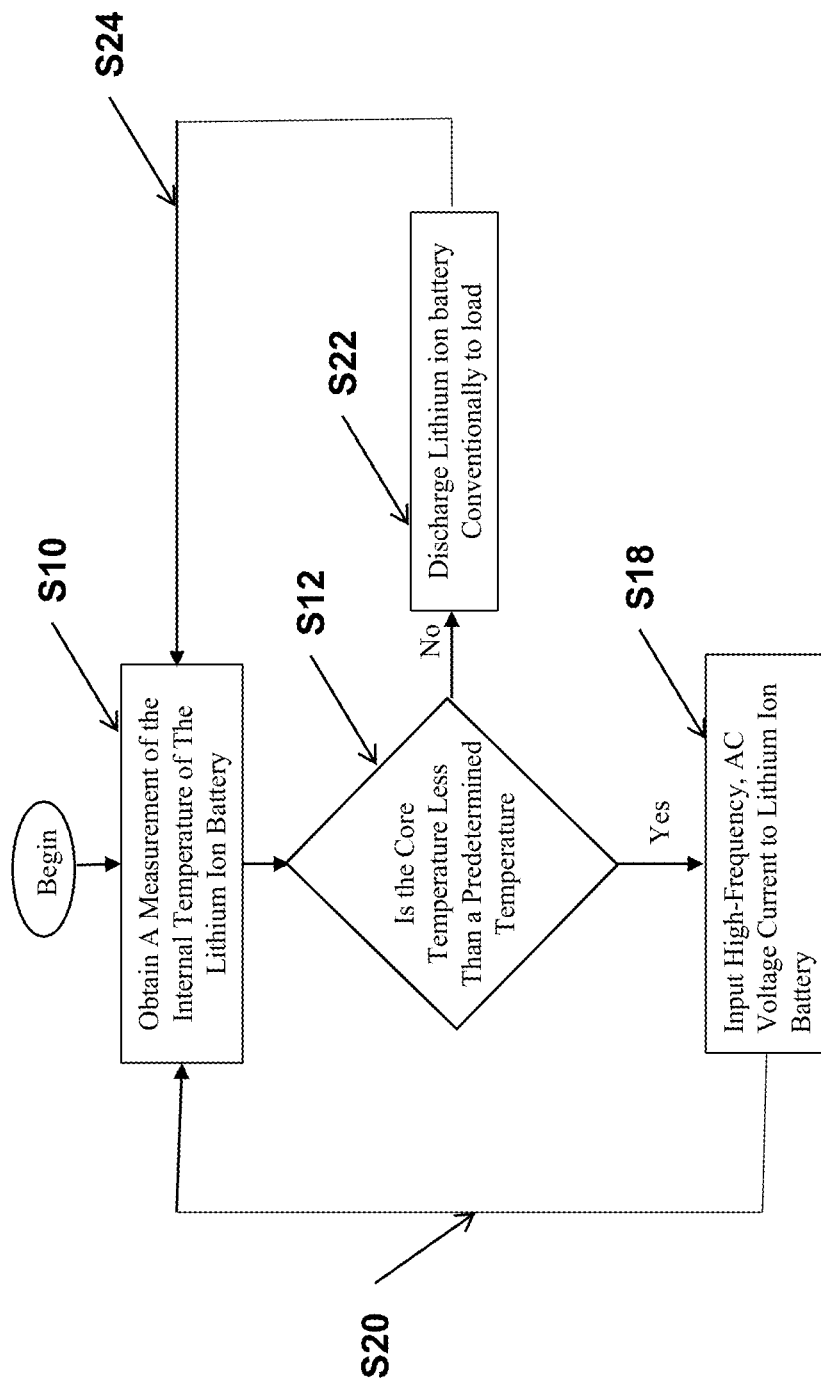
FIG. 21 illustrates a flow chart diagram of discharging a lithium ion battery for low temperature by keeping the core temperature of the Lithium ion battery above a prescribed temperature for efficient discharging at all temperatures including at low temperatures.

FIGS. 20 and 21 show flow charts for charging and discharging a lithium ion battery at any temperature. As discussed above, if it is determined that a battery needs to be charged, a measurement is obtained of the internal temperature of the lithium ion battery at step S10. A determination is then made at step S12 as to whether the obtained temperature is lower than some predetermined threshold temperature at which the battery cannot be charged or cannot be efficiently charged. If such determination at step S12 is no, the method proceeds to steps S14 and S16 to conventionally charge the battery. However, if the determination at step S12 is yes, the method proceeds to step S18 where high frequency AC voltage current is input to the lithium ion battery to heat the interior thereof. Such process can loop back to step S10 along route S20, periodically or at some regular interval until the determination of step S12 is no, at which time the battery is charged conventionally at steps S14 and S16 until fully charged or the process is otherwise terminated. Thus, In FIG. 20, while the battery's core temperature is detected to be lower than a predetermined temperature, to avoid damage the battery, the heating procedure is executed until the core temperature rises high enough.

In FIG. 21, a measurement is made at step S10 to obtain a measurement of the battery internal temperature. Similarly to FIG. 20, if the core temperature is determined to be less than a predetermined temperature at step S12, the battery is input with a high-frequency, AC voltage current at step S18 to heat the interior of the battery. Such process loops back to step S10 via S20 as discussed above with regard to FIG. 20 until the core temperature is determined to be above such predetermined threshold temperature at step S12, at which time the process continues to step S22 to discharge the lithium ion battery conventionally to a load. Thus, as can be seen at loop S24, while the battery's core temperature is low so that the discharging efficiency is dropping, the heating procedure is also executed until the core temperature rises above the predetermined temperature. Thus, the discharging at step S22 is not be interrupted during the heating procedure at step S18.

In both FIGS. 20 and 21, the alternative steps discussed above for determining whether the battery core has too low a temperature (without the use of a temperature sensor) and cannot be charged conventionally can also be used, in which case step S12 determines whether the core temperature is too cold based on such determinations and not on a direct temperature measurement. Of course, both determinations can be used and the method can include logic for making the determination in step S12 based on multiple inputs (e.g., its temperature measurement, the battery impedance as described above with regard to the first method and/or the voltage across a small load with regard to the second method discussed above).

It is appreciated by those skilled in the art that numerous variations of the described designs shown by the block diagrams of FIGS. 13-19 are also possible for performing the indicated functions. The disclosure of the indicated embodiments by no means is intended to limit their implementation only in the described manner, rather to demonstrate the various combinations of functionalities that can be incorporated in a given design and their general purpose.

It is also appreciated that the means of controlling the operation of the disclosed embodiments can be with the use of a microprocessor based control unit. However, it is also appreciated that that the general functions performed by the microprocessor may also be performed by appropriate electronics and logic circuitry. Similar circuitry designs have been developed for the control of various processes in the industry and commercially and may be designed for the control of the disclosed Lithium ion battery charging and discharging devices for all temperature operation including low temperature operation.

Lastly, any of the above methods can be practiced without the initial determination of the core temperature of the energy storage device. That is, a conventional charging input can be used regardless of the temperature of the energy storage device's core and such determination can be made while the charging input is being applied. In this case, the core temperature determination can be made periodically and if the temperature of the core is obtained (directly measured or assumed) is below the predetermined threshold that would hinder further charging or approaching within some limit of the predetermined threshold, the alternative inputs discussed above for heating the internal components of the energy storage device can be superimposed over the charging input or the charging input can be stopped and the alternative input applied until the charging input can be resumed, such as when the predetermined threshold is reached. The same can also be for the discharging methods discussed above.

Figure 22:
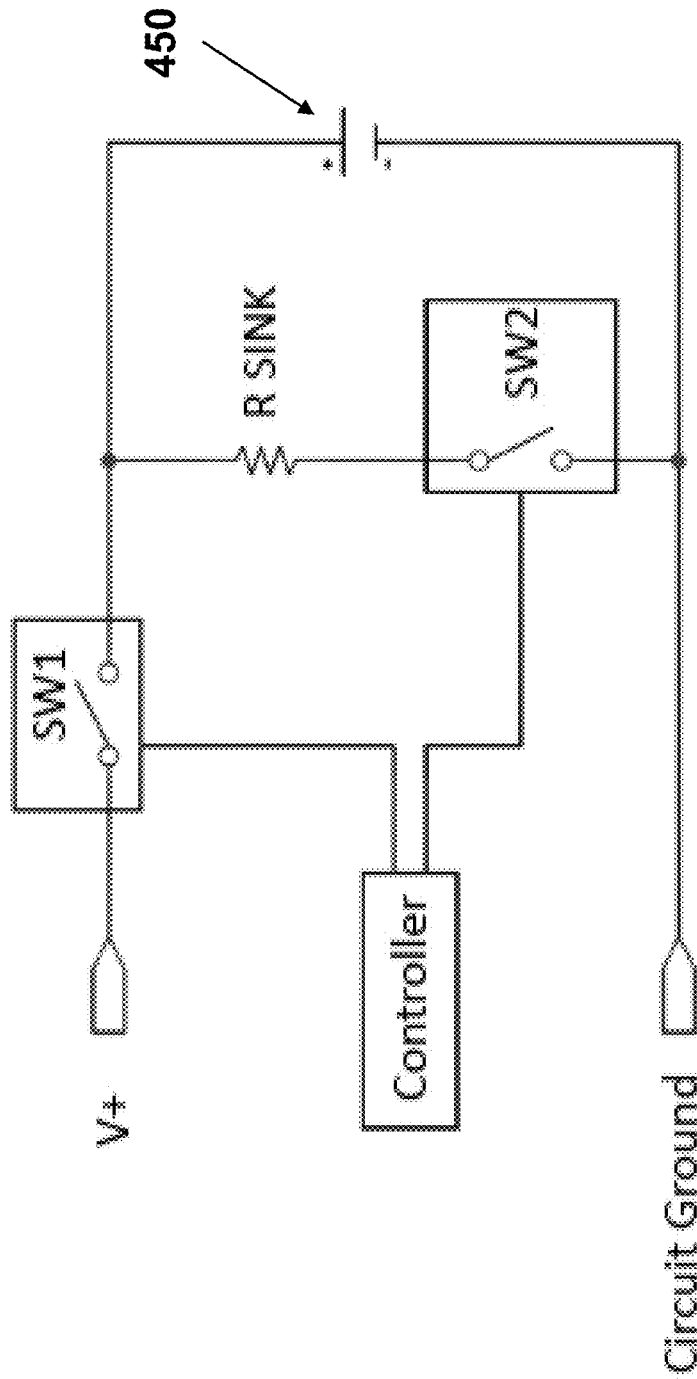
FIG. 22 illustrates a circuit diagram of an embodiment of a heating circuit for a battery or energy storage device.
Figure 23:
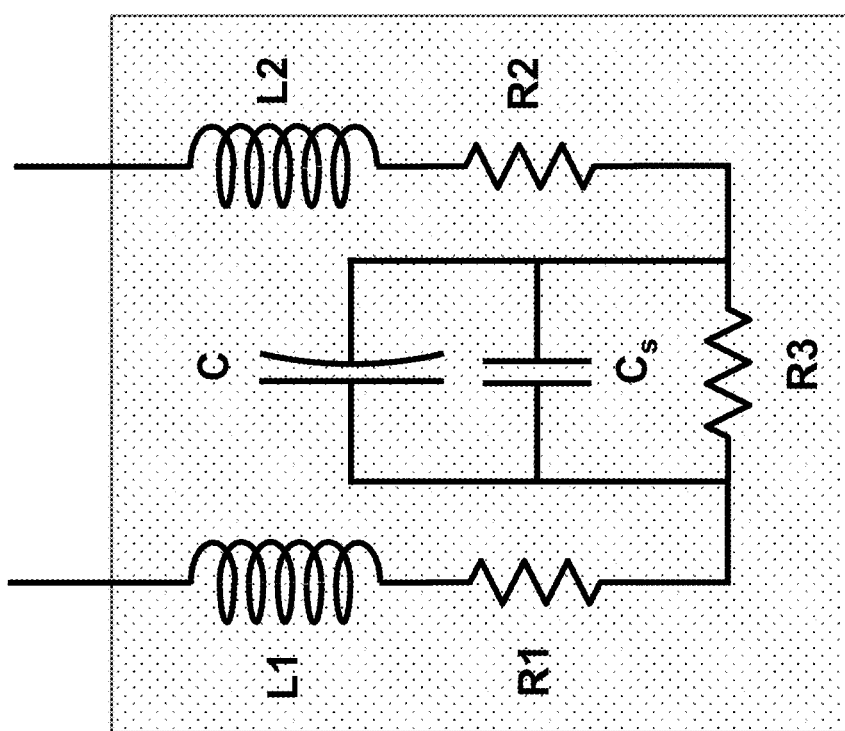
FIG. 23 is a schematic model of a supercapacitor having additional detail as compared to the model of FIG. 1.

FIG. 22 illustrates the diagram of one embodiment of a heating circuit for a battery or energy storage device 450, such as a Lithium-ion battery or nickel metal hydride battery or lead-acid battery or other rechargeable or non-rechargeable battery, and for super-capacitors of various types. In the diagram of FIG. 22, the device 450 is shown as a single battery, however, it may also be a super-capacitor or more than one serially or in parallel connected batteries or super-capacitors.

As can be seen in FIG. 22, an external power source is used to apply a positive current flow (indicated by the positive voltage V+) into the battery 450 through the switch "SW1". A resistor "R SINK" is used to draw current from the battery through the switch "SW2". The signal for opening and closing the switches SW1 and SW2 are provided by the controller.

In this embodiment, the previously described high frequency AC voltage that is applied to the battery 450 to heat its electrolyte is provided by the proper on/off switching of the switches SW1 and SW2 as follows. The process consists of applying a current into and drawing current out of the battery at the desired (high enough) frequency, to effectively short the equivalent capacitor $C_s$ (FIG. 11) in the case of the Lithium-ion batteries as described by the model of FIG. 11, and the equivalent capacitance between the electrodes of other types of batteries and for the super-capacitors. For the super-capacitors, the model of FIG. 1 may be made more detailed by separating the overall capacitance C of FIG. 1 into a capacitor C, which essentially describes the electrical energy that is stored as chemical energy, and a parallel capacitor $C_s$, which essentially indicates the capacitance between the device electrodes.

In the above process of passing a high frequency AC current through the battery 450, FIG. 21, when the switch SW1 is closed, the switch SW2 is opened and vice versa. The switching signals to enable or disable the SW1 and SW2 are sent by the controller. The controller can be a circuit based on a microcontroller, a combinational logic circuit, a FPGA or the like. The current flow into the battery during the positive cycle is controlled by varying the voltage level of the voltage source "V+". By increasing the level of voltage "V+" would increase the current flow into the battery 450. The amount of voltage drops and current flow from the battery is controlled by changing the resistance value of "R SINK", i.e., by reducing the resistance of the resistor "R SINK", the current flow out of the battery 450 is increased. It is therefore appreciated by those skilled in the art that the resulting effective high frequency AC voltage becomes close to a square wave. In general, the voltage level "V+" needs to be balanced to get a nearly the same charge and discharge from the battery during each cycle of the AC voltage application. In addition, and as described later in this disclosure, since the battery characteristics changes with temperature, the provided controller is desired to vary the characteristics of the said AC voltage application for optimal rate of heating of the battery.

Figure 24:
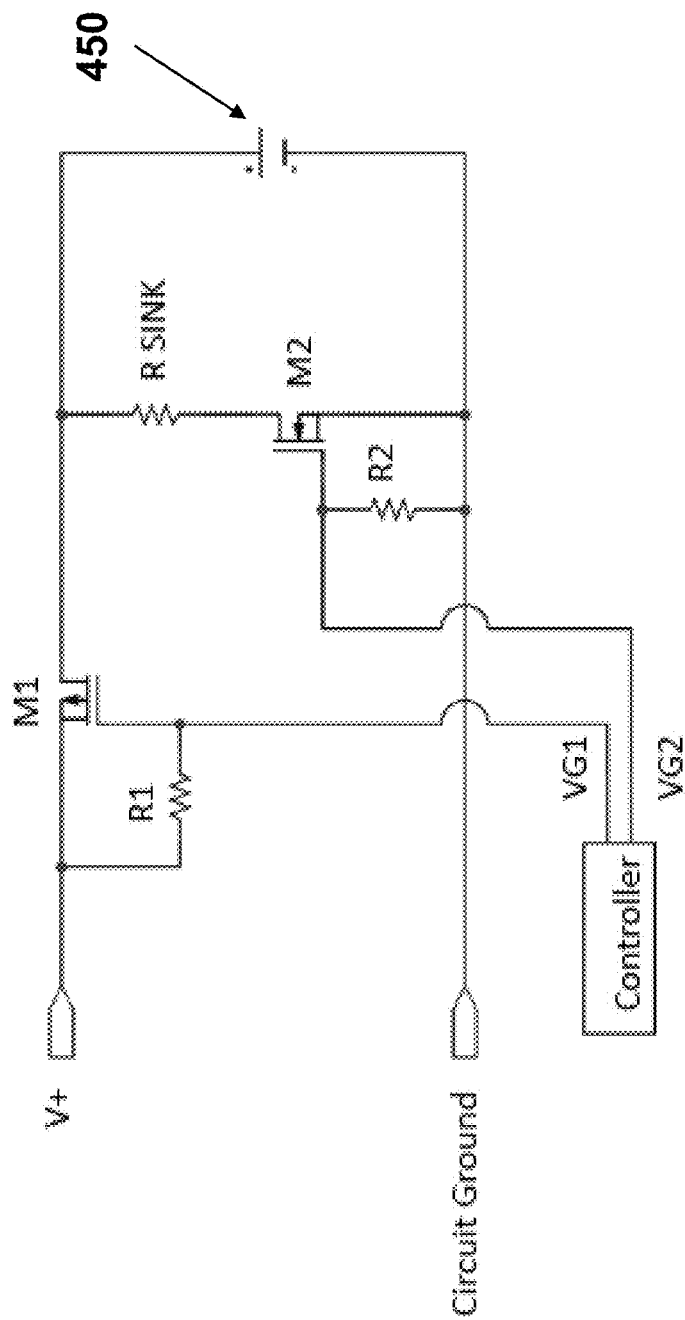
FIG. 24 illustrates a circuit diagram implementation of the embodiment of the battery heating circuit of FIG. 22.

FIG. 24 illustrates a circuit diagram implementation of the embodiment of the battery heating circuit of FIG. 22. In the circuit of FIG. 22, the switch SW1 is implemented by a P-Channel MOSFET "M1" and the switch SW2 is implemented by an N-Channel MOSFET "M2". The resistors R1 and R2 are pull-up and pull-down resistors required to properly bias the gate input of the MOSFETs. The MOSFET M1 acts as a closed switch while M2 acts as an open switch when the voltage level of the control signal VG1 and VG2 are both at 0 V. The MOSFET M1 acts an open switch while M2 acts as a closed switch when the voltage level of the control signal VG1 is above the gate-source threshold voltage of M1 and VG2 is above the gate-source threshold voltage of M2. To disable both switches when the heating circuit is not used, VG1 is set to above the gate-source threshold voltage of M1 and VGS is set to be 0 V. Alternatively, disconnecting the circuit from the voltage source V+ can also disable the switches.

It is appreciated by those skilled in the art that the implementation of the circuit diagram of FIG. 22 as shown in FIG. 24 is not unique and that many other circuits that with the same functionality may be designed and that the circuit example of FIG. 24 is not intended to exclude any other circuits that can provide the same functionality.

Figure 25:
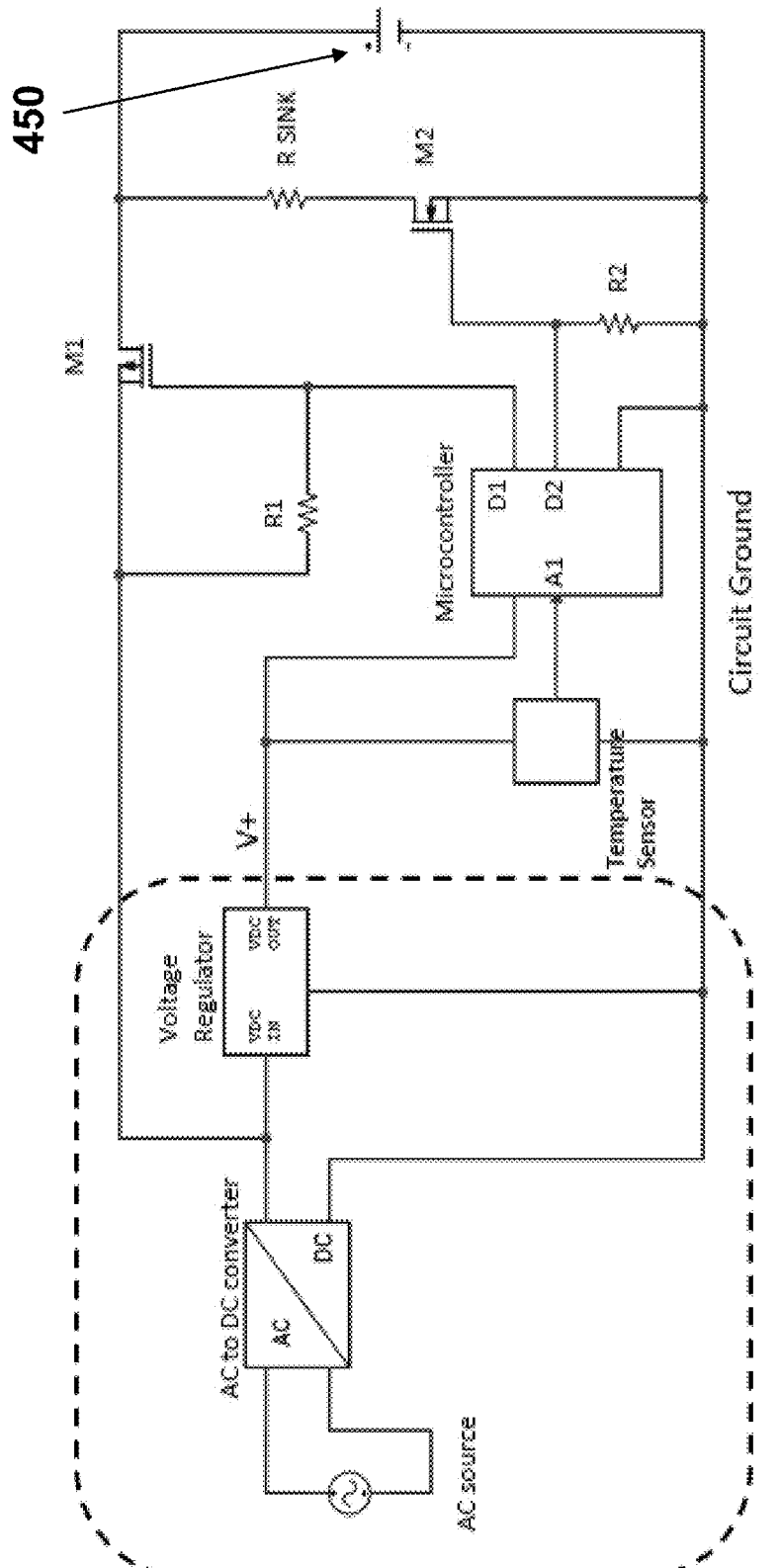
FIG. 25 illustrates a circuit diagram of the embodiment of the battery heating circuit of FIG. 22 with a battery temperature sensor and controller that activates the battery heating circuit when a prescribed low temperature threshold is detected.

FIG. 25 illustrates a circuit diagram of the embodiment of FIG. 24 with a provided controller that uses a temperature sensor input to activate the battery heating circuitry when a prescribed low temperature threshold is detected. The device is shown to be provided with a temperature sensor, which is used to detect the battery temperature. The controller consists of a microcontroller. The outputs voltage level of the temperature sensor is usually designed to be proportional to the battery temperature being measured. The microcontroller monitors the output voltage of the temperature sensor using one of the internal ADC channels "A1", FIG. 25. When the temperature voltage output is below a certain preset threshold value, the microcontroller applies the driving signals to M1 and M2 as was previously described for the embodiment of FIG. 24, therefore initiating the battery heating process. The driving signals are sent to the gate terminals of M1 and M2 though two digital output pins D1 and D2 respectively. The microcontroller by be programmed to change the switching frequency of M1 and M2, i.e., the frequency of the heating current), depending on the measured battery temperatures as described later in this disclosure.

The temperature sensor can be a low-voltage temperature sensor IC such as the TMP35, a thermocouple module, a Resistance Temperature Detector (RTD) or a thermistor. The battery temperature is generally measured at the battery surface, in which case during the described heating process, the battery core temperature is generally higher than the measured surface temperature. For relatively small batteries, e.g., those with a diameter of up to 1 inch, the difference may not introduce any issue since the difference may be only a few degrees C., and the temperature threshold for low temperature may be set a few degrees lower than the desired threshold to account for this difference. Alternatively, particularly for larger batteries and super-capacitors, a thermal model of the battery may be used together with the time history of the heating energy input into the battery to estimate average (or peak high or low) internal temperature of the battery core and use that for setting the said controller low temperature threshold for switching the heating circuit on and off. Thermal modeling of batteries and super-capacitors are well known in the art and for the present embodiments only a very simplified model would generally suffice. A modeling technique that is specifically tailored for use in Lithium-ion and other similar batteries and in super-capacitors is described later in this disclosure.

It is appreciated by those skilled in the art that the usual practice for temperature threshold setting would be to set a range of temperature, below which heating process is turned on and above which it is turned off.

When an outside AC power source is used to power the circuit of FIG. 24 or 25, an AC to DC converter and voltage regulator shown in the dashed line box in FIG. 25 may be used to supply the voltage V+ to the circuit of FIG. 24 and as well as for powering the microcontroller and temperature sensor for the circuit of FIG. 25. The AC to DC converter and the voltage regulator may be integrated into the same circuit board with the rest of the components of the circuits or may be designed as an external component.

Figure 26:
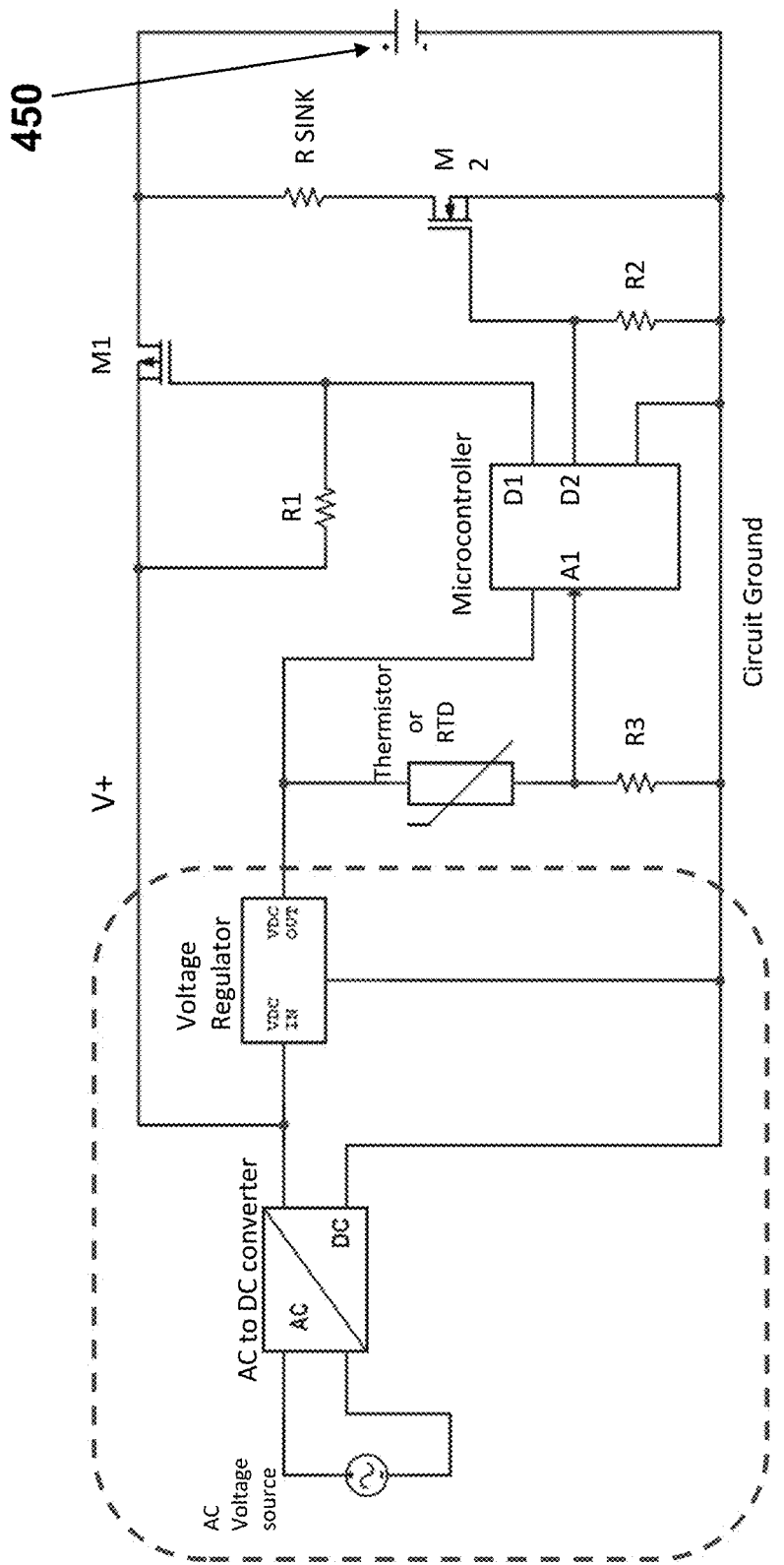
FIG. 26 illustrates an alternative circuit diagram of the embodiment of the battery heating circuit of FIG. 25.

FIG. 26 illustrates the circuit diagram shown in FIG. 25 with the temperature sensor implemented by using a thermistor or an RTD. The thermistor can be either an NTC or a PTC type thermistor. The thermistor and the RTD resistance are proportional to the temperature. Therefore, the resistor R3 in series with either a thermistor or an RTD forms a voltage divider. The voltage measured by the microcontroller ADC channel A1 is therefore proportional to the temperature measured. The resistance value of R3 can be adjusted for different sensitivity.

Figure 27:
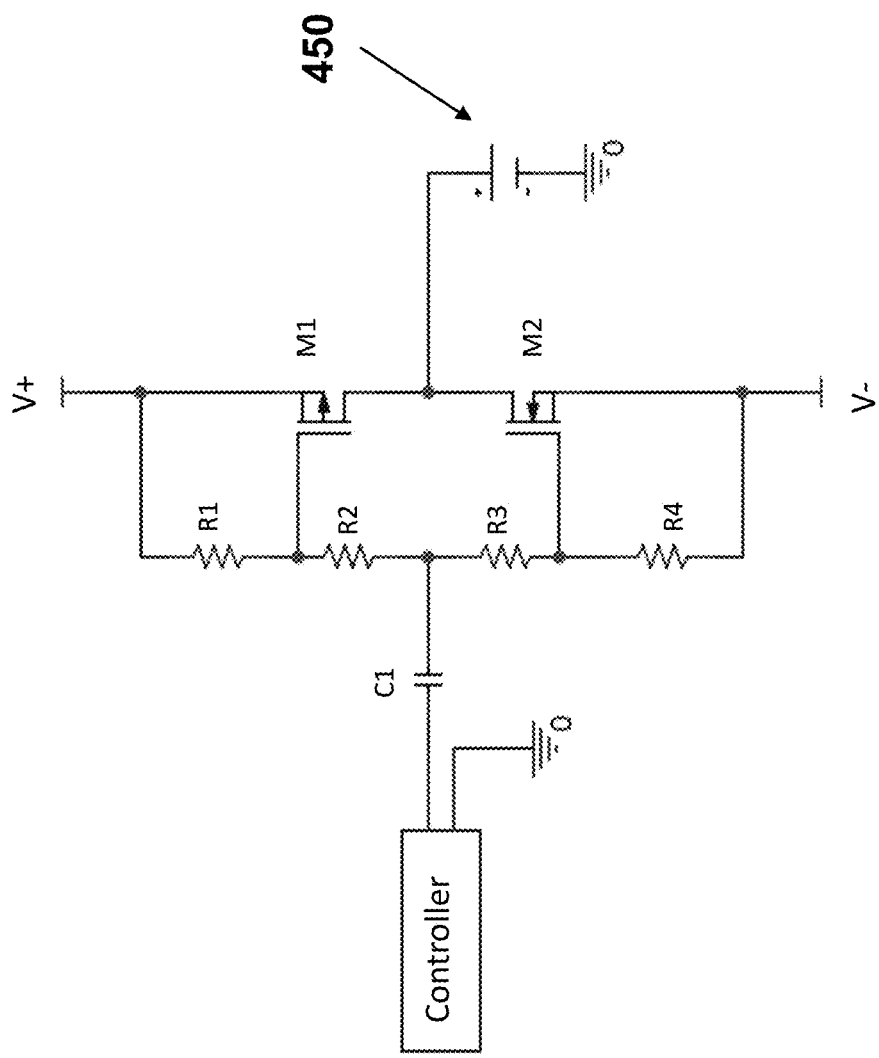
FIG. 27 illustrates the circuit diagram of another embodiment of a battery heating circuit.

FIG. 27 illustrates another embodiment of a battery heating circuit utilizing dual polarity power supplies V+ and V− to apply both positive and negative current flow into the battery. When the P-Channel MOSFET M1 is enabled while the N-Channel MOSFET M2 is disabled, the positive voltage source V+ is connected to the positive terminal of the battery and the current flows from the source into the battery.

The voltage level of V+ must be larger than the voltage across the battery. When M2 is enabled while M1 is disabled, the negative voltage source V− is connected to the positive terminal of the battery and the current flows from the battery into the source. The voltage level of V− is preferably lower than the voltage across the battery to balance the current flow. Resistors R1 and R4 are used to ensure the M1 and M2 are both disabled when the control signal voltage is 0 V. Resistors R2 and R3 can be used to adjust the output DC offset voltage value. The control signal from the controller is AC coupled through a capacitor C1. When the control signal voltage is positive, M2 is enabled and M1 is disabled. When the control signal voltage is negative, M1 is enabled and M2 is disabled.

Figure 28:
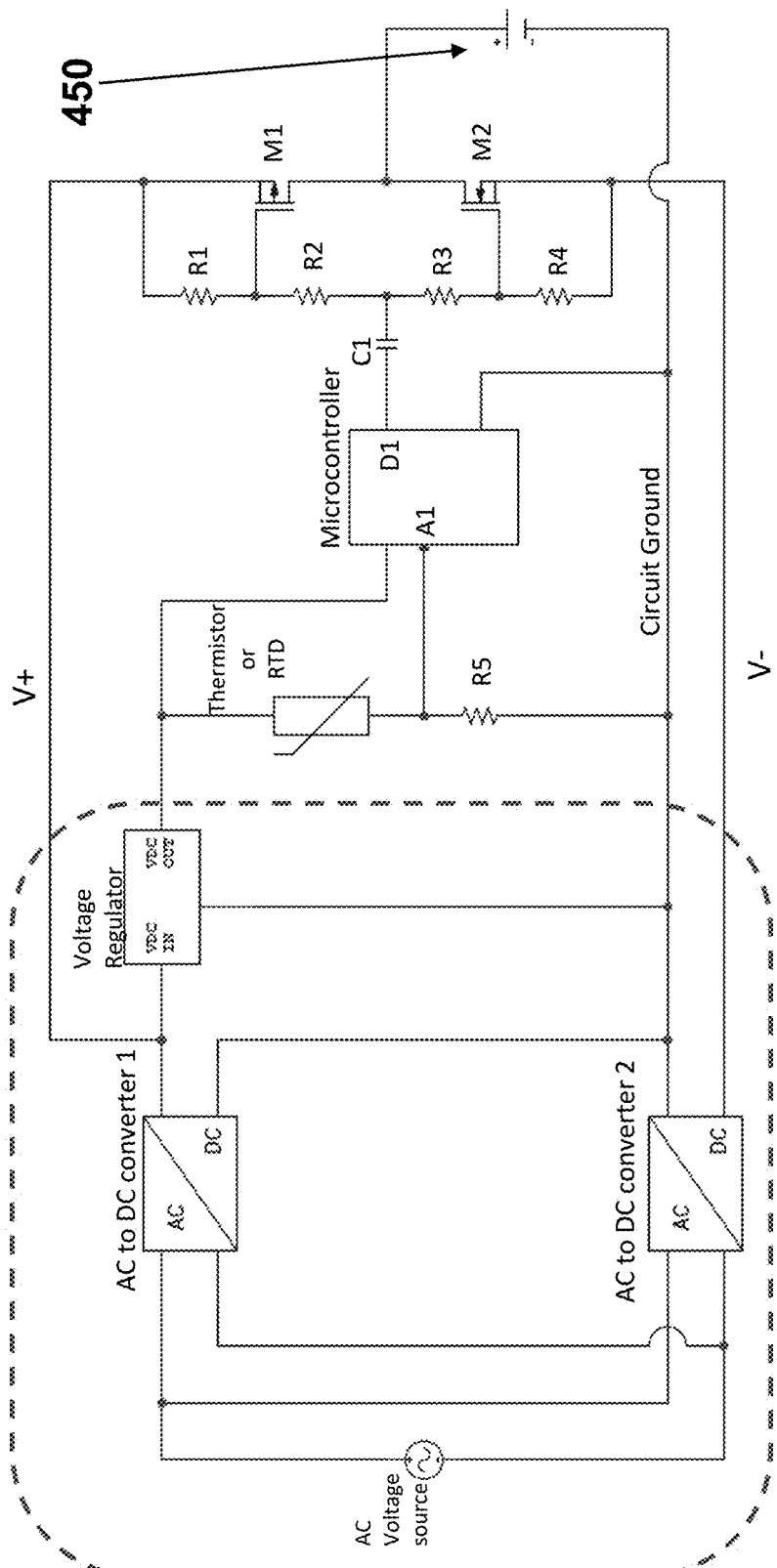
FIG. 28 illustrates a circuit diagram of the embodiment of the battery heating circuit of FIG. 27 with a battery temperature sensor and controller that activates a battery heating circuit when a prescribed low temperature threshold is detected.

FIG. 28 illustrates a circuit diagram of the controller with the circuit diagram shown in FIG. 27. The controller consists of a temperature sensor and a microcontroller. The temperature sensor is used to monitor the temperature of the battery 450, which to be heated if below a prescribed temperature threshold. The outputs voltage level of the temperature sensor is proportional to the battery temperature. The temperature sensor can be a low-voltage temperature sensor IC such as the TMP35, a thermocouple module, a Resistance Temperature Detector (RTD) or a thermistor. The microcontroller monitors the output voltage of the temperature sensor using one of the internal ADC channels "A1". When the temperature voltage output is below a certain preset threshold value, the microcontroller applies the control signals to M1 and M2, therefore, initiating the heating process as was previously described. The control signals are sent to the gate terminals of M1 and M2 though digital output pin D1. The AC coupled through the capacitor C1 allows control signal voltage level at the gate terminal of M1 and M2 to be both positive and negative while the digital pin D1 outputs a voltage value between 0 V and a positive preset value. The microcontroller can change the switching frequency of M1 and M2 at different battery temperatures if as is described later, particularly when the battery is intended to operate at very low temperatures, e.g., below −40 degrees C. The AC to DC converters 1 and 2 are used to supply the positive and negative voltage source for the heating process, as well as for powering the microcontroller and temperature sensor though a voltage regulator. The AC to DC converters and the voltage regulator can be integrated into the same circuit board with the rest of the components or they can be external components.

Figure 29:
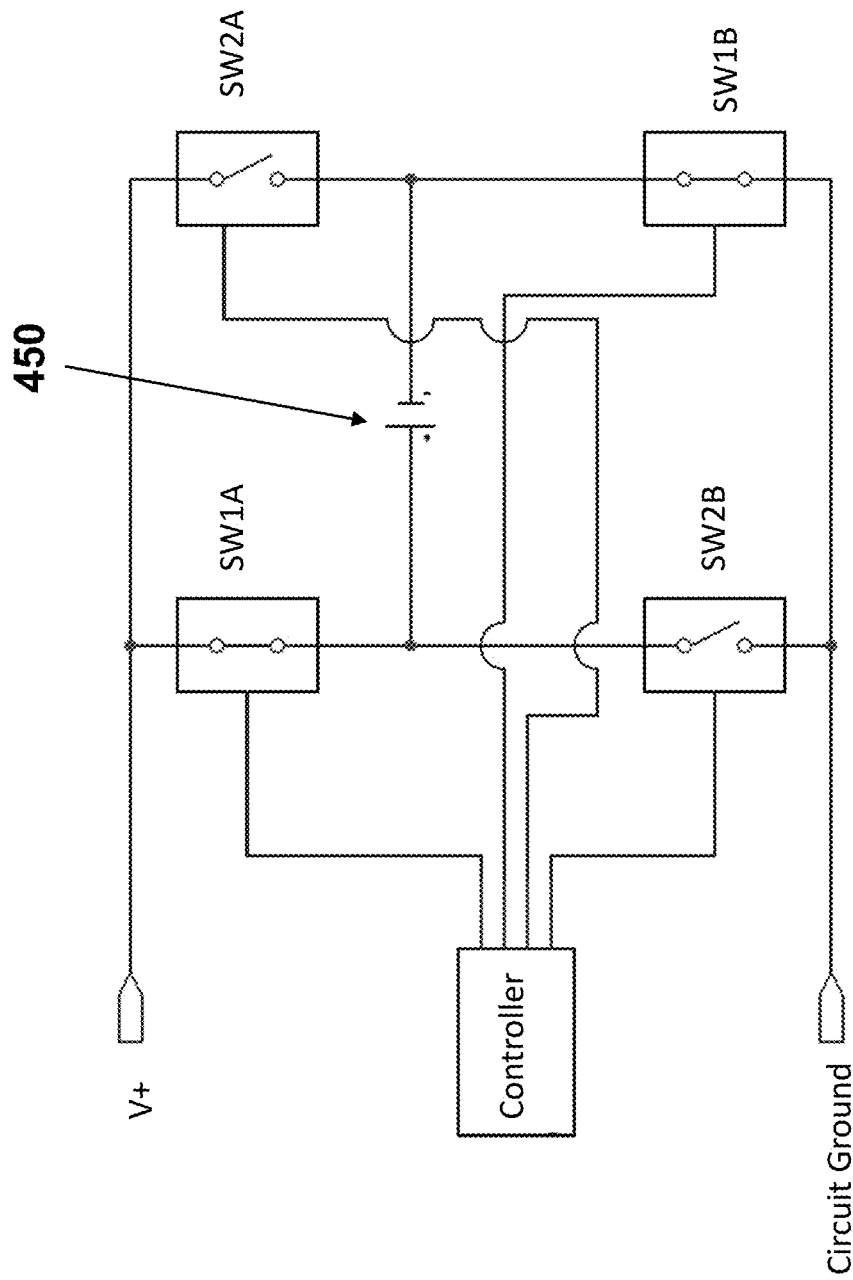
FIG. 29 illustrates a circuit diagram of another embodiment of a battery heating circuit.

FIG. 29 illustrates the block diagram of another embodiment of the battery 450 heating circuit utilizing a single power supply to apply both positive and negative current flow into the battery 450. Four switches SW1A, SW1B, SW2A and SW2B are used for this purpose. The switches can be implemented by relays, semiconductor switch ICs or MOSFETs. When SW1A and SW1B are closed while SW2A and SW2B are open, the positive voltage source V+ is connected to the positive terminal of the battery 450 while the circuit ground is connected to the negative terminal of the said battery. The current then flows from the source into the battery 450. When SW2A and SW2B are closed while SW1A and SW1B are open, the positive voltage source V+ is connected to the negative terminal of the battery 450, while the circuit ground is connected to the positive terminal of the said battery. Then the current flows from the battery 450 into the source. The voltage level V+ is preferably larger than the voltage across the battery 450. A controller is used to drive all four switches at the proper sequence and frequency.

Figure 30:
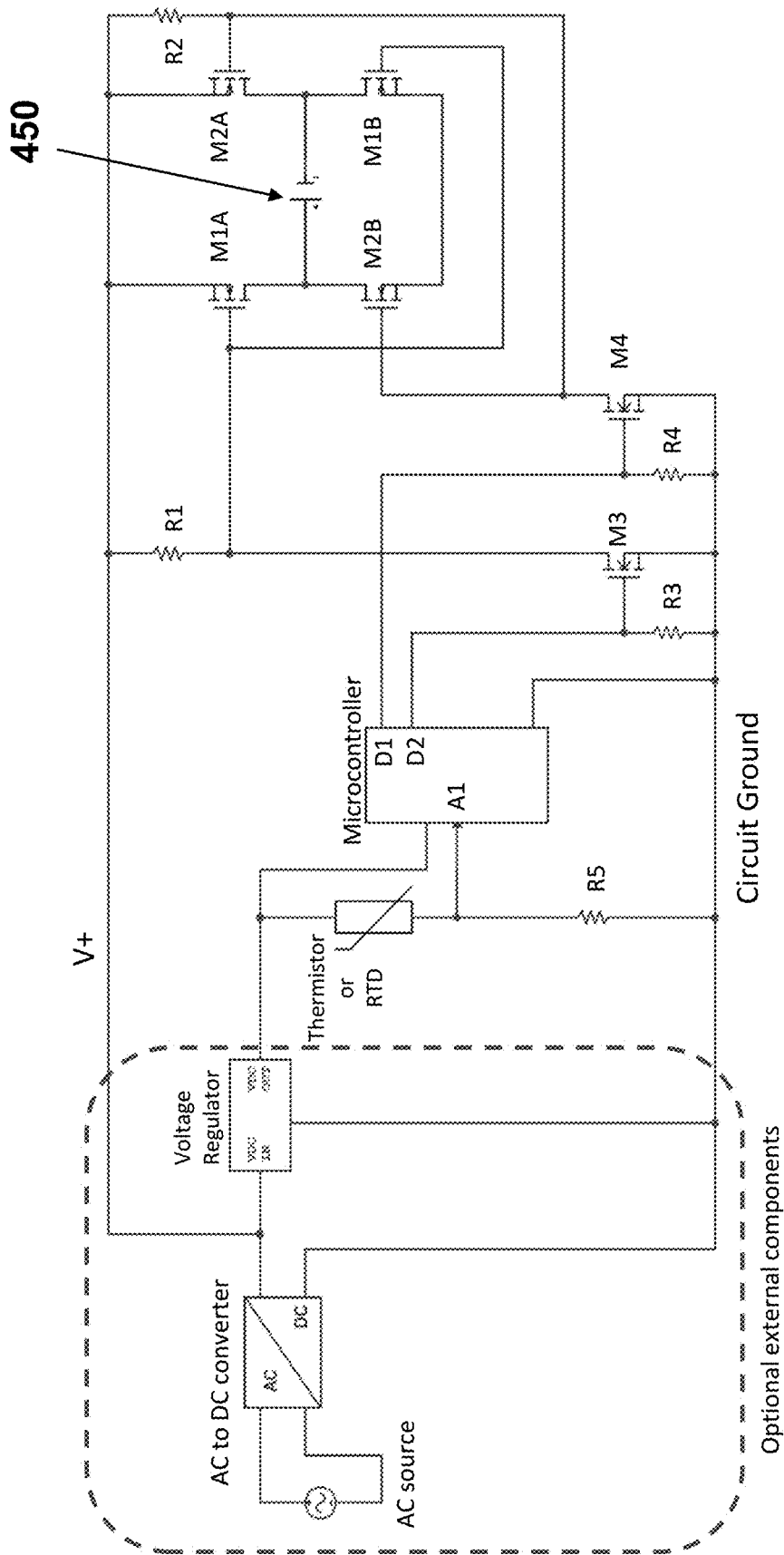
FIG. 30 illustrates a circuit diagram of the embodiment of the battery heating circuit of FIG. 29 with a battery temperature sensor and controller that activates a battery heating circuit when a prescribed low temperature threshold is detected.

FIG. 30 illustrates a circuit diagram of the battery heating controller with the circuit of the embodiment of FIG. 29. The switches are implemented by MOSFETs M1A, M1B, M2A and M2B representing SW1A, SW1B, SW2A and SW2B, respectively. The controller is a microcontroller and is provided with a temperature sensor. The temperature sensor is used to monitor the temperature of the battery 450. The outputs voltage level of the temperature sensor is proportional to the battery temperature. The temperature sensor can be a low-voltage temperature sensor IC such as the TMP35, a thermocouple module, a Resistance Temperature Detector (RTD) or a thermistor. The microcontroller monitors the output voltage of the temperature sensor using one of the internal ADC channels "A1". When the temperature voltage output is below the prescribed threshold value, the microcontroller initiates the battery heating process by applying the control signals from digital pins D1 and D2 to the MOSFETs through a driver circuit consists of Resistor R1 to R4, MOSFET M3 and M4. The driver circuit ensures the M1A, M1B, M2A and M2B can be completely driven into cut-off mode (open) or saturation mode (closed) regardless of the difference voltage level between the control signals voltage and the source voltage of V+. When digital pin D1 is at logic high while D2 is at logic low, M1A and M1B act as closed switches while M2A and M2B act as open switches. Therefore, current flows from the source into the battery 450. When digital pin D1 is at logic low while D2 is at logic high, M1A and M1B act as open switches while M2A and M2B act as closed switches. Therefore, current flows from the battery 450 into the source. The frequency of the switching, i.e., the frequency of the applied current (AC heating current) is therefore set and controlled by the controller and may be varying as a function of the battery temperature as is described later in the disclosure. An AC to DC converter is used to supply the voltage source for the heating process, as well as for powering the microcontroller and temperature sensor though a voltage regulator. The AC to DC converter and the voltage regulator can be integrated into the same circuit board with the rest of the components or they can be external components.

Figure 31:
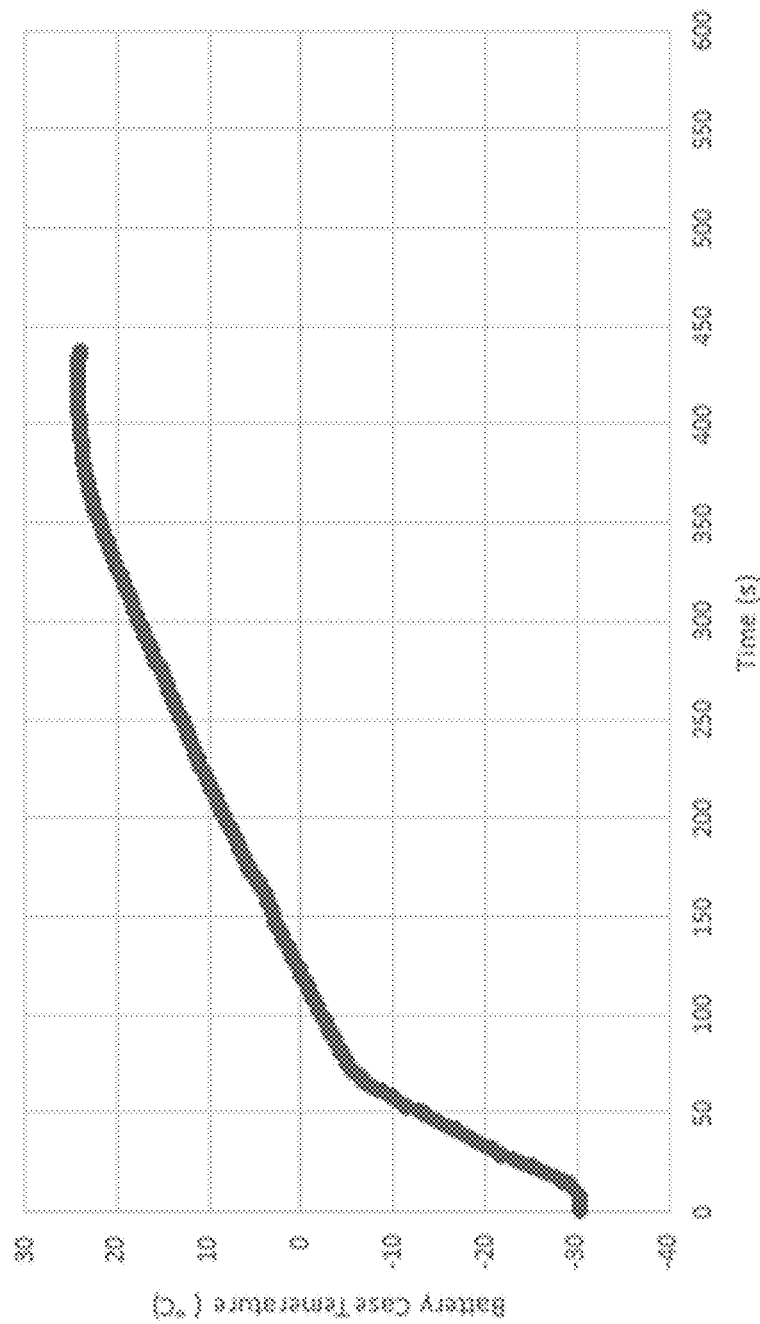
FIG. 31 illustrates a plot of a Li-ion battery heating as a function of time from a temperature of −30 deg. C. to 20 deg. C. using the heating circuit of embodiment of 27.

FIG. 31 shows an example of increasing the temperature of a standard model 18650 cell Li-ion battery, as measured on the outside surface of the battery, while it was heated from −30° C. to 20° C. using a circuit based on the design shown in FIG. 27. The battery part number is LGABB418650.

As was previously described in this disclosure, the internal resistance and inductance of Li-ion based batteries and in fact all rechargeable and primary batteries and super-capacitors vary by temperature, with the changes becoming very significant at lower temperatures. As an example, FIGS. 32 and 33 are the plots of measured internal resistance and internal inductance of a standard 18650 cell Li-ion battery (battery part number is LGABB418650), respectively, in the temperature range of −55° C. to 45° C.

Figure 32:
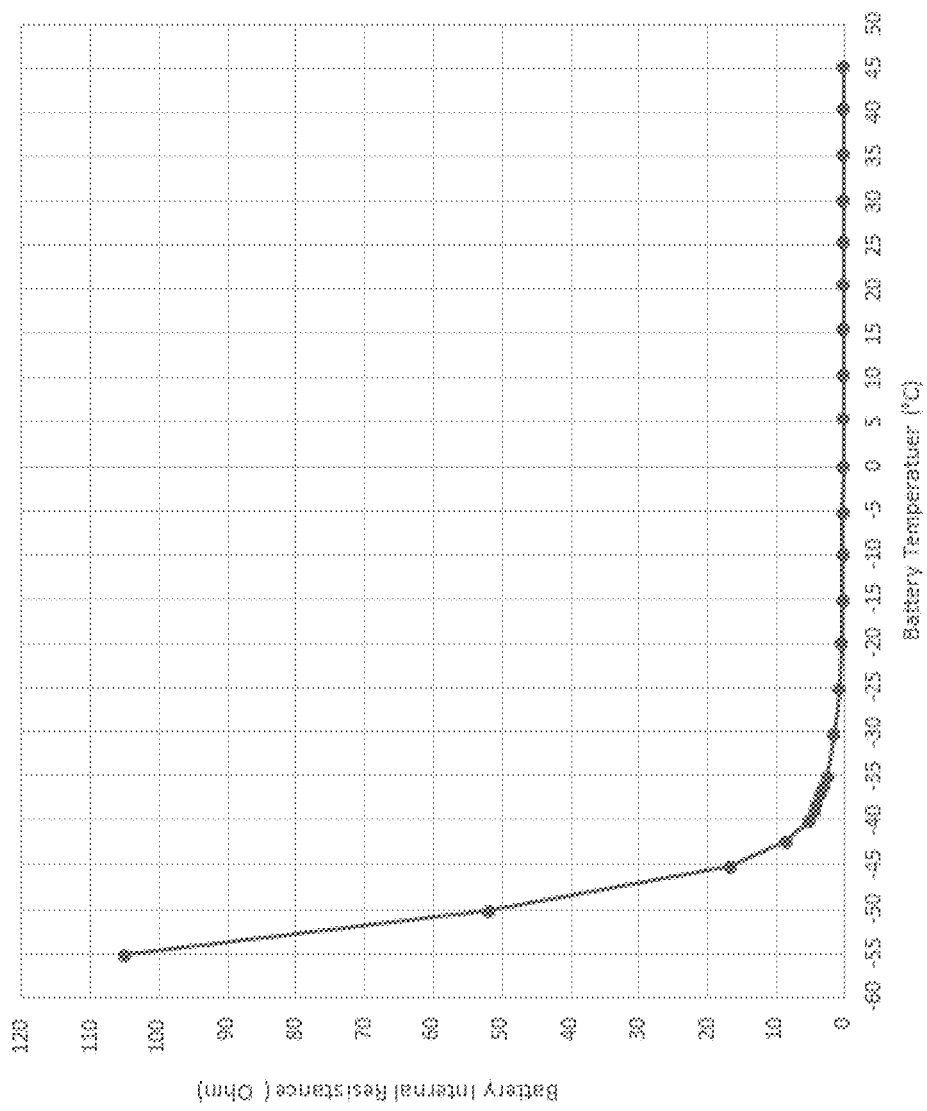
FIG. 32 illustrates a plot of an internal resistance of a standard 18650 cell Li-ion battery (battery part number is LGABB418650) in a temperature range of −55° C. to 45° C.
Figure 33:
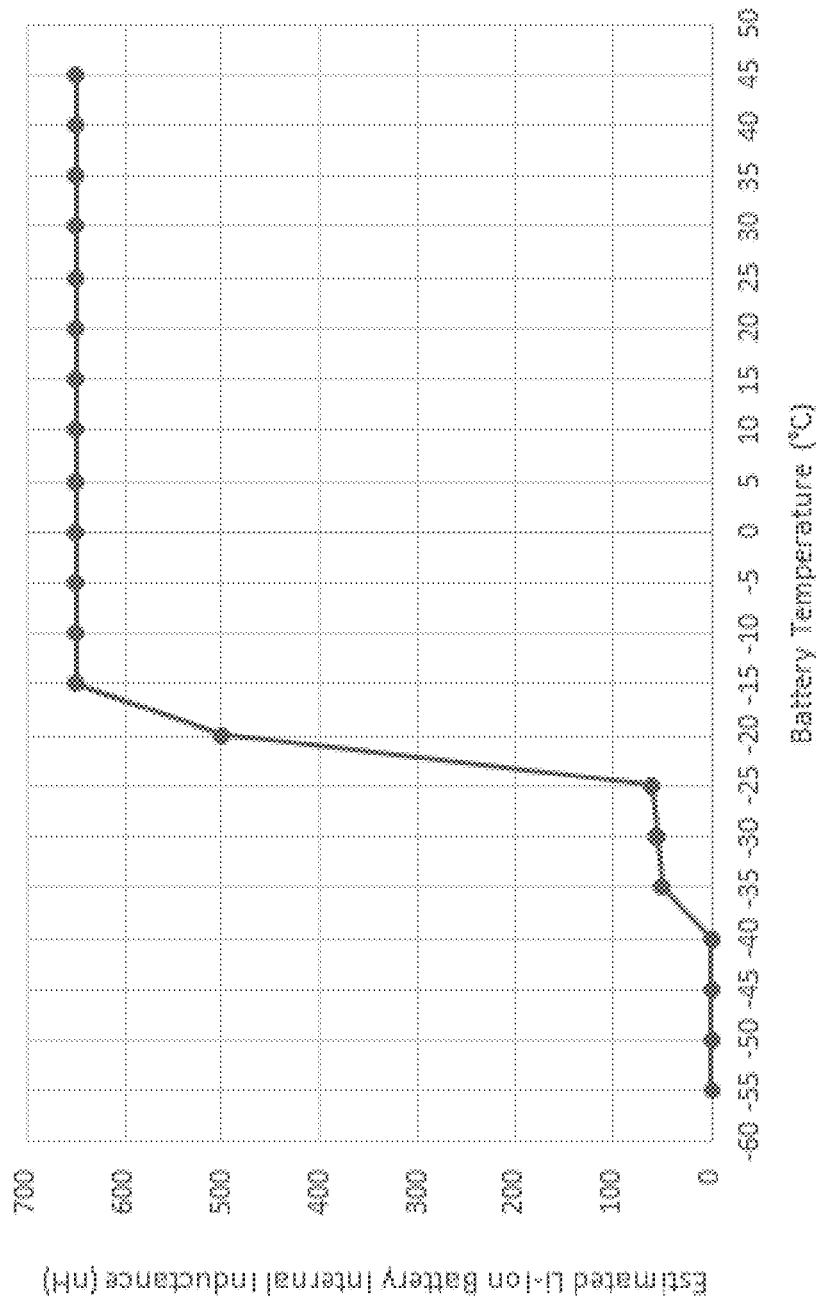
FIG. 33 illustrates a plot of the internal inductance of a standard 18650 cell Li-ion battery (battery part number is LGABB418650) in a temperature range of −55° C. to 45° C.

It is appreciated that as it is shown in the plots of FIGS. 32 and 32, since the internal resistance and inductance of the batteries and super-capacitors to be heated by the application of the described high frequency voltage (current) vary significantly as a function of temperature, particularly at very low temperatures at which achieving higher heating rates is highly desirable. Therefore, the amplitude and frequency of the applied high frequency voltage (current) must be adjusted for optimal heating rate as the temperature varies. In the various embodiments of the present invention this is readily accomplished by providing stored data, for example in the form of a table, in the controller and microcontroller of the embodiments of FIGS. 22 and 24-30. It is appreciated by those skilled in the art that an examination of the typical plots of FIGS. 32 and 33 shows that such look-up tables require only a very limited size due to the simple shapes of the plotted curves. In a more universal device, such look-up table data may also be stored in the controller and microcontroller memory for a wide range of batteries and super-capacitors that are commonly used. Alternatively, the user may be provided with the option of entering the related look-up table data from using a number of data communication means known in the art.

Figure 34:
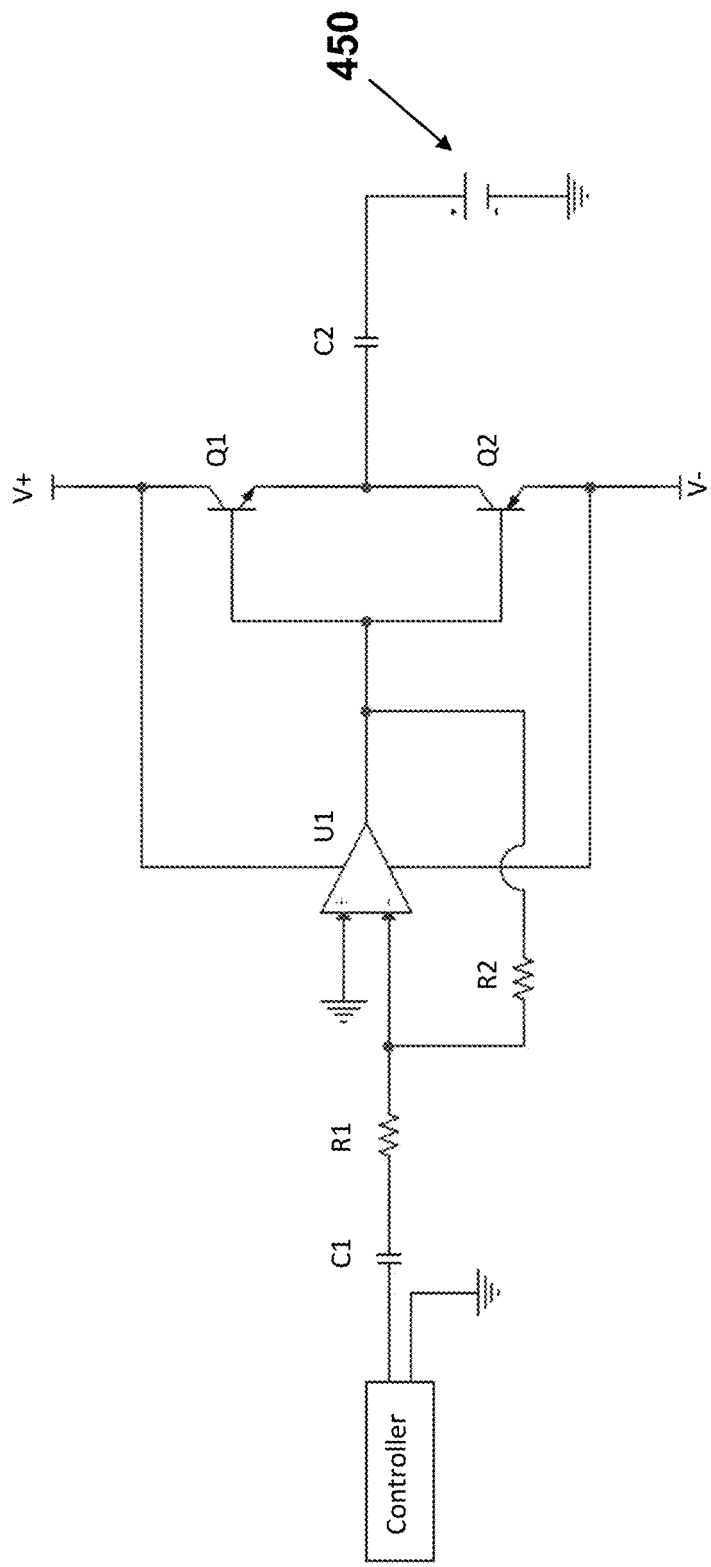
FIG. 34 illustrates a circuit diagram of another embodiment of a battery heating circuit.

FIG. 34 illustrates another embodiment of a battery heating circuit utilizing a Push-Pull amplifier comprised of a PNP type Bipolar Junction Transistor Q1 and a PNP type Bipolar Junction Transistor Q2. The base terminals of both transistors are driven by the same control signal voltage. When the signal voltage is positive, Q1 is activated while Q2 is in cut-off mode and acts as an open switch. Current flows from the positive voltage source V+ into the battery. When the signal voltage is negative, Q2 is activated while Q1 is in cut-off mode and acts as an open switch. Current flows from the battery into the negative voltage source V−. The control signal is sent from a controller which is similar to the control circuit shown in FIG. 28. The controller outputs digital pulses through AC coupling capacitor C1. The AC coupled control signal is then amplified by a device such as an Operational Amplifier U1. The ratio of resistors R1 and R2 is used to configure the voltage level of the output signal of U1. The AC coupled and amplified control signal is then send to drive the transistors Q1 and Q2.

Figure 35:
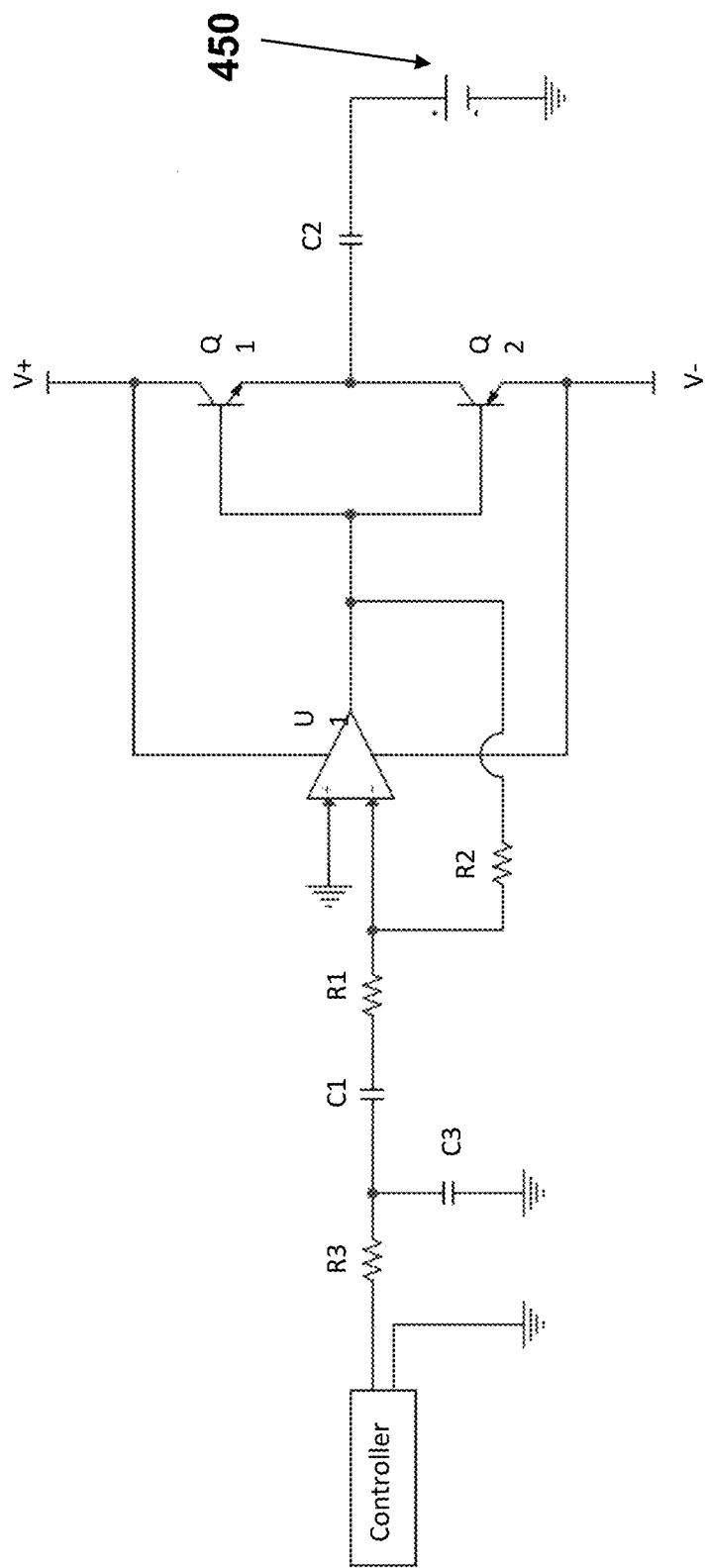
FIG. 35 illustrates the circuit diagram of the embodiment of FIG. 34 as modified to provide a sinusoidal high frequency heating AC voltage.

It is appreciated by those skilled in the art that the switching circuits of the embodiments of FIGS. 22 and 24-30 produce a nearly square wave shaped voltage input for battery and super-capacitor heating. Such square wave shaped high frequency voltages are effective for heating the various indicated batteries, including Li-ion and lead-acid batteries and super-capacitors if they are produced at high enough frequencies as was previously indicated. IN certain applications, particularly when the battery or super-capacitor to be heated has high inductance, it may be desired to employ heating AC voltages that are closer to being purely sinusoidal. For this purpose, as an example, the heating circuit of the embodiment of FIG. 34 may be modified as illustrated in FIG. 35. In this circuit, the resistor R3, and capacitors C3 and C1 together forms a filter, which turns the square wave controller generated signal into an essentially sinusoidal signal.

Figure 36:
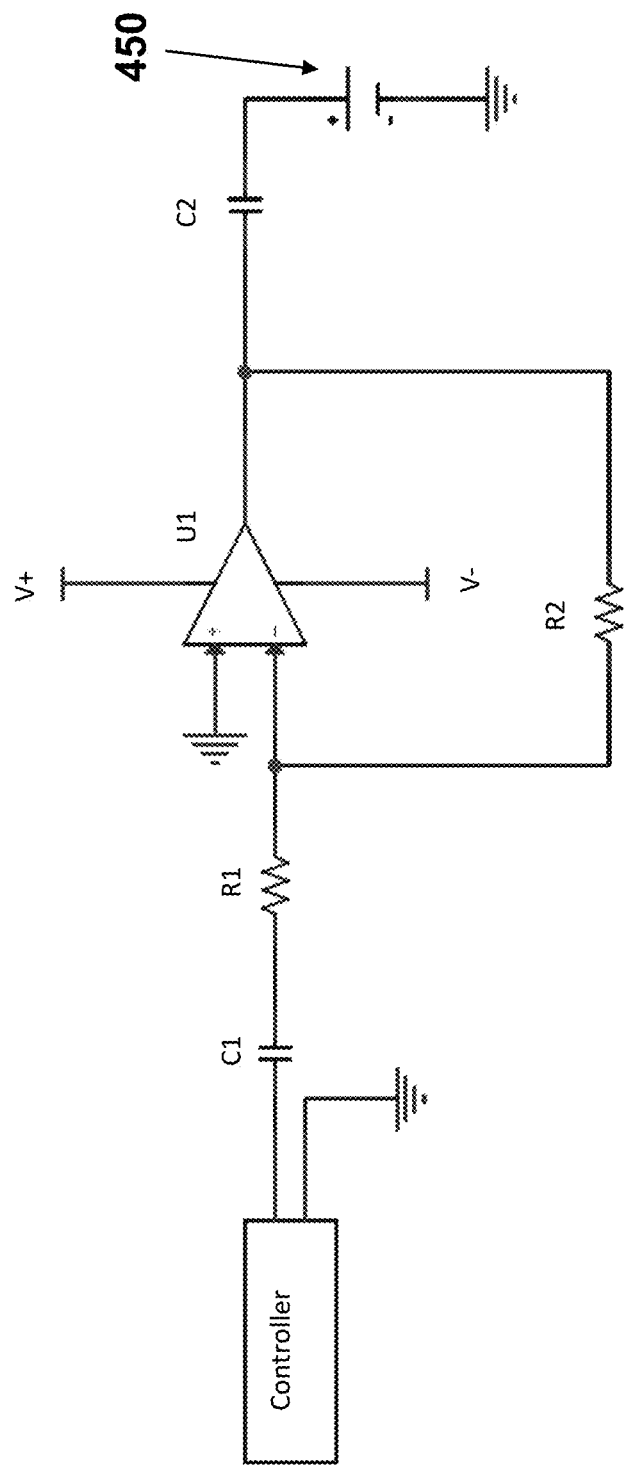
FIG. 36 illustrates a circuit diagram of another embodiment of a battery heating circuit.

FIG. 36 illustrates another embodiment of a battery heating circuit utilizing a Power Operational Amplifier Integrated Circuit U1. The Power Operational Amplifier Integrated Circuit U1 can be configured as inverting or non-inverting amplifier. FIG. 36 illustrates an example of U1 as configured as an inverting amplifier. In this embodiment, the control signal is sent from a controller, which may be similar to the control circuit shown in the embodiment of FIG. 28. The control signal is sent to the input of U1 via an AC coupling capacitor C1. The ratio of resistors R1 and R2 is used to configure the voltage level of the output of U1. The output power of U1 is then used to apply heating for the battery via an AC coupling capacitor C2. The capacitor C2 is required to prevent damage to the output terminal of U1.

Figure 37:
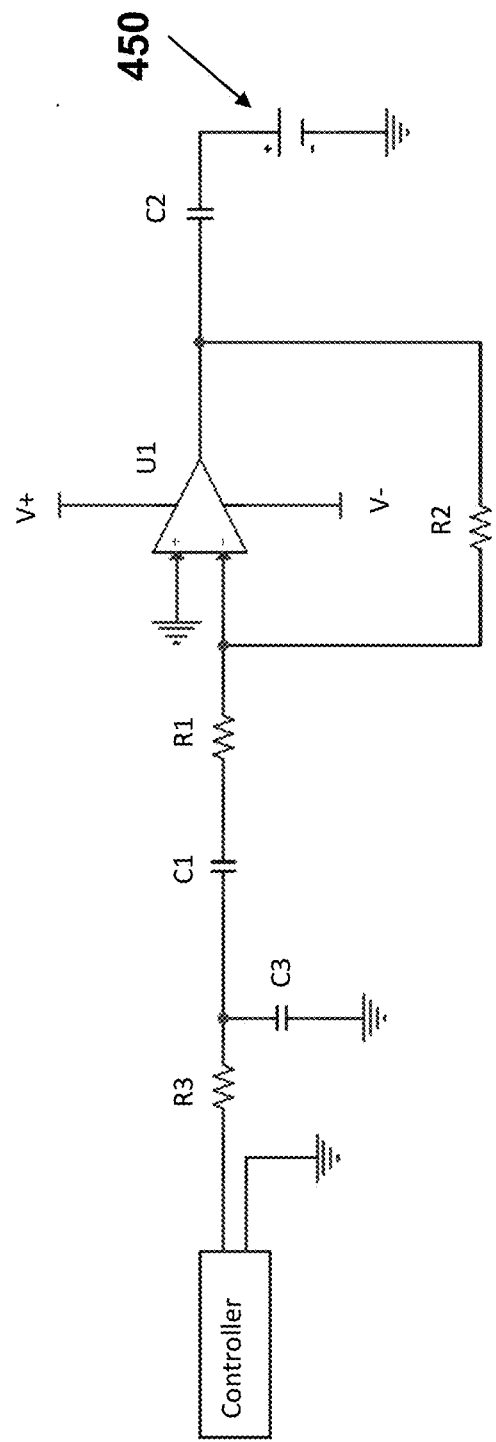
FIG. 37 illustrates a circuit diagram of the embodiment of FIG. 36 as modified to provide a sinusoidal high frequency heating AC voltage.

FIG. 37 illustrates a modified alternative of the battery heating circuit embodiment of FIG. 36. In this circuit, the resistor R3, and capacitors C3 and C1 together forms a filter, which turns the square wave controller generated signal into an essentially sinusoidal signal.

Figure 38:
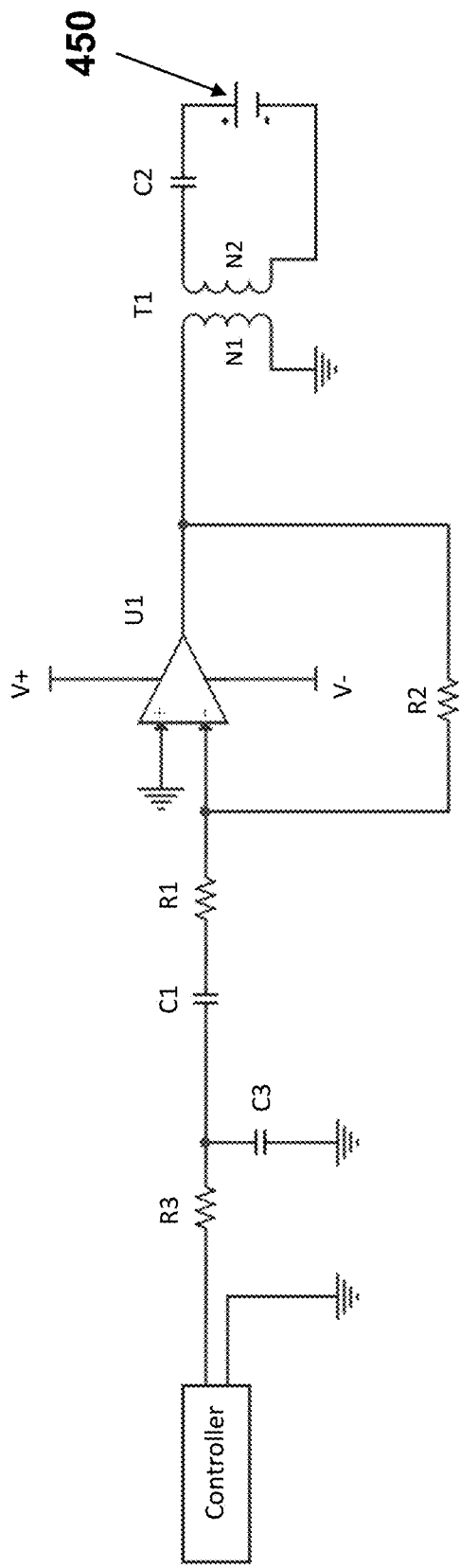
FIG. 38 illustrates an alternative modified circuit diagram of the embodiment of FIG. 37.

FIG. 38 illustrates a modified alternative of the battery heating circuit of the embodiment of FIG. 37. In this circuit, a transformer T1 is used to provide impedance matching between the battery and the output of the Power Operational Amplifier Integrated Circuit U1. The transformer T1 is necessary when the battery impedance is much smaller than the output impedance of the Power Operational Amplifier Integrated Circuit U1. The coil resistance of N1 inside T1 should be high enough to maintain output efficiency of U1, as well as to reduce power dissipation within U1. Ac coupling capacitor C2 is also required to prevent the coil resistance of N2 from loading the battery.

Figure 39:
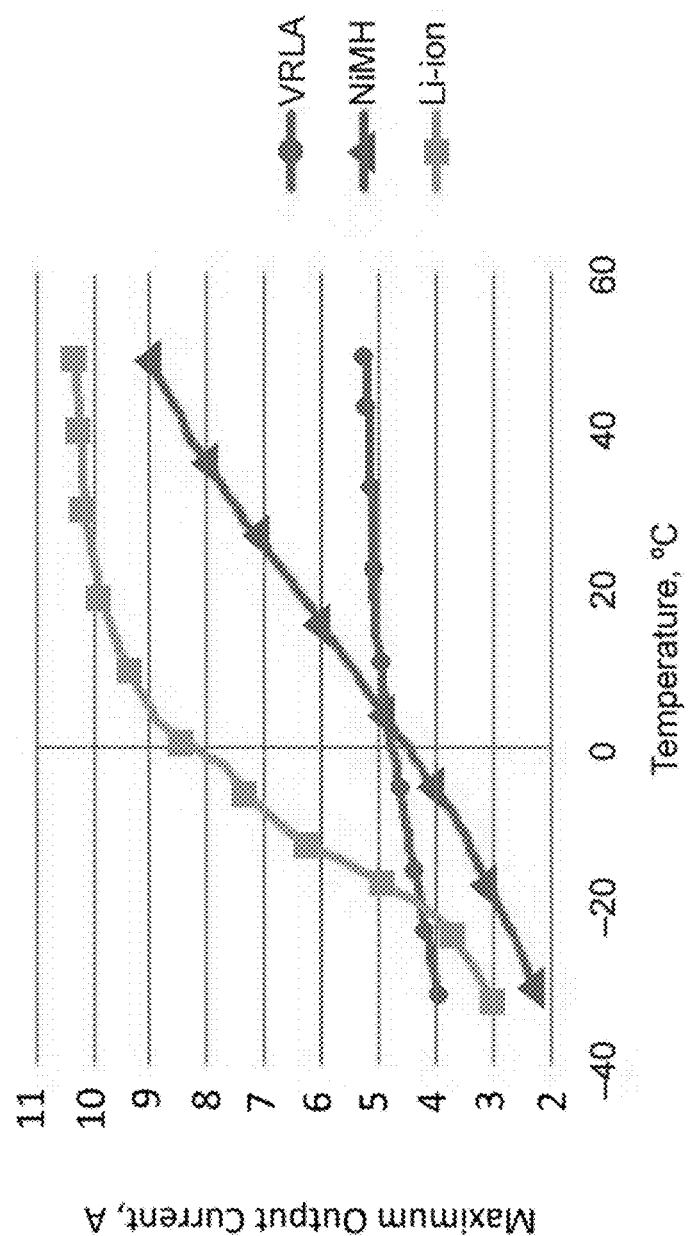
FIG. 39 illustrates a plot of the available battery current at the rated voltage as a function of temperature for several battery types.

It is appreciated that the battery heating circuit embodiments of FIGS. 22, 24-30 and 34-38 use external power supply for their operation. In certain applications, it is desirable for the battery heating circuit to operate using power provided by the battery itself. For battery types such as Li-ion, NiMH and Lead Acid, the maximum output current that is available at the rated voltage is lower at lower battery temperatures. FIG. 39 is a typical plot showing the maximum output current levels of a Li-ion, a NiMH and a VRLA (Valve-Regulated Lead-Acid) batteries as a function temperature. As can be seen in FIG. 39, the available current drops significantly at lower temperatures. For this reason, the following battery heating circuit embodiments of the present invention are divided into those for applications in which the battery can still provide enough current to directly power the heating circuit and those in which the available current level is not high enough and require intermediate storage. The two circuit types are desired to work together for optimal performance, i.e. once the battery is heated enough so that it can provide the required current levels, then the heating circuit is switched to direct powering mode.

Figure 40:
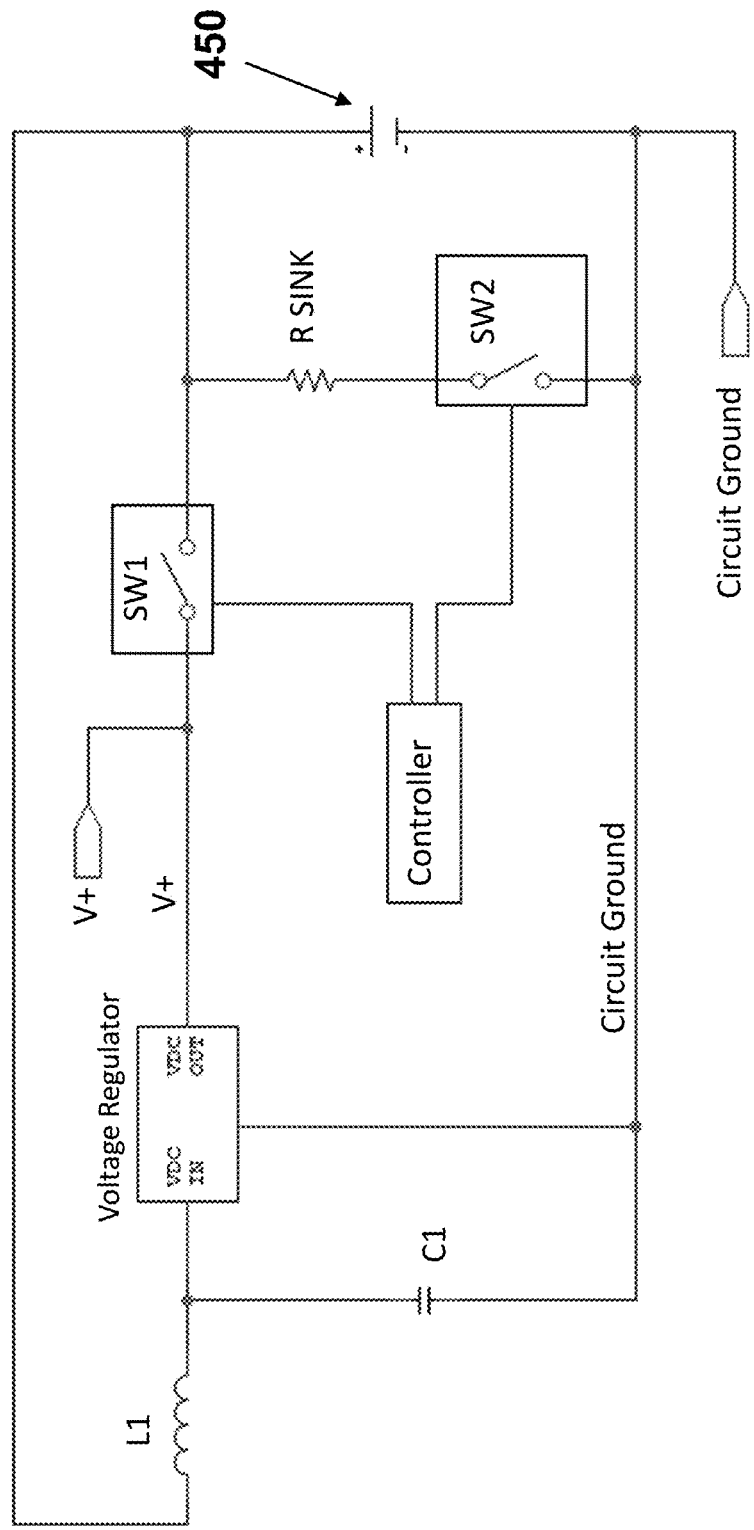
FIG. 40 illustrates a circuit diagram of another embodiment of a battery heating circuit.

FIG. 40 illustrates another embodiment of a battery 450 heating circuit, which uses power from the said battery that is being heated directly, therefore the embodiment does not require an external power supply. The circuit embodiment of FIG. 40 is a modification of the basic heating circuit of the embodiment of FIG. 22. In the circuit of FIG. 40, the voltage source V+ is provided by a step-up voltage regulator which acquires the input voltage from the battery 450 terminals via a LC filter comprised of an inductor L1 and a capacitor C1. The step-up voltage regulator outputs a voltage level which is an increased voltage level of the input voltage. The LC filter allows the input voltage level of the voltage regulator remains stable during the heating process when the current is flowing into and out of the battery alternatively. The voltage regulator requires a minimum amount of input current to maintain the output voltage level and to provide enough current for the heating process. The available current at rated voltage for a typical Li-ion, NiMH and Lead Acid battery is shown in FIG. 39. The circuit of FIG. 40 is ideal for operating at a battery temperature above a certain value which allows enough current for the heating process while maintaining the voltage level of V+. For example, a Li-ion 28V battery pack is used with the circuit in FIG. 40 and the minimum required current for the circuit in FIG. 40 to operate properly is around 5 A. Therefore, the minimum operating temperature for this example is −20° C. as shown in FIG. 39.

It is appreciated that the heating circuit embodiment of FIG. 40, which is powered by the battery 450 itself, may also be provided with an external powering. As a result, the user will be able to use external power for heating the battery 450 when such an external power source is available, thereby saving the battery charges and accelerating the battery heating process. In this case, the optional terminals of V+ and Circuit Ground can be wired to an external power supply. It is appreciated that once the battery temperature has increased up to an appropriate value, the external power supply can be disconnected, and the subsequence heating process can be powered by the battery itself. In many such applications, the external power source is used to bring the battery temperature to or close to room temperature or a temperature that the battery performance is near optimal or at the desired level, and then the external powering is terminated, and the battery power is used to maintain the battery temperature at the desired level.

Examples of such applications are vehicles or power tool batteries, where the vehicle or the power tool is stored in unheated garage or storage where external power is available. Then the user would first heat the battery in cold temperature and when it is at the desired temperature level, the external power is disconnected, and the battery temperature is maintained at the desired level using the battery power. The user can then use the vehicle and power toll in very cold weather without losing battery performance. It is appreciated by those skilled in the art that such applications are plentiful and includes most devices and systems that are used at one time or another in low temperature environments.

Figure 41:
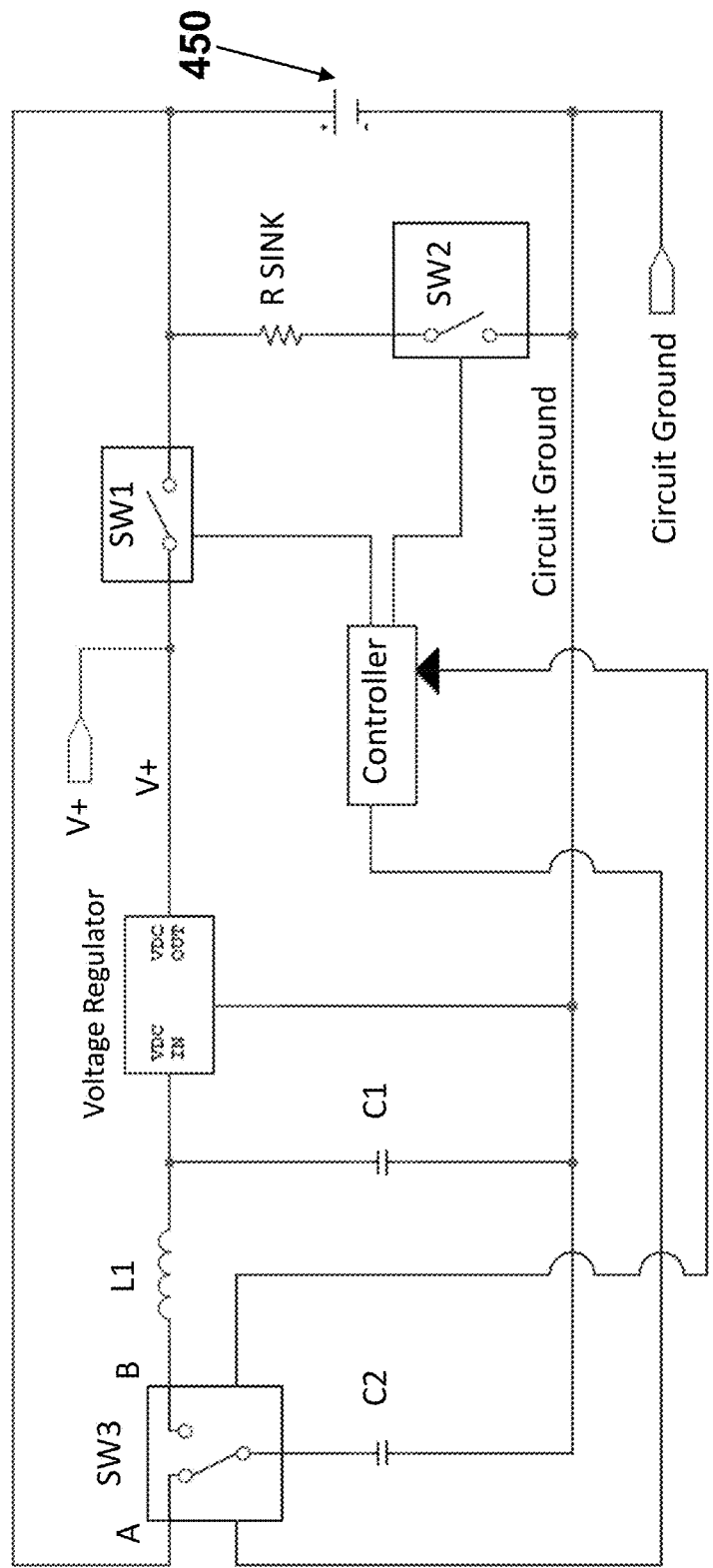
FIG. 41 illustrates a modified circuit diagram of the embodiment of the battery heating circuit FIG. 40.

FIG. 41 illustrates the battery heating circuit embodiment of FIG. 40 as modified to allow for operation at very low temperatures at which the battery cannot provide high enough current for operation of the circuit directly from the battery itself. The battery heating circuit embodiment of FIG. 41 operates without external power. The voltage source V+ is provided by a step-up voltage regulator which acquires the input voltage from the capacitor C2 via a LC filter comprised of an inductor L1 and a capacitor C1. The capacitor C2 is charged when the switch SW3 is switched to position A. Once the capacitor is fully charged, the controller switches SW3 to position B and the voltage regulator draws energy from C2 to provide energy for the heating process. Once the voltage across C2 drops to a certain level and no longer able to maintain the operation of the voltage regulator, SW3 is switched to position A and to be fully charged once again. This process repeats until the controller senses that the battery temperature is above the prescribed threshold for direct self-powering. The battery can then be used to directly power the heating circuit as was previously described for the embodiment of FIG. 40.

Figure 42:
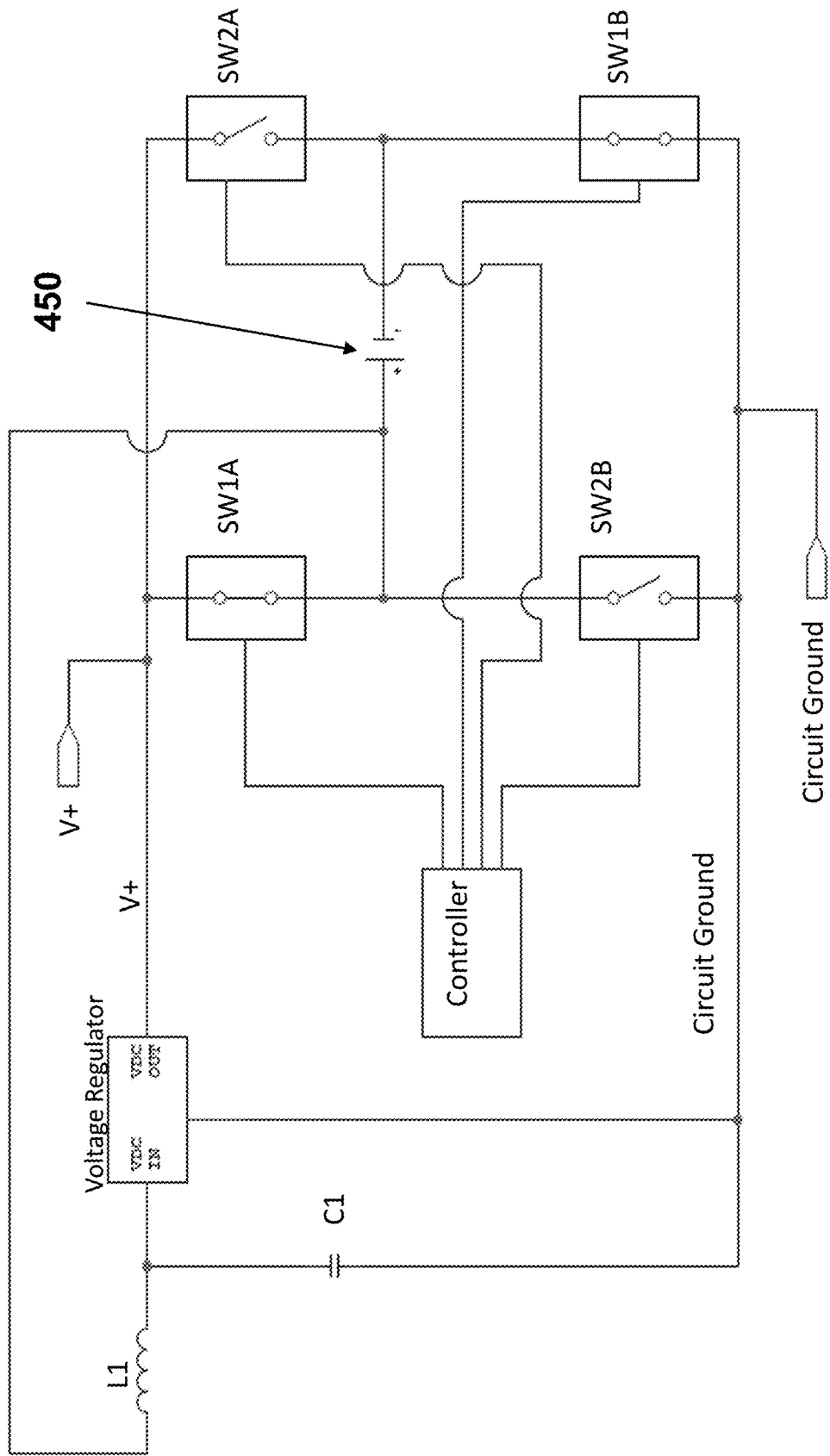
FIG. 42 illustrates a circuit diagram of another embodiment of a battery heating circuit.

FIG. 42 illustrates another embodiment of a battery 450 heating circuit, which uses power from the said battery that being heated directly, therefore the embodiment does not require an external power supply. The circuit embodiment of FIG. 42 is a modification of the basic heating circuit of the embodiment of FIG. 29. The voltage source V+ is provided by a step-up voltage regulator which acquires the input voltage from the battery 450 terminals via a LC filter comprised of an inductor L1 and a capacitor C1. The step-up voltage regulator outputs a voltage level, which is higher than the input voltage level. The LC filter allows the input voltage level of the voltage regulator to remain stable during the heating process when the current is alternatively flowing into and out of the battery 450. The voltage regulator requires a minimum amount of input current to maintain the output voltage level and to provide enough current for the heating process. The available current at rated voltage for a typical Li-ion, NiMH and Lead Acid battery is shown in FIG. 39. The circuit in FIG. 42 is ideal for operating at a battery 450 temperature that is above the level at which the battery can provide enough current for the heating process while maintaining the required voltage level of V+. For example, a Li-ion 28V battery pack is used with the circuit in FIG. 42 and the minimum required current for the circuit in FIG. 42 to operate properly is around 5 A. Therefore, the minimum operating temperature for this example is −20° C. as shown in FIG. 39.

It is appreciated that the heating circuit embodiment of FIG. 42, which is powered by the battery 450 itself, may also be provided with an external powering. As a result, the user will be able to use external power for heating the battery 450 when such an external power source is available, thereby saving the battery charges and accelerating the battery heating process. In this case, the optional terminals of V+ and Circuit Ground can be wired to an external power supply. It is appreciated that once the battery temperature has increased up to an appropriate value, the external power supply can be disconnected, and the subsequence heating process can be powered by the battery itself. In many such applications, the external power source is used to bring the battery temperature to or close to room temperature or a temperature that the battery performance is near optimal or at the desired level, and then the external powering is terminated, and the battery power is used to maintain the battery temperature at the desired level. Examples of such applications as vehicles or power tool batteries and other similar applications were previously discussed.

Figure 43:
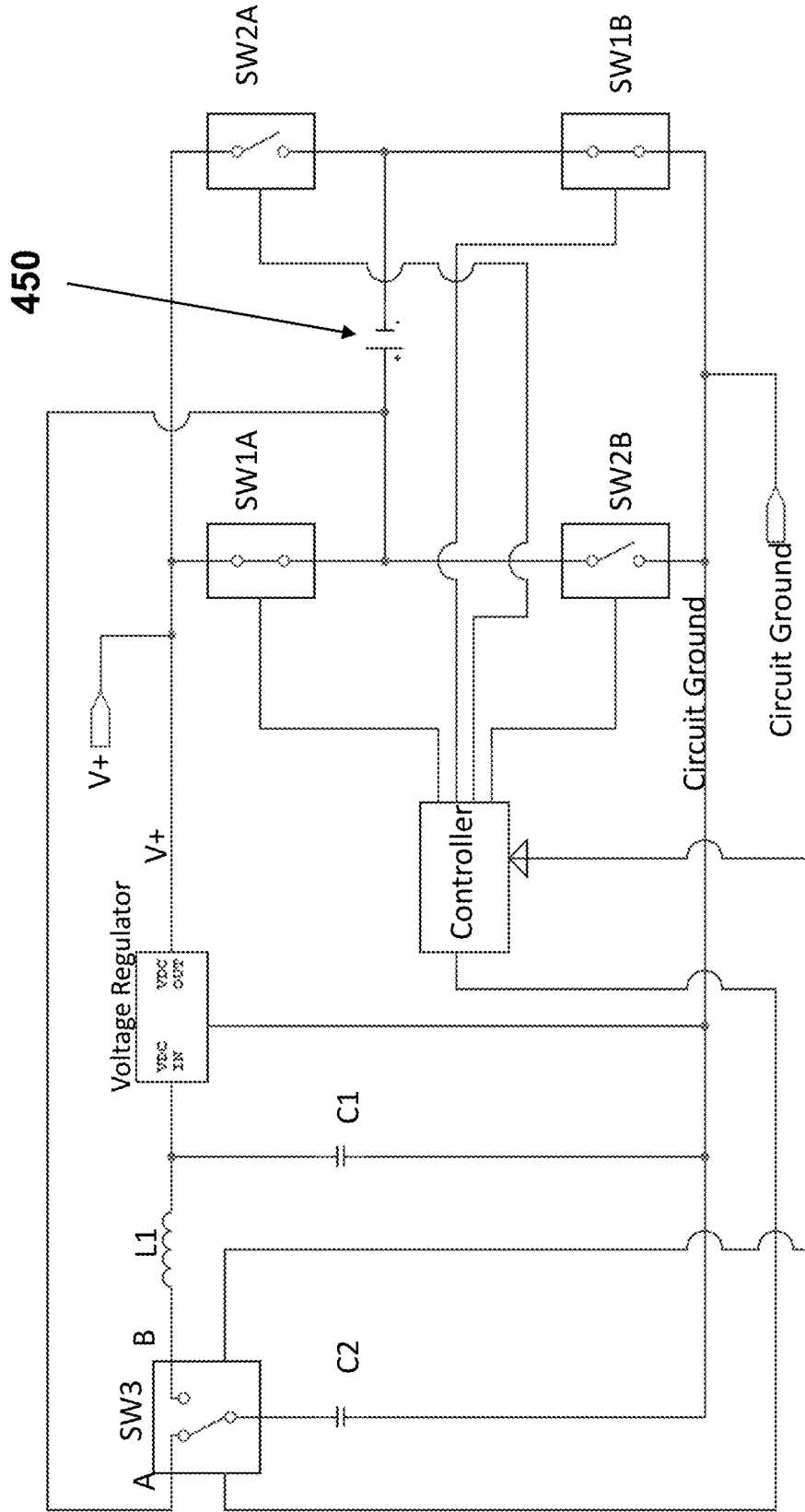
FIG. 43 illustrates a modified circuit diagram of the embodiment of the battery heating circuit FIG. 42.

FIG. 43 illustrates the battery heating circuit embodiment of FIG. 42 as modified to allow for operation at very low temperatures at which the battery cannot provide high enough current for operation of the circuit directly from the battery itself. The battery heating circuit embodiment of FIG. 43 operates without external power. The voltage source V+ is provided by a step-up voltage regulator which acquires the input voltage from the capacitor C2 via a LC filter comprised of an inductor L1 and a capacitor C1. The capacitor C2 is being charged when the switch SW3 is switched to position A. Once the capacitor is fully charged, the controller switches SW3 to position B and the voltage regulator draws energy from C2 to provide energy for the heating process. Once the voltage across C2 drops to a certain level and no longer able to maintain the operation of the voltage regulator, SW3 is switched to position A and to be fully charged once again. This process repeats until the controller senses that the battery temperature is above a certain value. This process repeats until the controller senses that the battery temperature is above the prescribed threshold for direct self-powering. The battery can then be used to directly power the heating circuit as was previously described for the embodiment of FIG. 42.

It is appreciated by those skilled in the art that in most applications, batteries and super-capacitors are housed in a closed environment, such as a battery pack. In some applications, such as in the case of lead-acid batteries, the battery may not be positioned in a relatively closed housing. In all these applications, when the battery or super-capacitor is being heated using one of the above embodiments of the present invention, the temperature measured by a sensor that is attached to the outside surface of the battery or super-capacitor would generally be lower than that of the battery and super-capacitor core. In all these applications, a thermal model of the battery or super-capacitor core, its housing (including insulation layer and/or paint), and other covering layers can be used to predict the core temperature by measuring the temperature of the battery and super-capacitor outside surface. In these models, the amount of input heating energy and the measured outside surface temperature as a function of time together with the initial temperature of the battery (usually the same as the temperature measured on the battery surface) are used to predict the battery or super-capacitor core temperature. It is also appreciated by those skilled in the art that such a model can be readily programmed into the processor of the controllers of the various embodiments of the present invention.

Several methods and related circuits for generating the high frequency current for direct heating of battery and super-capacitor core were previously described. It is, however, highly desirable that the device used to pass high frequency current through the battery be capable of automatically keep the high frequency current symmetric with no or negligible DC component. Such a low temperature direct heating device for batteries and super-capacitors can then be used for any voltage and internal impedance, both of which do vary with temperature, without requiring the user or a separate circuitry with sensory devices to perform the task of making the required adjustments to achieve the required negligible DC component of the high frequency heating current that is passed through the battery or super-capacitor.

The methods to be disclosed are herein described by examples of one of their possible circuit designs. It is appreciated by those skilled in the art that the described methods may be implemented using other similar circuit designs.

Figure 44:
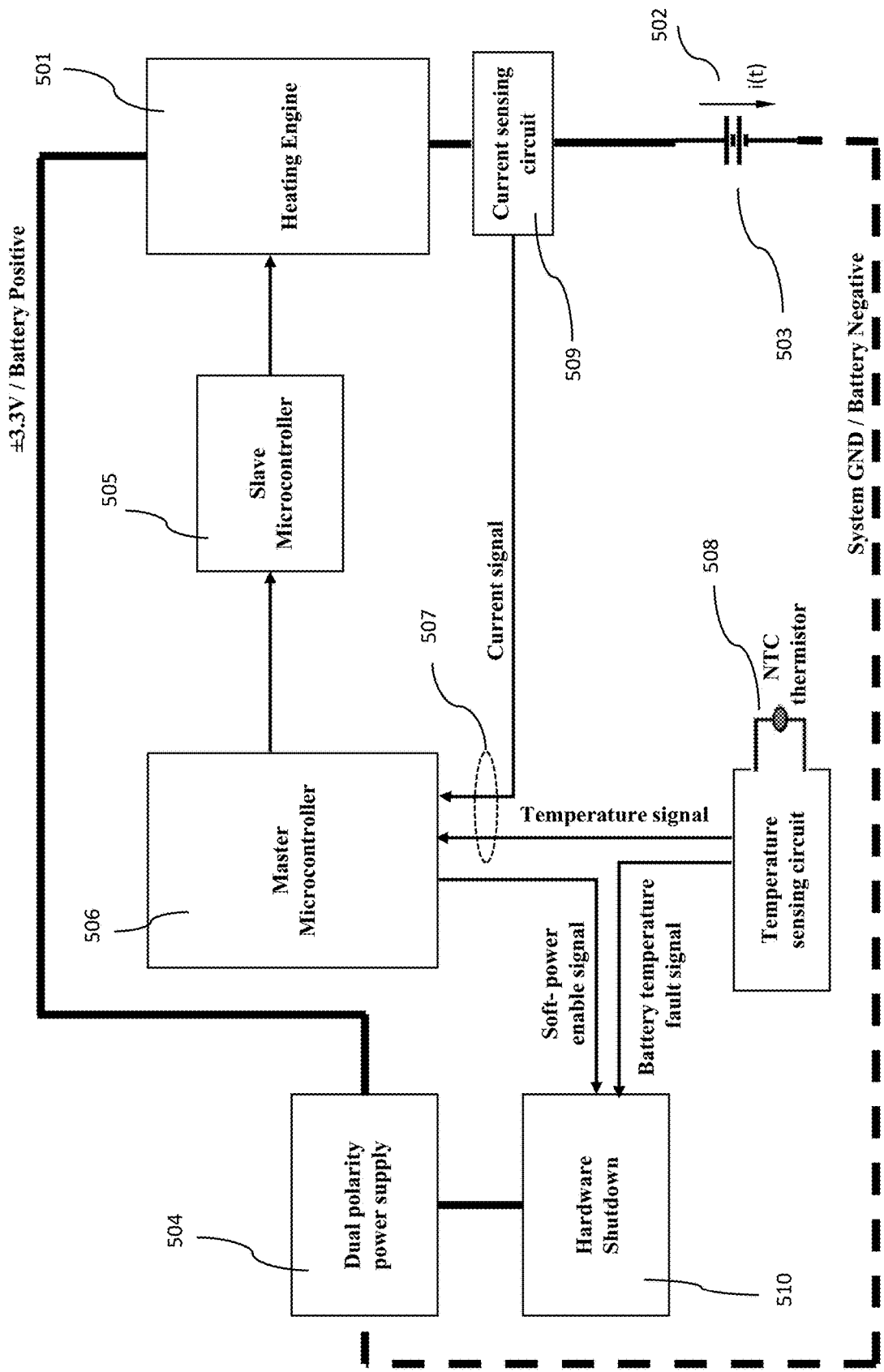
FIG. 44 illustrates the block diagram of another embodiment of a battery heating device.
Figure 45:
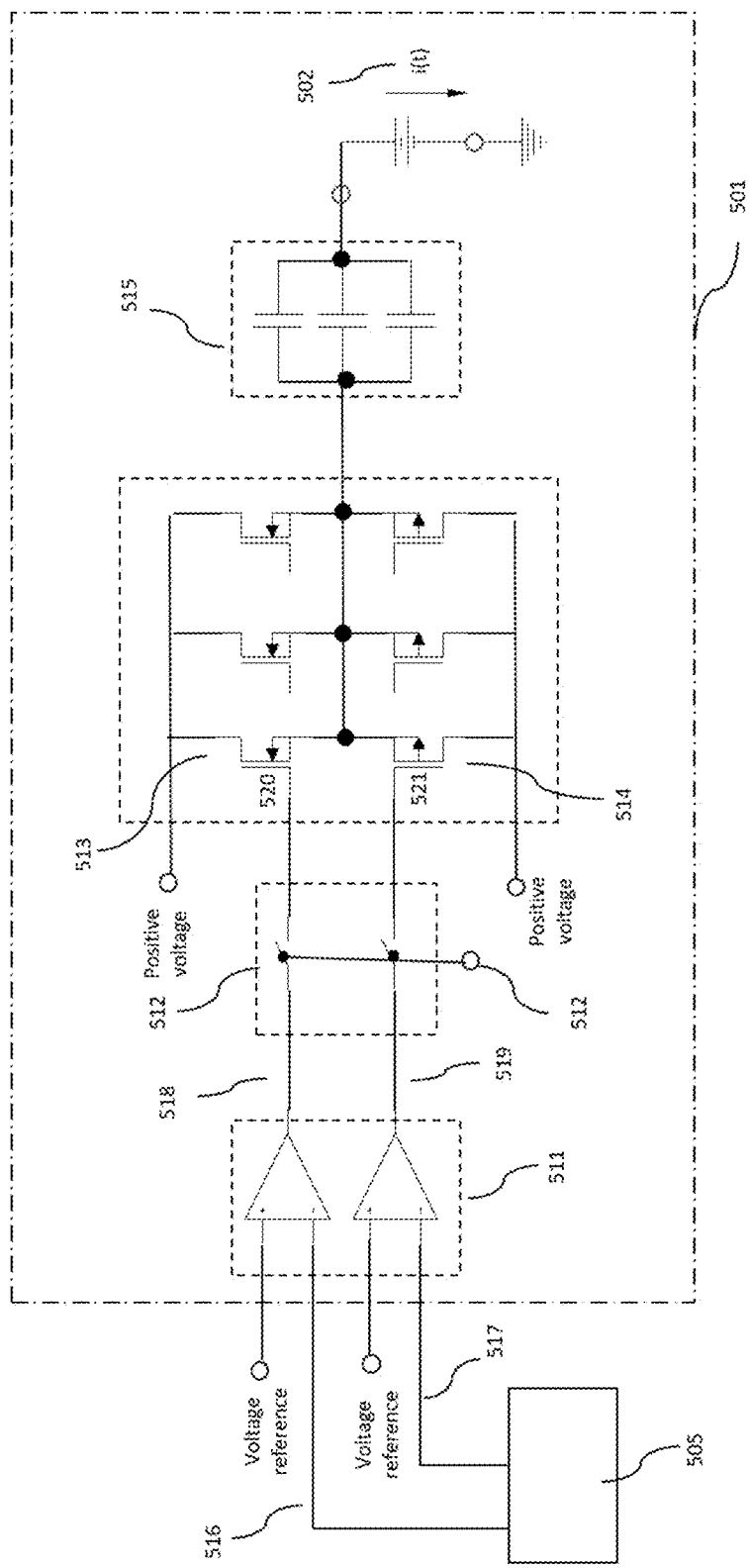
FIG. 45 illustrates the operation of the "heating engine" in the block diagram of the embodiment of FIG. 44 of a battery heating device.

FIG. 44 illustrates the block diagram of one embodiment of such a direct battery heating system. The heating system of FIG. 44 consists of a "heating engine" 501, which causes an oscillatory current 502 to flow through the battery 503. The "heating engine" is powered by a dual polarity high current source 504, for example a source providing 50-150 amps. A "slave" microcontroller 505 is programmed to provide voltage pulses for alternating operation of the push and pull MOSFET switches or the like of the "heating engine" 501, an example of which is shown in FIG. 45 and is described later in this disclosure. The "slave" microcontroller 505 is enabled by a "master" microcontroller 506, which utilizes sensory inputs 507 from the battery to provide digital control of the "heating engine" 501. The functions of the "master" and "slave" microcontrollers may be performed by a single microcontroller.

Typically, one or more temperature sensors 508, for example an NTC thermistor or the like, monitor the battery temperature. A current sensor 509 may also be provided to measure the RMS value of the heating current. The heating cycle is initiated whenever the battery temperature falls below the desired operational temperature and disabled whenever the battery temperature exceeds the upper set limit. Normal operation of the heating system maintains the battery temperature within the desired limits.

It is appreciated that due to unpredictable events a potentially hazardous condition such as the battery temperature passing a certain preset threshold is detected. In addition to the normal control of the "heating engine", a software generated signal may also be provided for disabling the "heating engine" whenever the measured temperature falls outside the normal range of operation or a command is received from some external source (not shown). The system may be programmed to automatically recover when the temperature drops below the hazardous condition. However, if the software has been compromised, a hardware shutdown circuit 510 may be provided to detect the temperature passing the preset threshold and disable the high current power supplies. The "heating engine" remains in the OFF position until the system reactivated.

Figure 46:
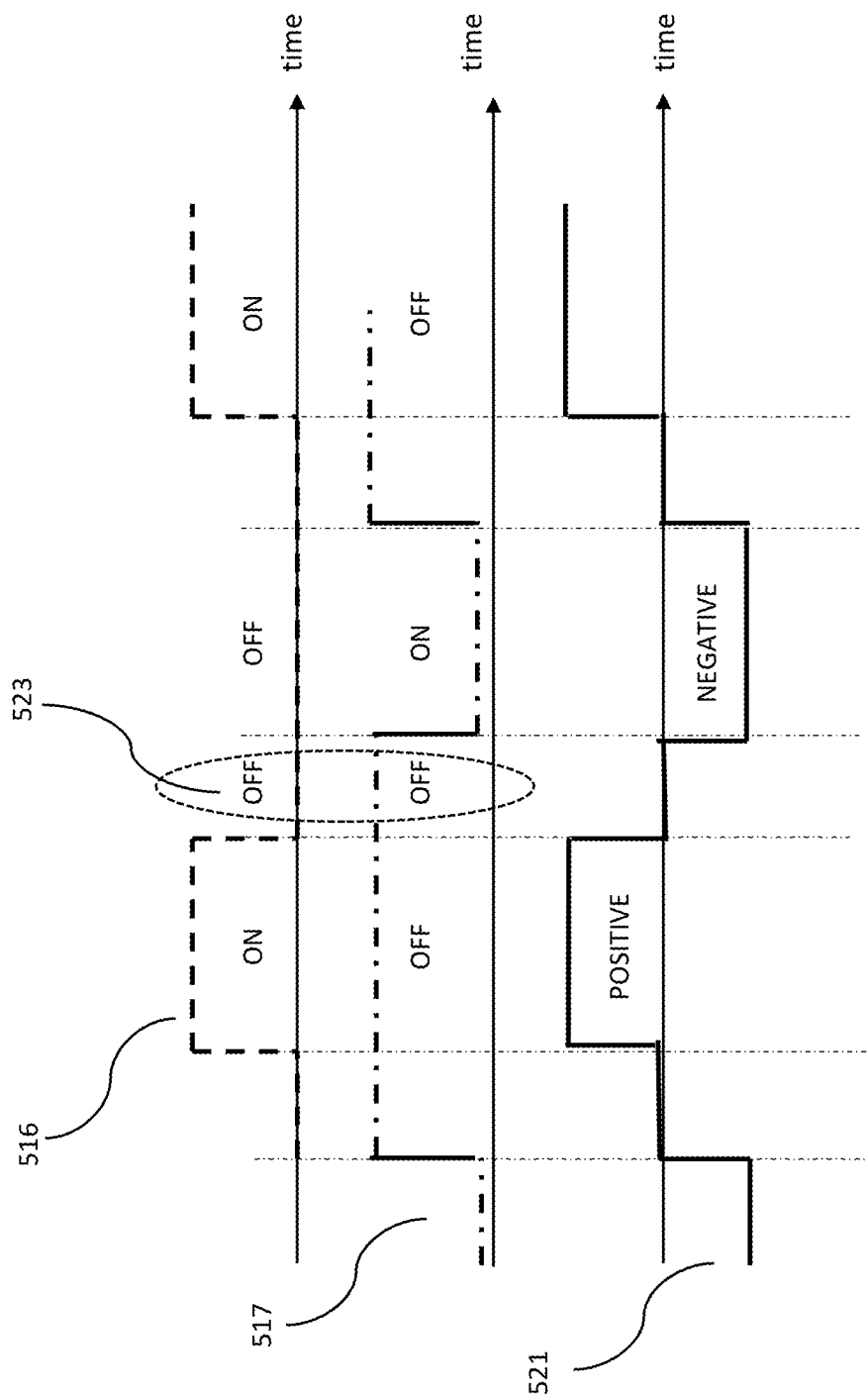
FIG. 46 illustrates typical switching waveforms and the battery current waveform that are used in the embodiment of FIG. 44 of a battery heating device.

FIG. 45 illustrates the operation of the "heating engine" 501, which comprises of a gate-driver module 511, voltage controlled toggle switches 512, for example solid-state relays or the like, plurality of N-type MOSFETS 513 arranged in a parallel configuration, plurality of P-type MOSFETS 514 arranged in a parallel configuration, and plurality of capacitors 515 arranged in a parallel configuration. Circuit operation is independent of the battery voltage and chemistry. The slave microcontroller 505, FIG. 44, generates the control waveform 516 for the bank of N-MOSFETs 513 and control waveform 517 for the bank of P-MOSFETs 514. The control waveforms 516 and 517 are converted to the positive 518 and negative 519 gate to source voltage requirements of N- and P-type MOSFETS 513 and 514, respectively. These switching pulses are passed to the respective gate terminals 520 and 521. The N-type MOSFETs 513 provide current flow into the positive terminal of the battery. During the conduction (ON) of the p-type MOSFETS 514 the current flows out of the positive terminal. Typical switching waveforms 516 and 517 and the battery current waveform 521 are illustrated in FIG. 46. Furthermore, an important and innovative feature of the heating cycle is the OFF period 523 when both channel MOSFETs are in the OFF mode. This added feature eliminates a potentially hazardous condition forcing both the P- and N-type MOSFETs to the ON state at the same time.

Figure 48:
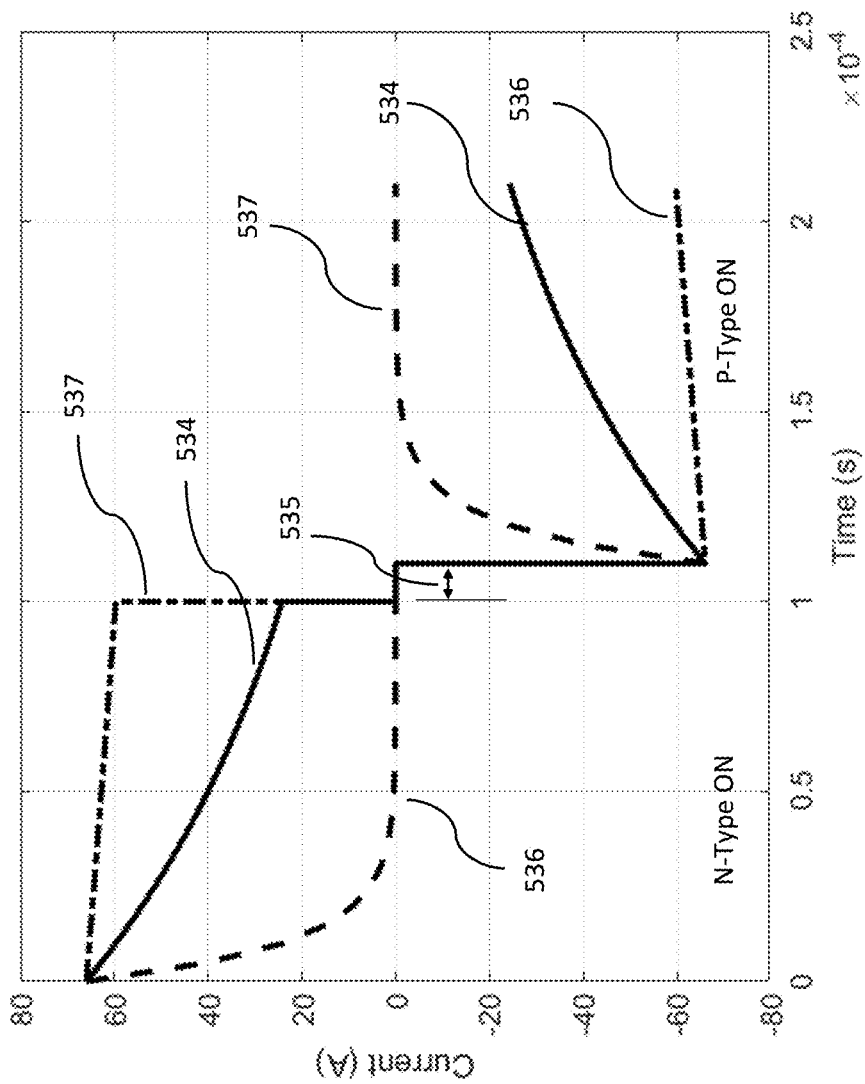
FIG. 48 illustrates an example of a current waveform during one heating cycle of for the embodiment of FIG. 44 of a battery heating device.

With reference to FIG. 45, the parallel bank of capacitors 515 provides a distinct functional advantage for the heating system. In the absence of the capacitor bank, the positive and negative supply voltages need to be independently adjusted in order to obtain a symmetrical heating current flow through the battery. Subsequently, power supply voltage requirements become dependent on the battery open circuit voltage, adding significant complexity to the design of the heating system. However, as illustrated in FIG. 48 and expressed in equation (4) and described in detail later in this disclosure, with the present novel design and as it is described below, with the inclusion of the capacitor bank 515, symmetrical current flow through any battery is guaranteed by the design. With this novel design, the disclosed "heating engine" can then be used to heat single cells or cell packs of various battery chemistries, such as lead-acid, Li-ion, Li-polymer, and others.

Another important consideration for the disclosed high frequency direct heating of batteries and super-capacitors is the efficiency of the heating circuit. Poor efficiency translates into excess heat being generated by the electronic components, requiring the means of to transport a significant amount of heat away from the circuit components.

The heating efficiency of the circuit is given by the ratio of the effective battery resistance to the total resistance of the circuit at the operation frequency and can be expressed as, $$\eta_{heating} = \frac{R_{bat}}{R_{bat} + R_{cir}} = 1 - \frac{R_{cir}}{R_{tot}} \quad (3)$$

where $R_{bat}$, $R_{cir}$, and $R_{tot}$, are the battery resistance, the circuit resistance, ant total resistance, respectively. The circuit resistance is a sum of the MOSFET (N or P) ON resistance, the equivalent series resistance of the capacitor and all other parasitic resistances. It can be appreciated that a plurality of MOSFETs and capacitors reduce the circuit resistance in a proportional manner. Thus, for any given battery resistance, particularly, for battery chemistries such as Li-poly or lead-acid which have resistance in the few milli-ohm range, it is possible to obtain heating efficiencies approaching unity. For example, a circuit with a single capacitor with a resistance of 7 mΩ and a single N-MOSFET that has an ON resistance of 10 mΩ yields a heating efficiency of around 64% for a battery with an internal resistance of 30 mΩ at a given temperature. However, by using a bank of five shunting of the above capacitors and MOSFETs, the heating efficiency increases to 90%.

While the above efficiency calculations are based on conduction losses, it is appreciated that at higher operational frequencies (order of MHz), switching losses would also be higher.

Figure 47:
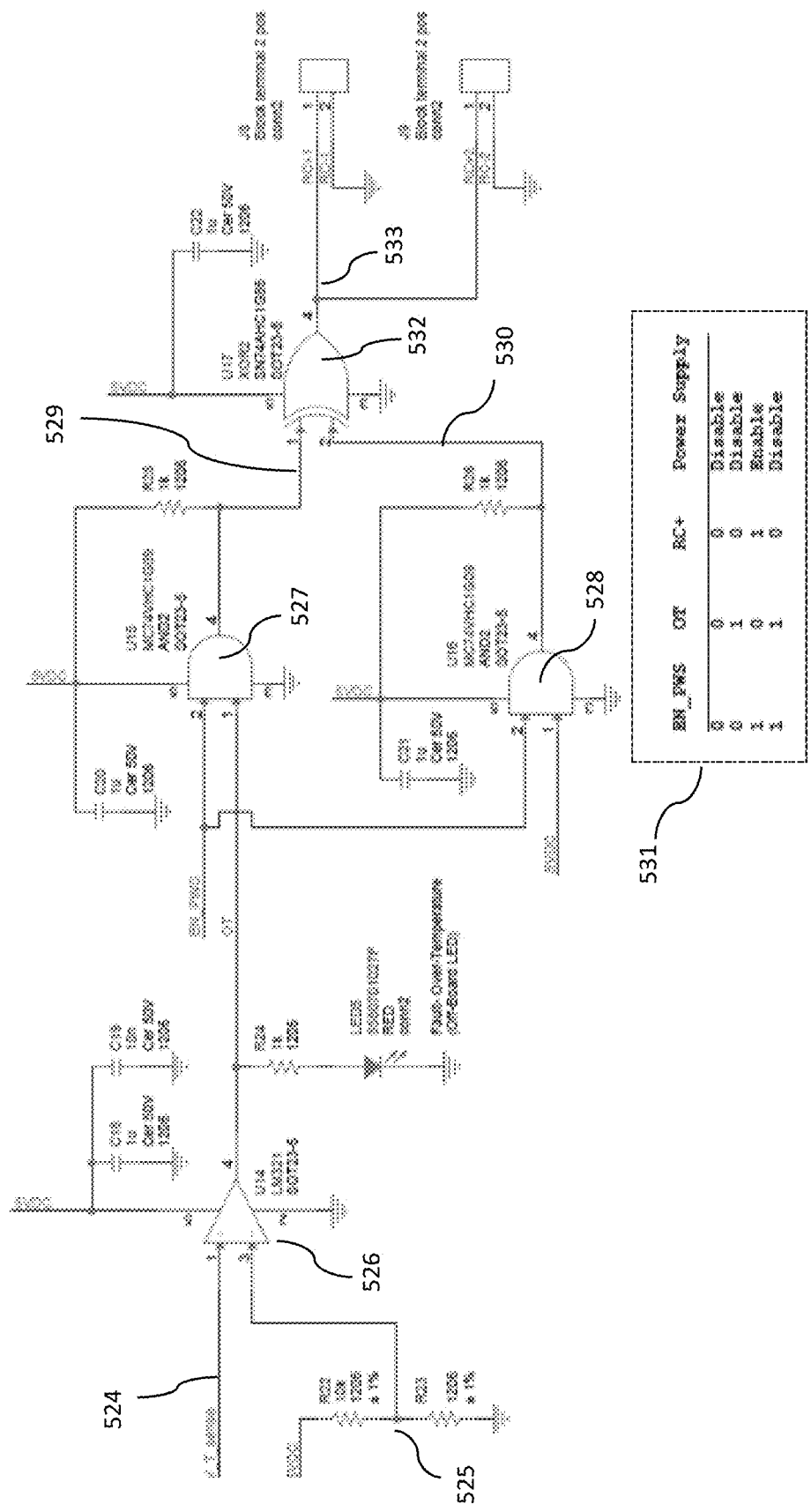
FIG. 47 illustrates one possible implementation of the hardware shutdown circuit for the embodiment of FIG. 44 of a battery heating device.

FIG. 47 shows the schematic of one possible implementation of the hardware shutdown circuit 510, FIG. 44, which is designed to cut-off power to the "heating engine" 501 in FIG. 44 when higher than a preset temperature threshold is detected. Output from the battery temperature sensor 524 is compared with the set-point 525 for this condition. Output of the comparator 526 switches to a high level indicating a higher than a preset temperature condition has been detected. Two AND gates 527 and 528 produce outputs 529 and 530, according to the truth table 531. The two outputs 529 and 530 drive an exclusive OR gate 532, which produces a logic LOW at the output 533 for normal operation. The hardware shutdown circuit ensures that the "heating engine" is powered only if the higher than preset temperature signal is FALSE. It is appreciated that the hardware shutdown circuit 510 may also be implemented by alternatively designed circuits with and without programmable microprocessors.

The "heating engine" 501 (FIG. 44) operation can be analyzed in three distinct time regions: 1) N-type MOSFET ON and P-Type MOSFET OFF (positive current); 2) Both MOSFETs are OFF; and 3) N-type MOSFET OFF and P-Type MOSFET ON (negative current). Operation in Regions (1) and (3) are similar with the exception of the current polarity reversal. Thus, analysis need only be performed in either Region (1) or (3). During the positive cycle, the N-Type MOSFET is ON having an equivalent resistance $R_{ON}$. With reference to FIG. 45, the current i(t) flowing through the battery, during the conduction time T, is given by, $$i(t) = \begin{cases} \dfrac{V_s}{R}\exp\left(-\dfrac{t}{\tau}\right) & , \ 0 \le t \le T \\ \dfrac{V_s}{R}\left(1-\exp\left(-\dfrac{T}{\tau}\right)\right)\exp\left(-\dfrac{t-T}{\tau}\right) & , \ t \ge T \end{cases} \quad (4)$$

FIG. 48 shows the complete current waveform 534 over one cycle when R=50 mΩ, C=2 mF and $V_s$=±3.3 V. T is the ON time for both MOSFETs and τ=RC is the time constant of the heating circuit. Transition between the positive and negative current flow is separated by the OFF state 535 of both MOSFETs. FIG. 48 shows the current waveform for three conditions: 1) dashed line 536 is the response when τ=0.1T (R=50 mΩ, C=0.2 mF; 2) solid line 534 when τ=T (R=50 mΩ, C=2 mF); and 3) dash-dot line 537 when τ=10T (R=50 mΩ, C=20 mF). It is noted that while the shape of the response is different for the three conditions, however, the average current through the battery is zero. From a practical perspective it is desirable to operate the heating engine close to the latter condition τ=10T.

Figure 49:
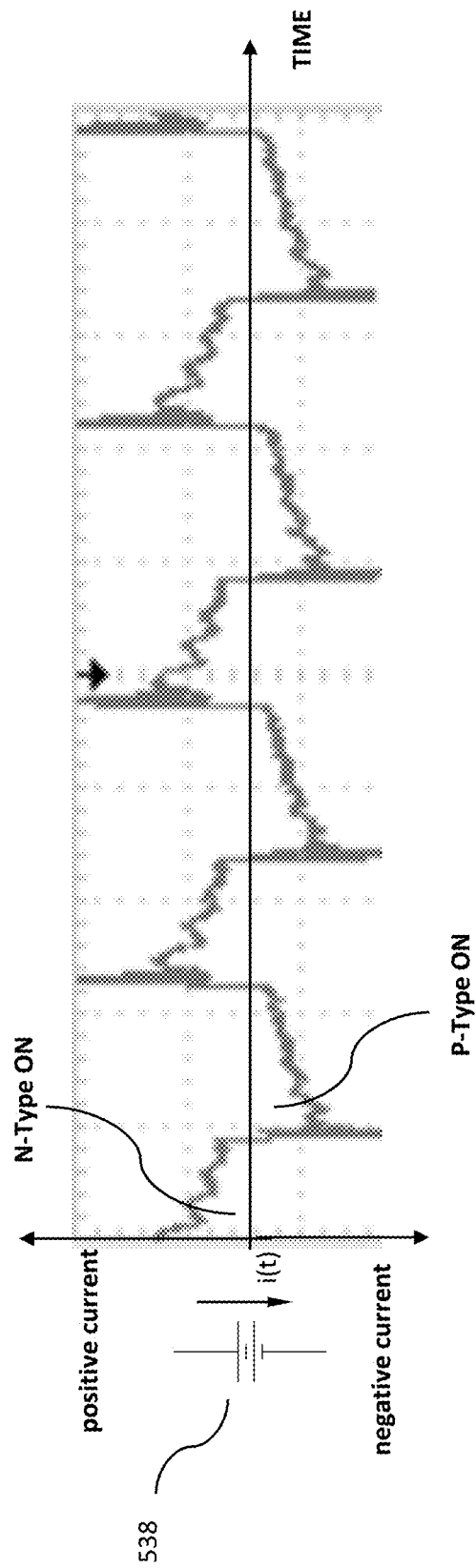
FIG. 49 illustrates the actual measured current response during the heating of a 12 V Type 31 lead-acid battery commonly used in trucks.

FIG. 49 shows the actual measured current response during the heating of a 12 V Type 31 lead-acid battery 538 commonly used in trucks. In this circuit, peak currents of 70 A were measured.

The above description of the heating system has focused on a rechargeable battery merely for convenience. It is appreciated that the same heating system can be used for heating charged or uncharged super-capacitors and all primary batteries, including liquid reserve batteries and thermal reserve batteries at low temperatures.

Figure 50:
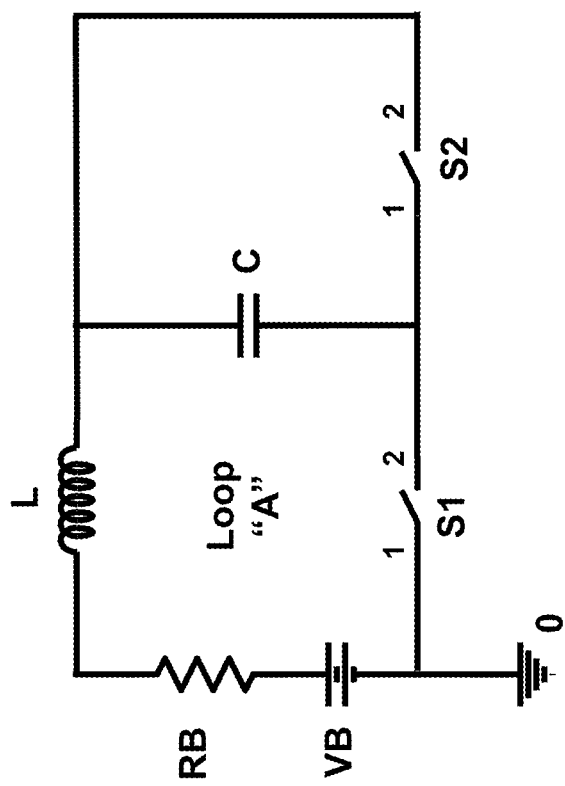
FIG. 50 illustrates the basic circuit diagram of the first high efficiency self-heating device embodiment of the present invention.

FIG. 50 illustrates the circuit diagram of the first high efficiency self-heating device embodiment of the present invention. This device is designed to maintain a battery at a desired operating temperature when the ambient temperature drops a prescribed amount below the desired operating temperature.

As can be seen in FIG. 50, the battery (providing a voltage VB) is placed in series with an external capacitor C and an inductor L to form a series resonance circuit, loop "A". In the circuit of FIG. 50, the resistor RB indicates the internal resistance of the battery to high frequency current as was previously described for high frequency heating of batteries and super-capacitors. With the switch S2 open, the switch S1 is suddenly closed. The resonant circuit of loop "A" will then pass an oscillating current through the battery resistor at the resonant frequency of the circuit, thereby heating the battery core, primarily by heating its electrolyte as was previously described for previous high frequency battery heating embodiments. The amplitude of oscillatory current will diminish as the oscillatory energy is converted to heat and resonance circuit reaches a steady state condition with a heating current which goes to zero as the capacitor is charged to the battery potential. At this time, the switch S1 is opened and the switch S2 is closed. The electrical energy stored in the capacitor C is discharged to the ground. The switch S2 is then opened and the heating cycle is repeated as needed until the prescribed battery temperature is reached.

The steady state time constant of the circuit is a function of the effective series resistance (hereinafter indicated as $R_{tot}$, of the battery and all other resistance arising from of the reactive components and other parasitic resistances (not shown in FIG. 50 as expected to be significantly lower than RB for a properly designed circuit). The peak current and the resonance frequency of the loop "A" circuit are determined by the ON switching time of the switch S1 and the values of C, L and $R_{tot}$.

Figure 51:
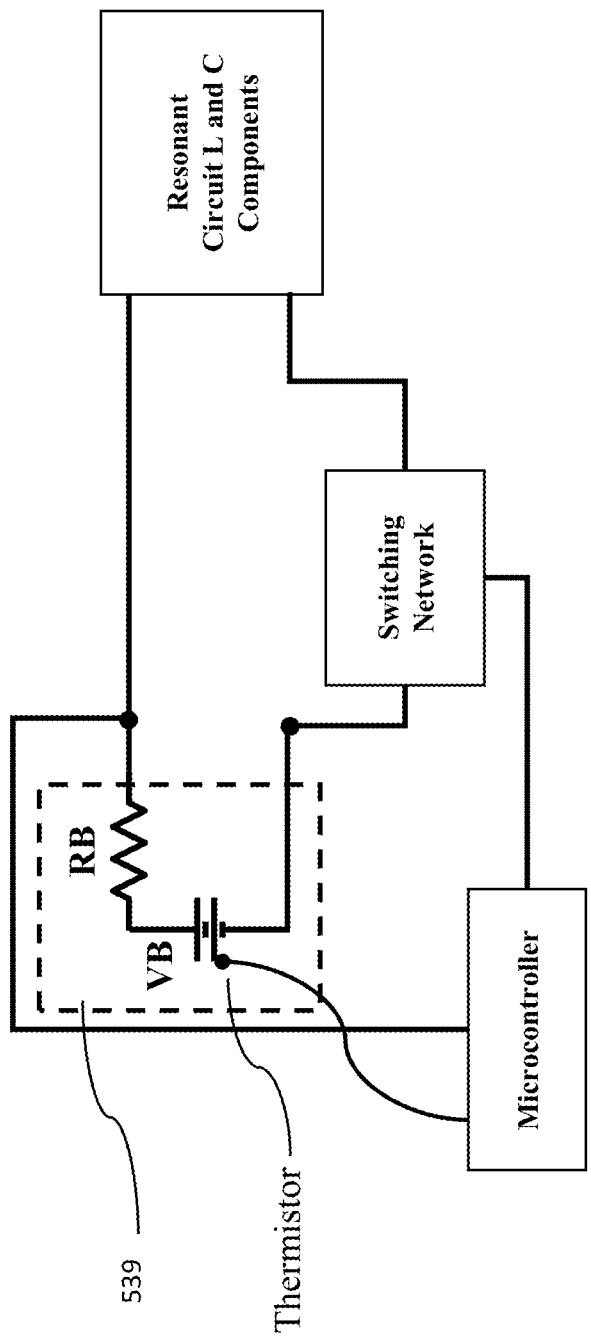
FIG. 51 illustrates the block diagram of the first high efficiency self-heating device embodiment of the present invention.

FIG. 51 shows the block diagram of such a high efficiency self-heating device for batteries and super-capacitors. The elements in the indicated box with dashed lines 539 represent the battery and its in-series internal resistance to high frequency current. The battery is shown to be provided with a temperature sensor (a thermistor in FIG. 51), the output of which provided the means for the microcontroller to initiate the heating cycles as was described above when the battery temperature drops below a preset temperature level and cease the heating process when the preset upper battery temperature has been reached. The Switching Network block in FIG. 51 represent the components of the switches S1 and S2 of FIG. 50 as operated by the device microcontroller.

Figure 52:
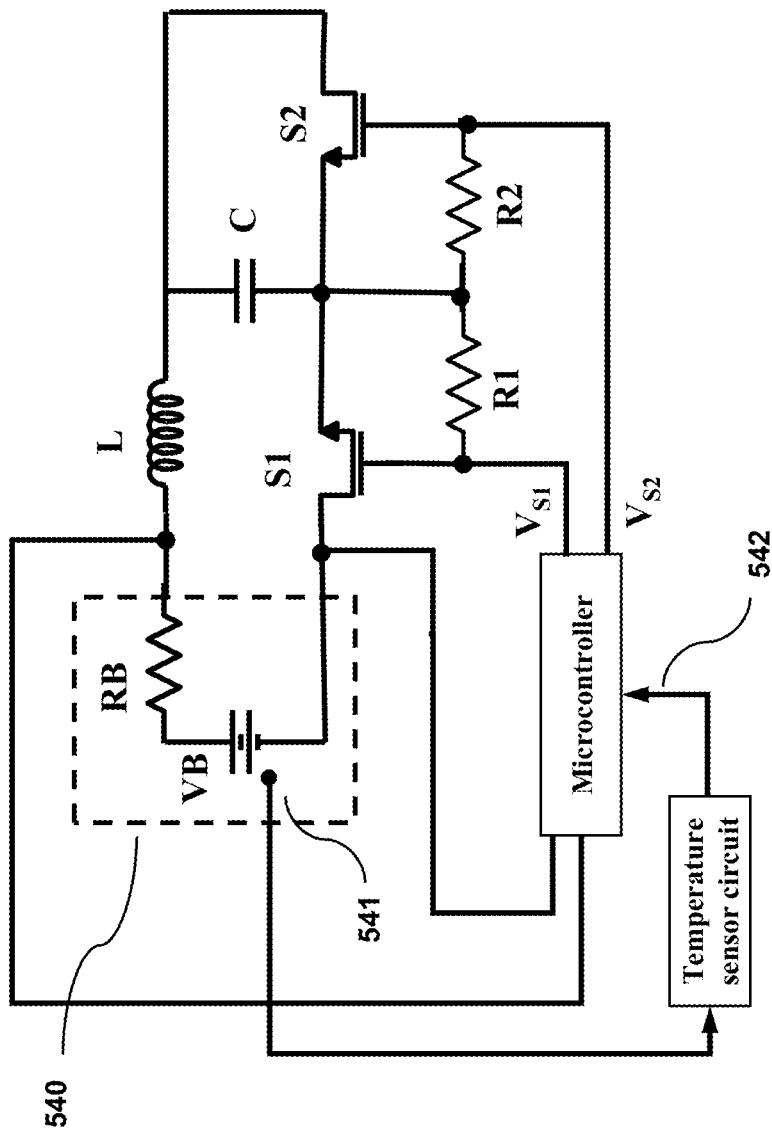
FIG. 52 illustrates a circuit diagram for the first high efficiency self-heating device embodiment of the present invention of FIG. 50.

FIG. 52 shows one implementation of the block diagram of the high efficiency self-heating device for batteries and super-capacitors of FIG. 51, as used for self-heating a battery indicated by the dashed line box 540. In the box 540, VB indicates battery as the voltage source with an internal resistance RB to high frequency currents. The self-heating device is intended to heat the battery in a cold environment to keep it within a prescribe range of temperature, defined as an upper temperature and lower temperature limits. As was described for the circuits of FIG. 51, the battery is provided with a temperature sensor 541 that measures the battery temperature using the "temperature sensor circuit", which provided the measured temperature signal 542 to the device microcontroller. A series resonant circuit is formed by the battery internal resistance to high frequency current RB, external inductor L and capacitor C. The battery 540 powers the microcontroller and the temperature sensor circuit.

In the battery self-heating device embodiment of FIG. 52, the temperature sensor circuit generates a controller signal 542 to start and stop the self-heating cycle by comparing the measured temperature to the desired operating temperature range. When the battery is to be heated, the microcontroller initiates a toggling heating cycle by generating control signals $V_{s1}$ and $V_{s2}$ for switches S1 and S2, respectively. The switching function is achieved by using of N-MOSFETS S1 and S2, or the like. The resistors R1 and R2 are used for proper action of the N-MOSFET switches. Upon receiving a heating request from the temperature sensor circuit, that is, when the measured temperature falls below the set threshold, the microcontroller sends a control signal $V_{S1}$ to turn on (close) switch S1 and a control signal $V_{S2}$ to turn off (open) switch S2. With this configuration of switches the battery 540 and the series combination of RB, L and C members forms a series resonant circuit under a forced response, operating in the under-damped regime. The flow of high frequency sinusoidal current through the series RB, L and C resonant circuit, in particular, through the internal resistance RB, results in generation of heat within the battery core as was described for high frequency battery heating embodiments, thereby causing the battery core temperature to rise. Once the capacitor C is charged close to the voltage of the battery VB, the switch S2 is closed and switch S1 is opened. The charges collected in the capacitor C1 are discharged to the ground and the heating cycles repeated. Then as the battery core temperature increases to the set upper temperature limit for the battery, the temperature sensor circuit sends a control signal 542 to the microcontroller to stop the heating cycle. In summary, the self-heating cycle comprises of a series of controlled switching (toggling) cycles with switch S1 closed and switch S2 open during the resonant charging of the capacitor C and a rapid discharge of the capacitor C by closing switch S2 momentarily and opening switch S1. The switching sequence is repeated until the battery core reaches the prescribed temperature, usually at or close to the prescribed upper temperature limit.

The heating efficiency η of the self-heating device circuit of FIG. 52 is given by the ratio of the effective battery resistance RB at the (high frequency) resonance frequency (loop "A" in FIG. 50) to the total resistance of the circuit (not shown in FIGS. 50-52), that is, $$\eta = \frac{RB}{RB + R_L + R_C + R_W} = 1 - \frac{R_{cir}}{R_{tot}}$$

where $R_{bat}$, $R_L$, $R_C$ and $R_w$, are the series resistances of the battery, inductor, capacitor and all connecting wires, respectively, at the resonance frequency, the total of which is the circuit resistance $R_{cir}$. The total circuit resistance $R_{cir}$ can be estimated from the component data sheets and the total resistance ($R_{tot}=R_{cir}+R_{bat}$) can be determined from the measured values of the current flowing through the battery and the voltage across the battery. Through careful selection of the reactive components, the circuit heating efficiency can be made arbitrarily high by insuring that $R_{cir} \ll R_{tot}$. The additional loss due to the discharging of the capacitor C is generally low and around 5-10 percent of the total energy.

As an example, the heating efficiency of the self-heating device embodiment of FIG. 52 was used on a Lithium ion cell (Model LGABB418650), as placed in an environmental chamber that was set to lower its temperature from 20° C. to −40° C. The battery was wrapped in a 1 mm thick thermal battery insulation layer. The temperature of the battery was set to be maintained between 20° C. and 25° C.

In the self-heating device embodiment of FIG. 52, a switching frequency of 2 kHz was used for the switch S2, with a discharge pulse width of 100 μs. The instantaneous voltage and current measurements were used to estimate the total resistance of the circuit during the heating cycle. In this example, the resistances are $R_L$=7 mΩ, and $R_C$=4 mΩ, and a peak value of resistance $R_{tot}$=169 mΩ was calculated using the RMS values of the voltage and current waveforms. These parameters give a circuit heating efficiency of 93%, which includes the capacitor discharge loss.

At the end of each 500 μs (2 kHz) resonance heating cycle, the stored energy in the capacitor is dissipated through a short circuit over 100 μs. In the above test example, the stored energy in the capacitor, after 400 μs of heating, was 0.68 mJ. During the heating time the battery supplied a total of 34.8 mJ. That means ~2% of the supplied energy is stored in the capacitor at the end of heating pulse.

Figure 53:
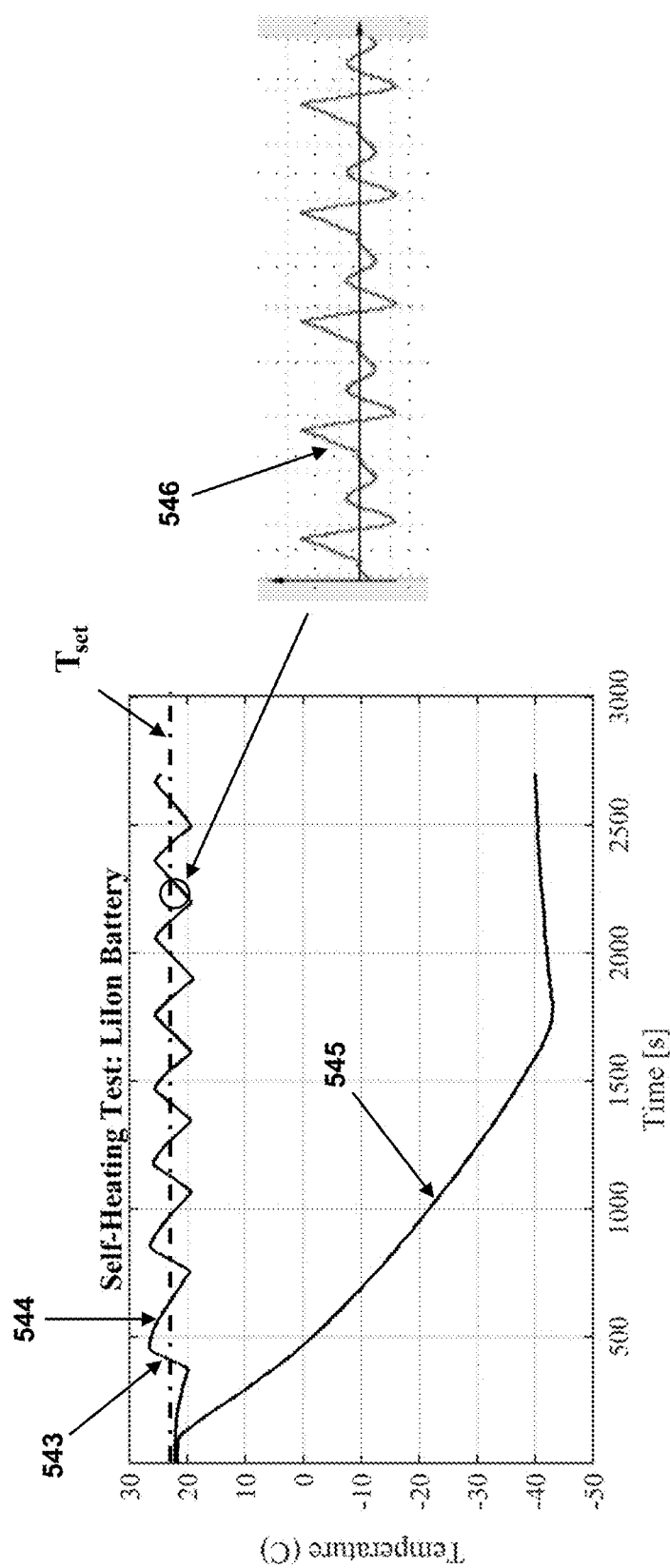
FIG. 53 illustrates the plots of an example of the battery and environmental temperatures during self-heating of a battery with the self-heating device embodiment of FIG. 52.

FIG. 53 shows the plot of the temperature of the environmental chamber 545 as a function of time within which the battery of this example was placed. The set battery temperature $T_{set}$ is shown with the dash and dot line. The measure temperature of the battery during the self-heating portion 543 and cooling portion 544 (when the self-heating device if turned off) are also shown. The plot 546 is the oscilloscope picture of the actual measured high frequency current that is passed through the battery, i.e., the battery high frequency resistance to current RB, that heats the battery core.

In the self-heating device embodiments of FIGS. 50-52, the energy stored in the capacitor C is lost, thereby reducing the aforementioned circuit heating efficiency from 93% to around 91%. The electrical energy stored in the capacitor C may however be used to supplement the heating of the battery, particularly for most Li-ion or Li-polymer or the like batteries in which most batteries are packed with several cells that are connected in series or in parallel or their combination to obtain the desired battery voltage or operating current. It is appreciated by those skilled in the art that in such batteries, temperature sensors are positioned between the battery packs to measure the battery temperatures for thermal control purposes or for battery heating using one of the disclosed embodiments of the present invention, including the self-heating device embodiment of FIGS. 50-52.

Figure 54:
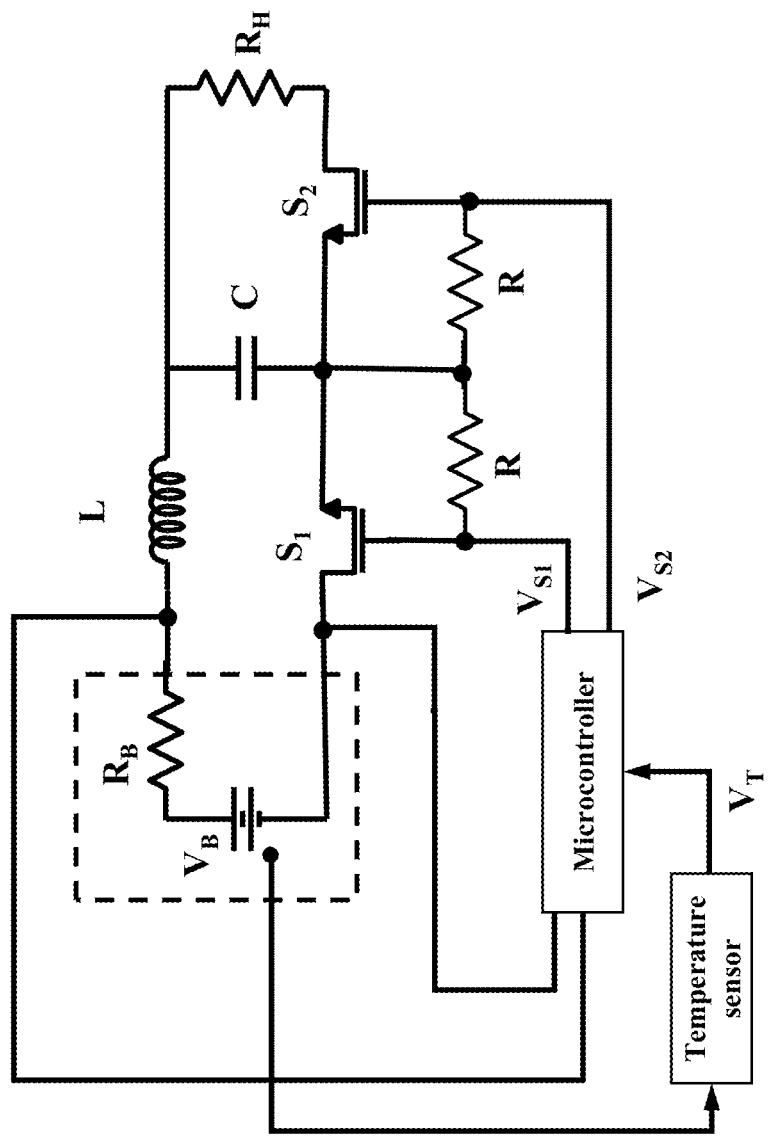
FIG. 54 illustrates the circuit diagram of the high efficiency self-heating device embodiment of FIG. 52 with the added heating resistor to increase the overall heating efficiency of the self-heating system.

It is appreciated that since battery cells in a battery pack are never exactly identical, therefore they generally have to be individually (or in pairs or in certain configuration) monitored for thermal control purposes as well as for heating using one of the disclosed embodiments of the present invention, including the self-heating device embodiment of FIGS. 50-52. For this reason, the charges stored in the capacitor C, may be dissipated in a provided resistor $R_H$ as shown in FIG. 54 once the switch S2 is closed. The circuit of FIG. 54 is identical to that of FIG. 52 except for the addition of the resistor $R_H$ and operates the same as the embodiment of FIG. 52 as was previously described, with only difference being that instead of the electrical energy stored in the capacitor C during each cycle of battery heating being wasted, it is used to heat the resistor $R_H$, which is positioned between battery cells of a battery pack. Thereby, the generated heat is used to heat the battery (even though from its outside shell). It is appreciated that in general thin and flat resistors (similar in thickness to the temperature sensors being used) are preferred to be used for the resistor $R_H$ so that the total battery pack volume is not increased.

In the above self-heating device embodiments of the present invention, the high frequency heating current that is applied to the battery is generated by the described switching circuits that are powered by the battery power. In the following embodiments of the present invention, a novel method is described that can be used to design self-heating devices for almost all batteries, such as Li-ion, Li-polymer, Lead acid, NiMH, and other primary and rechargeable batteries. The resulting self-heating devices are simpler in design, have significantly fewer components, and highly efficient in performing the battery core heating with minimal electrical energy loss.

Figure 55:
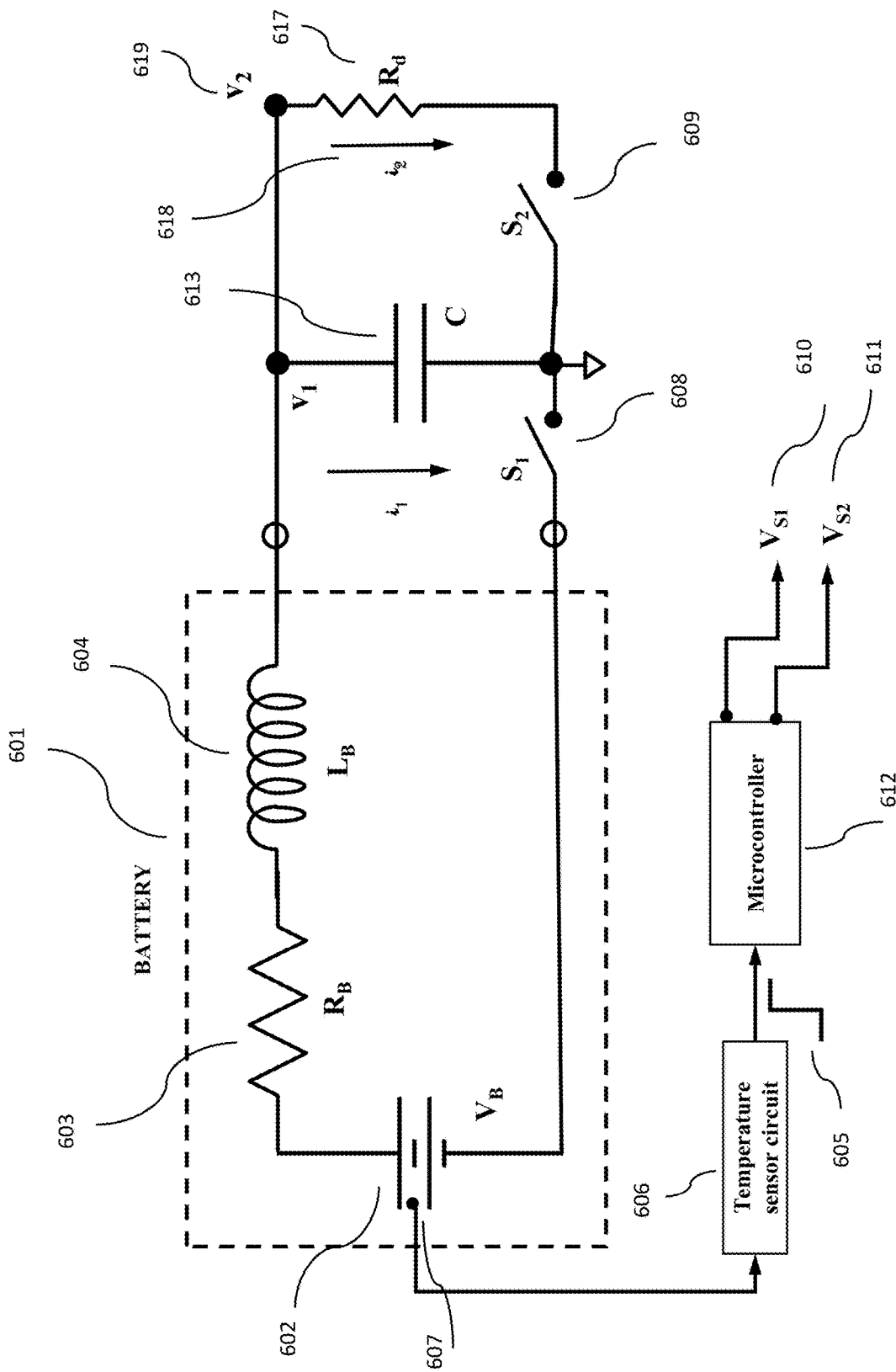
FIG. 55 illustrates a circuit diagram for another high efficiency self-heating device embodiment of the present invention.

FIG. 55 shows the circuit schematic of such a self-heating device, which is significantly simpler in design and is constructed with fewer components. The self-heating device is designed to maintain the battery core operational temperature close to a prescribed temperature in cold temperature environments using the battery power. In the circuit schematic of FIG. 54, the battery 601 (as shown inside the rectangle with dashed lines) is modeled as an ideal voltage source 602, with an open circuit voltage $V_B$, an internal resistance 603 ($R_B$) and an internal inductance 604 ($L_B$). The self-heating circuit is initiated by a control signal 605, which is generated by a temperature sensor circuit 606 when the reading of the temperature sensor 607 is below the set operational temperature.

The heating circuit is disabled when the measured temperature is above the set operational temperature. The illustrated self-heating circuit has three operational phases, which are described with references to FIGS. 55 to 59. The signal 605 initiates the execution of a programmed sequence of timing waveforms which control the operation of electronic switches 608 ($S_1$) and 609 ($S_2$). The signal 610 controls the opening and closing of the electronic switch 608 and the signal 611 controls the opening of the electronic switch 609. Correct timing of these control signals is essential for proper operation of the battery self-heating system. The microcontroller 612 processes the heat ON/OFF signal 605 to generate the timing waveforms for the electronic switches 608 and 609. The self-heating system is designed to operate autonomously, without requiring any external power source or external control signals. Further, the self-heating system can provide heating to the battery while it is mounted in the vehicle and when the vehicle engine and/or other electrical and electronics are on.

The self-heating circuit of FIG. 54 generates heat in the core of the battery through the high-frequency oscillatory current following through the forced series resonance circuit formed by the battery voltage source 602, the internal resistance 603 ($R_B$), the internal inductance 604 ($L_B$) and an external capacitor 613 (C). At the start of the heating cycle switch 608 is open and switch 609 is momentarily closed to discharge the capacitor 613. The heating phase is initiated by opening switch 609 and closing switch 608. The resonant heating described below continues until the capacitor 613 is charged to the battery open-circuit voltage, at which point the current $i_1$ goes to zero and the heating stops.

Figure 56:
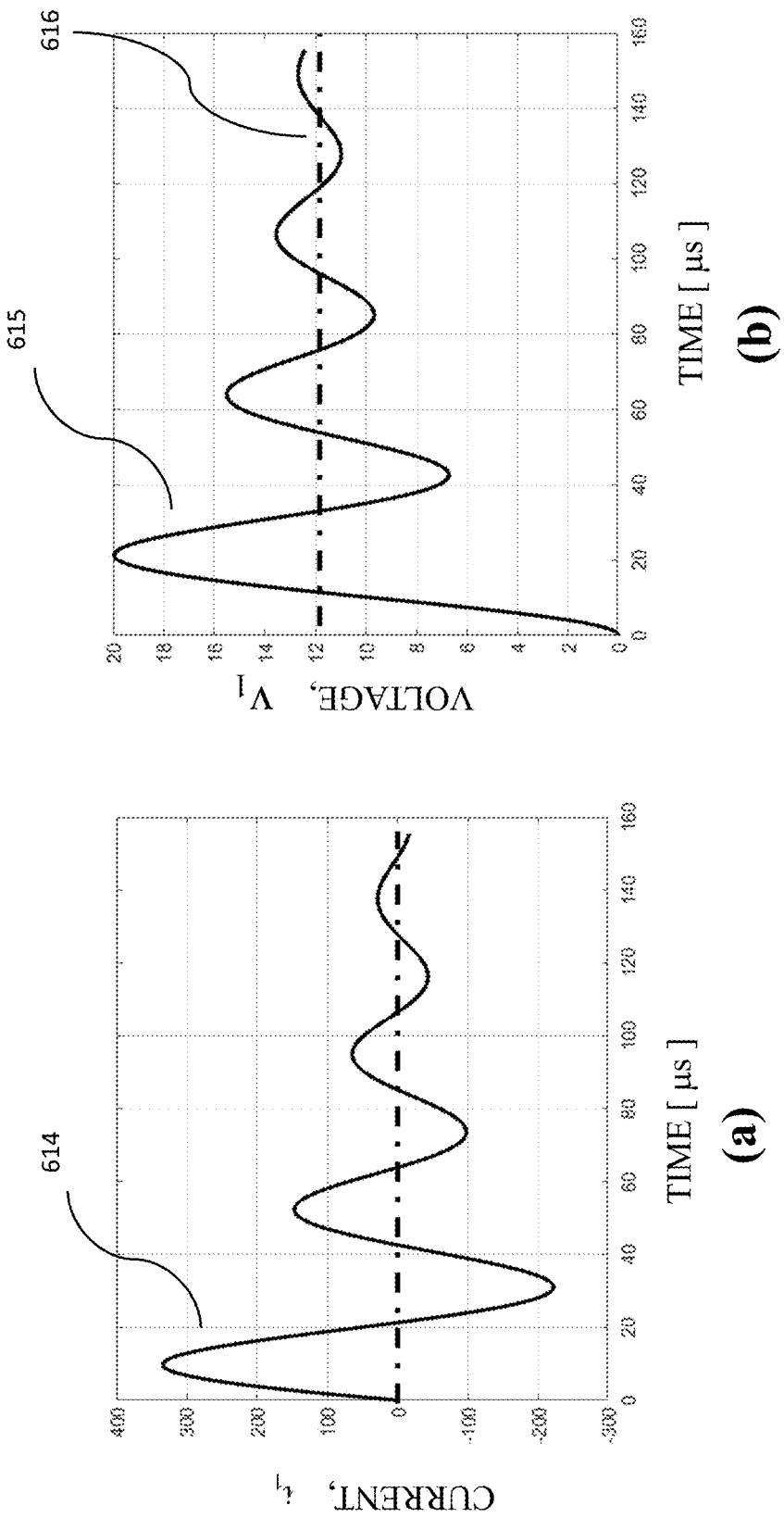
FIG. 56 illustrates plots of typical current and voltage waveforms in the in series resonant circuit of the self-heating circuit of FIG. 55 during one cycle of self-heating.

The duration of the heating time is determined by the component values. For example, the plot (a) in FIG. 56 shows the expected current waveform 614 flowing through the series resonant circuit, and plot (b) in FIG. 56 shows the voltage waveform 615. These plots are generated for a 12 V lead-acid battery with $R_B$=2 m$\Omega$, $L_B$=7 mH and C=226 µF. After a few oscillations, the current ($i_1$) goes to zero indicating the capacitor has been fully charged to the voltage level 616, corresponding to the open circuit voltage of the battery.

Referring to FIG. 55, it is appreciated that continued heating of the battery requires discharging of the capacitor 613 which can be achieved by opening switch 608 and closing switch 609 through a resistive shunt 617 ($R_d$). However, this method of removing stored energy from the capacitor 613 is wasteful and accounts for around 50% of the battery energy being to be dissipate as heat into the environment. A relatively small portion of the stored electrical energy in the capacitor 613 can be recovered by mounting the shunt resistor 617 to the body of the battery for heat transfer through the case to the core region. However, a significant portion of the stored electrical energy in the capacitor 613 can be used to generate another battery heating cycle after each of the above heating cycles using the method and circuit design described for the following embodiment of the present invention shown in FIG. 57.

Figure 57:
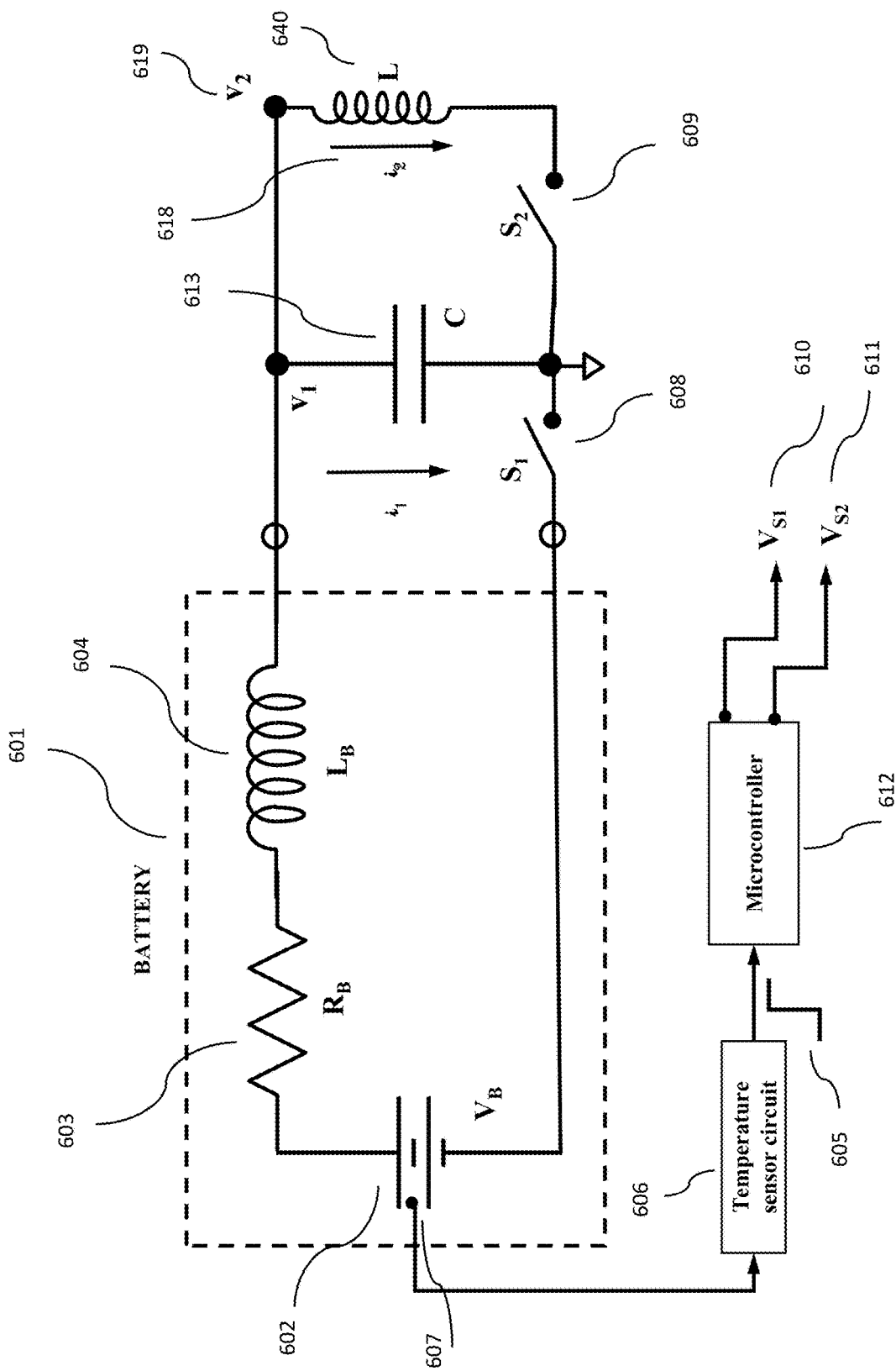
FIG. 57 illustrates circuit diagram for a higher efficiency self-heating device embodiment of the present invention resulting from modification of the embodiment of FIG. 55 and its process of operation.

The battery self-heating circuit embodiment of FIG. 57 is identical to the battery self-heating circuit embodiment of FIG. 55, except for the resistor 617 ($R_d$) having been replaced with the inductor 640 (L). The battery self-heating circuit embodiment of FIG. 57 also operates at significantly higher efficiency, i.e., with a significantly larger portion of the battery power being used by the self-heating circuit to heat the battery core as described below.

With reference to FIG. 57, the battery self-heating circuit operates as was described for the embodiment of FIG. 55 up to the point at which the capacitor 613 (C) is charged essentially to the battery voltage level $V_B$ following closing of the switch 608 ($S_1$) while the switch 609 ($S_2$) is closed. In the embodiment of FIG. 57, the stored electrical energy in the capacitor 613 (C) is then recovered by means of a tank circuit which is formed by an inductor 640 (L) and the capacitor 613 (C) by closing switch 609 and opening switch 608.

Figure 58:
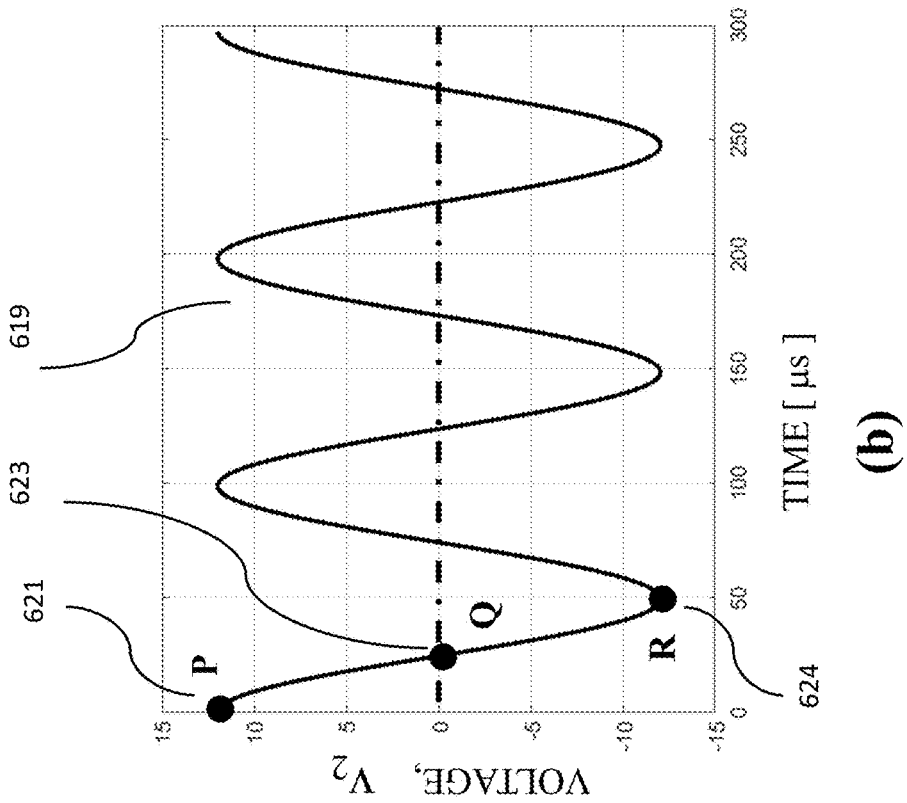
FIG. 58 illustrates plots of typical current and voltage waveforms in the resonant circuit of the self-heating circuit of FIG. 57.
Figure 58:
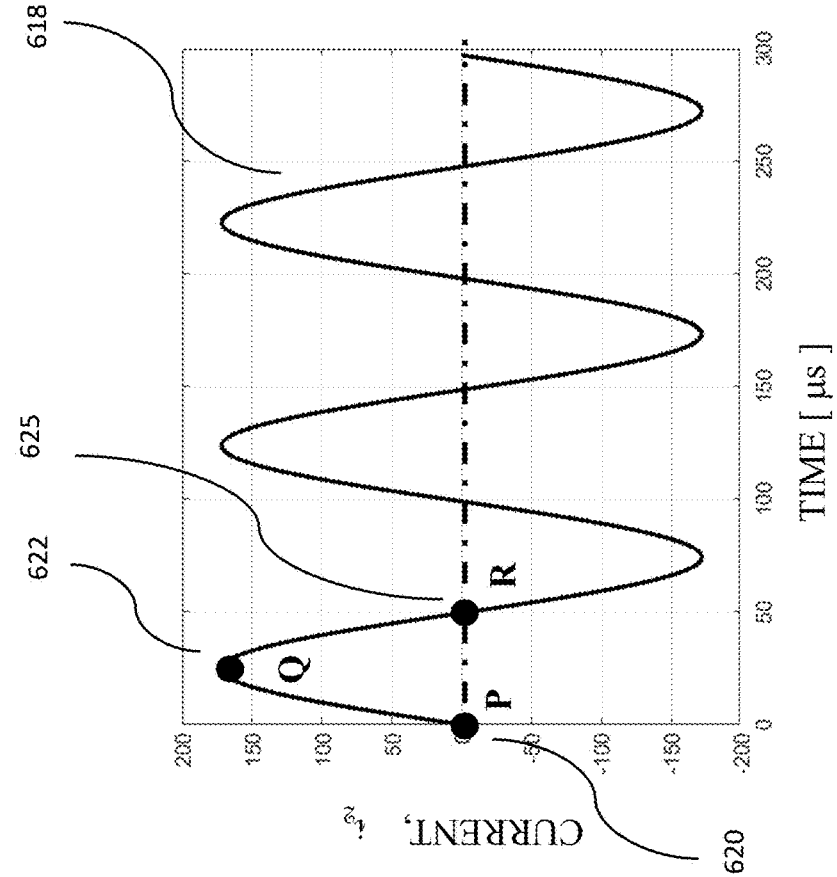

In the case of an ideal capacitor and inductor, once the switch 609 ($S_2$) is closed, the energy stored in the capacitor 613 (C) oscillates between the said capacitor and inductor, FIG. 57. FIG. 58 (a) shows the plot of the current waveform 618 ($i_2$) flowing through the LC tank circuit and FIG. 58 (b) shows the plot of the inductor voltage waveform 619 ($v_2$). With reference to FIG. 58 (a), the time location 620 (P) indicates the fully charged state of the capacitor 613 (C), with current $i_2$=0 and the maximum value of voltage $v_2$ at point 621 (P) in FIG. 58 (b). The current 618 ($i_2$) increases as the voltage 619 drops from its maximum value at 621 (P), FIG. 58 (b). The maximum current point 622 (Q) indicates that all energy from the capacitor 613 (C) has been transferred to the inductor 640 (L). At this point 622 (Q), the inductor voltage 623 is zero. At this time mark (622 and 623 in FIGS. 58 (a) and (b), respectively), the capacitor energy has been transferred to the inductor 640 (L), FIG. 57. Subsequently, the energy in the inductor is pumped back to the capacitor until the point R (time mark 625 and 624 in FIGS. 58 (a) and (b), respectively). However, it should be noted that the voltage across the capacitor has gone through polarity reversal. At the start of the cycle, the voltage point 621 (P) is positive and at point 624 (R), the polarity is negative. The stored electrical energy has been returned to the capacitor by a resonant transfer. This polarity reversal allows the stored electrical energy in the capacitor to be returned to the battery, for use in the next heating cycle.

Figure 59:
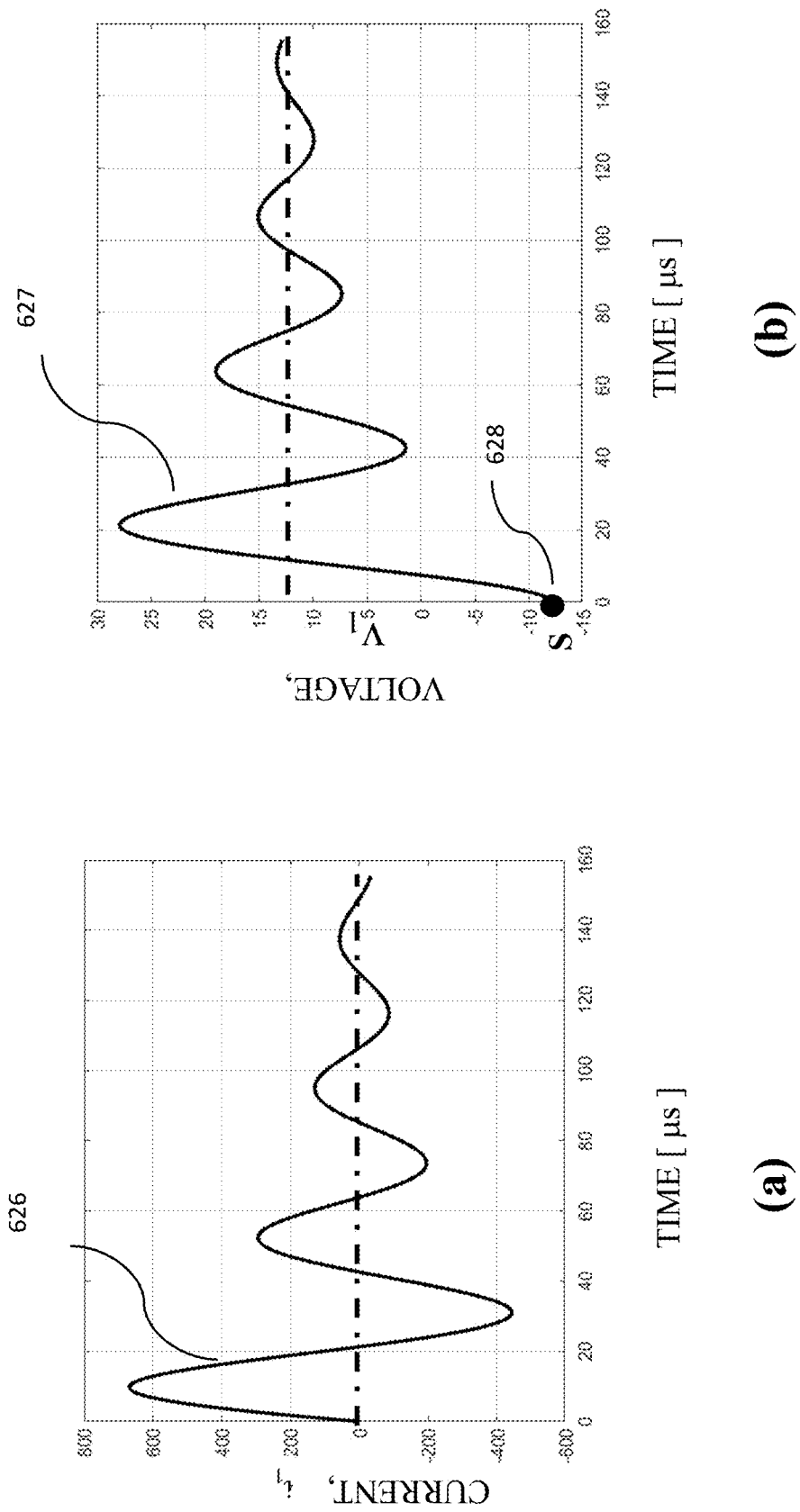
FIG. 59 illustrates plots of typical current and voltage waveforms in the resonant circuit of the self-heating circuit of FIG. 57 from the stored energy in the circuit capacitor.

Referring to FIG. 58, at the time mark (R), the switch 609 is opened and switch 608 is closed, FIG. 57, to initiate a second heating cycle as illustrated in FIG. 59. These current 626 and voltage 627 waveforms resemble those in FIG. 56, with the exception that current and voltage peaks have increased substantially. The point 628 (S) indicates the polarity reversal of the voltage across the capacitor. The battery heating cycle of FIG. 56 is then followed by the battery heating cycle of FIG. 59 until the control signal to stop heating is received from the temperature sensor control circuit 606, FIG. 57.

Figure 60:
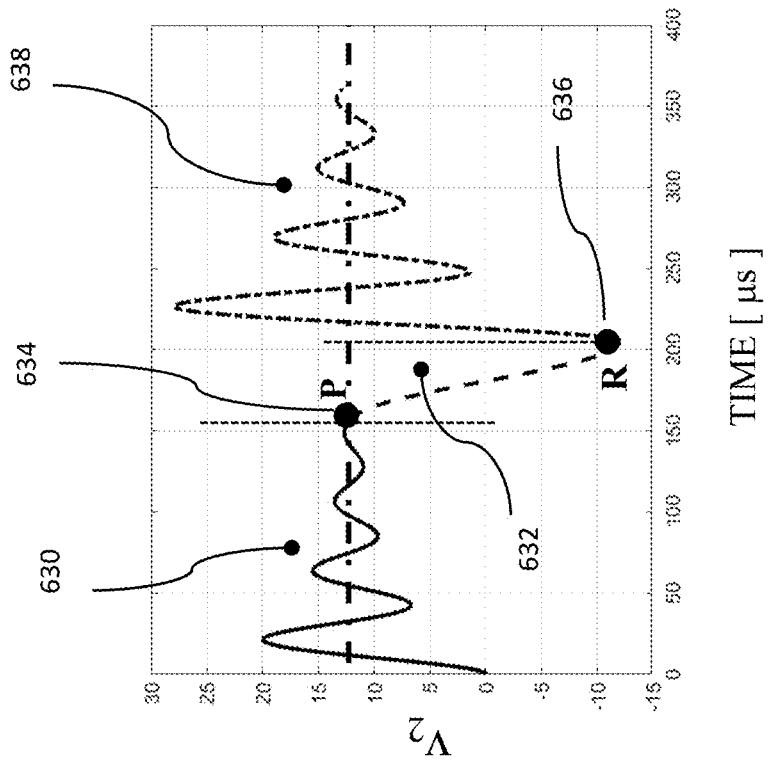
FIG. 60 illustrates plots of typical current and voltage waveforms in the resonant circuit of the self-heating circuit of FIG. 57 for its full cycle of high efficiency battery heating.
Figure 60:
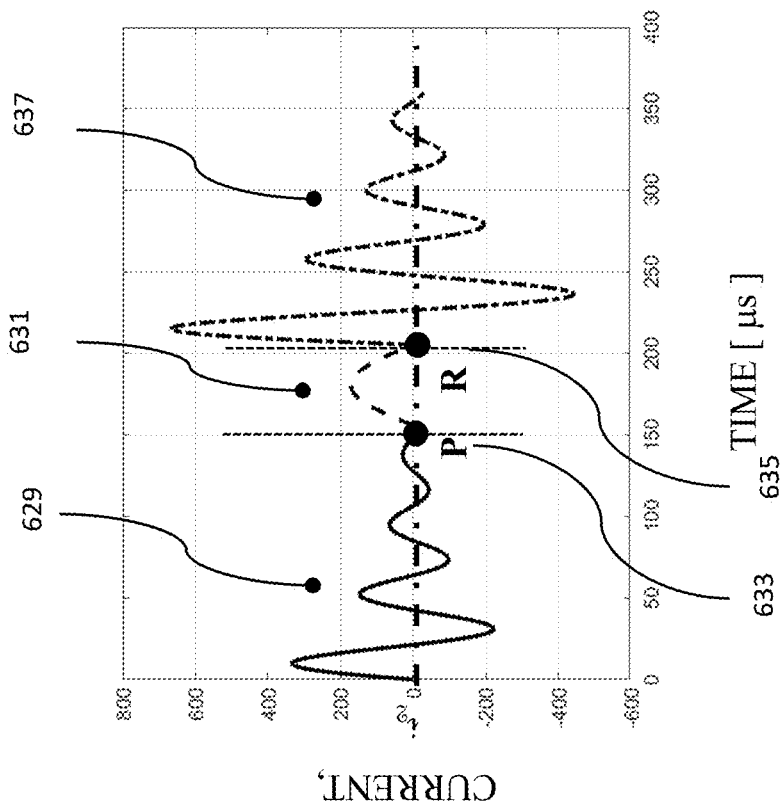

FIG. 60 illustrates the composite current and voltage waveforms during both phases of a full cycle of battery heating, i.e., the initial cycle of heating while the capacitor 613 (C), FIG. 57, is charged and then as the stored electrical energy in the capacitor is used to heat the battery core as described above. During the first phase 629 and 630 (FIGS. 60 (*a*) and (*b*), respectively) the capacitor 613 (C) has no initial energy and the voltage and current waveforms have lower peak values. The energy transfer phase 631 and 632 (FIGS. 60 (*a*) and (*b*), respectively) requires accurate timing requests at the points 633 and 634 (FIGS. 60 (*a*) and (*b*), respectively), and at points 635 and 636 (FIGS. 60 (*a*) and (*b*), respectively). The second heating resonance phase 637 and 638 (FIGS. 60 (*a*) and (*b*), respectively) have a higher peak current and voltage. However, all subsequent heating cycles will be identical.

It is appreciated by those skilled in the art that the switches 608 and 609, FIGS. 55 and 57, are electronic, voltage controlled single throw switches, for example, N-MOSFETs. As a practical matter of increasing heating efficiency, it is important to select components with low series resistance, typically less than 1 mW. Lower resistance values are achievable by using multiple switches in a parallel configuration.

It is appreciated by those skilled in the art that the internal resistance and inductance of a battery usually varies with temperature and even from one battery in a set of identical batteries to another in a batch. For this reason, the self-heating may be provided with a microprocessor with various battery parameters and the means of measuring the battery parameters as it is connected to a battery and vary the device settings as described above for the embodiments of FIGS. 55 and 57 to ensure proper battery self-heating process. As an example, the block diagram of such an addition to the above self-heating methods and examples of their device embodiments is provided in FIG. 61.

Figure 61:
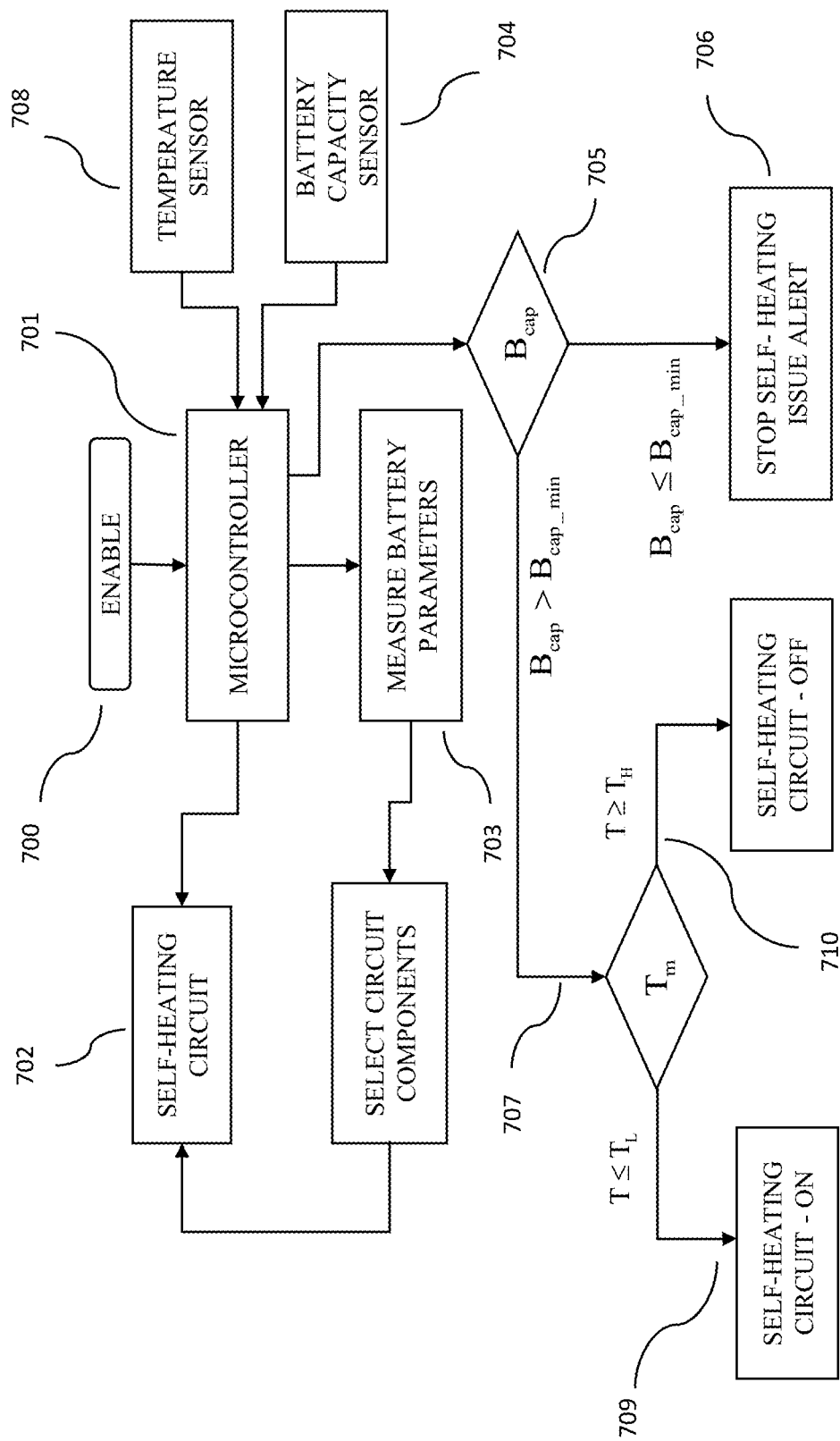
FIG. 61 illustrates the operational flow chart for the self-heating embodiments of FIGS. 55 and 57 with automatic circuit parameter adjustment capability.

FIG. 61 illustrates the operational flow chart for the self-heating embodiment of FIG. 57 (it similarly applies to the embodiment of FIG. 55). The first step 700 enables self-heating circuit. The enable function may be a physical toggle switch or a digital signal applied directly to the microcontroller 701. The microcontroller 701 starts the self-heating circuit 702 (the embodiment of FIG. 57 of 55) for a brief moment, sufficient to capture the previously described voltage and current waveforms driving the battery heating. With reference to FIG. 55 (or 57) and FIG. 56, the current 614 and voltage 615 waveforms are captured and compared with data held in the microcontroller memory to determine the battery parameters, such as, the series resistance 603 and inductance 604 of the battery. These together with the capacitor 113, determine the optimal current waveform 114 for efficient self-heating. The capacitor 613 typically comprises of a multiplicity of parallel capacitors, which when combined add to give the desired capacitor value. In order to accommodate the variation between different batteries, even if they belong to the same family, for example, Type 31 truck battery, each of the shunting capacitors in the multiplicity of parallel capacitors is supplied with its own electronic toggle switch which can be enabled by control signals from the microcontroller 701. With this switching capability, the measured battery parameters 703 are used to enable the correct number of capacitors to give the desired net capacitance value for capacitor 613.

In a similar manner, as described above, the inductor 640, FIG. 57, which is critical to the recovery of the stored energy in the capacitor C, may also require some adjustment. For this reason, the inductor 640 may be constructed from a bank of electronically enabled shunting inductors, which can provide the desired value determined from the voltage waveform measurements performed. The correct choice of the inductor will provide matching to the critical switching point 624 defined in FIG. 58. After these circuit adjustments have been made, the self-heating circuit is ready for operation on demand.

Prior to enabling the self-heating circuit, the remaining battery capacity may also be measured by a battery capacity sensor 704. The battery capacity is measured using established methods based on conductance. If the measured battery capacity 705 is below the preset minimum value, then the circuit ceases operation and issues alert 706. Otherwise, the circuit heating flag 707 is set high enabling normal heating function, which is driven by the output of the temperature sensor 708, which is processed through the microcontroller 701. Prior to issuing the heating ON signal 609, the microcontroller performs the battery capacity test. The circuit continues to heat until the measured temperature exceeds the set point. The heating OFF signal 710 ceases heating operation. The above described self-heating circuit maintains the battery core temperature at the desired temperature and ceases functioning, either if the battery capacity falls below the set value or the enable function at the start of the battery heating operation is toggled into the OFF position.

While there has been shown and described what is considered to be preferred embodiments of the invention, it will, of course, be understood that various modifications and changes in form or detail could readily be made without departing from the spirit of the invention. It is therefore intended that the invention be not limited to the exact forms described and illustrated, but should be constructed to cover all modifications that may fall within the scope of the appended claims.

What is claimed is:

1. A heating circuit for generating heat when coupled to an energy storage device having a core with an electrolyte, the energy storage device having inputs and internal surface capacitance between the inputs which can store electric field energy between internal electrodes of the energy storage device that are coupled to the inputs, with one of the internal electrodes coupled to a first of the inputs having characteristics of a series coupled resistor and inductor to a voltage source, the heating circuit comprising:
   at least one power source couplable to the first of the inputs of the energy storage device, wherein the at least one power source is configured to provide a positive input current and a negative input current at the first of the inputs when coupled to the first of the inputs, wherein the positive input current flows in to the first of the inputs and the negative input current flows out of the first of the inputs;

a controller comprising hardware, the controller being configured to control the at least one power source to provide alternating current between the positive input current and the negative input current, wherein the controller is configured to control the at least one power source to provide the alternating positive and negative input currents at a frequency sufficient to effectively short the internal surface capacitance of the energy storage device to generate heat and raise a temperature of the electrolyte, wherein the heating circuit comprises a first switch and a second switch, and the at least one power source comprises a component configured to be charged by the energy storage device through the resistor and the inductor of the energy storage device, through operation of the switch, wherein the inductor and the component are configured to operate as a series resonant circuit with the voltage source through operation of the switch, wherein the controller is configured to control the first switch to start and discontinue heating of the electrolyte, wherein the second switch is configured to initiate discharging of the component, wherein the controller is configured to control the second switch to start and discontinue discharging of the component, wherein the controller is configured to close the first switch to capture information indicating voltage and current waveforms of the energy storage device, wherein the controller is configured to determine from the captured information at least one of a resistance of the resistor and an inductance of the inductor, and wherein at least one of;
the controller is configured adjust a capacitance of the component based on the determined at least one of the resistance and the inductance, and
wherein the inductor of the energy storage device is a first inductor, the heating circuit comprising a second inductor coupled between the second switch and the component, wherein when the second switch is coupled to control the discharge of the component with the discharge transferring a charge to the second inductor, and wherein the controller is configured to adjust an inductance of the second inductor based on the determined at least one of the resistance and the inductance of the first inductor.

2. The heating circuit of claim 1, wherein the controller is configured to control the at least one power source to discontinue the alternating positive and negative input currents when the temperature of the electrolyte and/or the energy storage device is within an operational temperature range of the energy storage device.

3. The heating circuit of claim 1, wherein the controller is configured to start the at least one power source to provide the alternating positive and negative input currents at the first of the inputs when the temperature of the electrolyte and/or the energy storage device is lower than an operational temperature range of the energy storage device.

4. The heating circuit of claim 1, comprising a temperature sensor configured to provide a signal to the controller, wherein the signal is based on a sensed temperature of the electrolyte and/or a surface of the energy storage device, and wherein the controller is configured to start and stop the at least one power source to provide the alternating positive and negative input currents at the first of the inputs in response to the signal.

5. The heating circuit of claim 1, wherein the controller is configured to control the first switch to discontinue charging of the component after the component is charged to a potential of the voltage source and is thereafter configured to control the second switch to start discharging of the component.

6. The heating circuit of claim 1, wherein the resistor of the energy storage device is a first resistor, the heating circuit comprising a second resistor coupled between the second switch and the component, and wherein the heating circuit is configured such that when the second switch is controlled to start discharging of the component, the discharging occurs through the second resistor.

7. The heating circuit of claim 6, wherein the second resistor is configured to be positioned in proximity to the energy storage device such that heat generated by the second resistor during discharging of the component through the second resistor heats the energy storage device.

8. The heating circuit of claim 1, wherein the controller is configured to close the second switch to control the discharge of the component and is configured to open the second switch after the charge from the component has been transferred to the second inductor and the charge from the second inductor has been transferred back to the component by a resonant transfer.

9. The heating circuit of claim 1, comprising a capacity sensor configured to provide an indication of a capacity of the energy storage device, wherein the controller is configured to enable and disable heating based on the indication of the capacity.

10. The heating circuit of claim 9, wherein, when heating is enabled, the controller is configured to start the at least one power source to provide the alternating positive and negative input currents at the first of the inputs in response to a predetermined temperature that is lower than an operational temperature range of the energy storage device.

11. The heating circuit of claim 1, wherein the first switch is formed from a first plurality of parallel connected field-effect transistors (FETs) and the second switch is formed from a second plurality of parallel connected FETs, coupled to the component, and wherein the first plurality of FETs are of a first type of FET and the second plurality of FETs are of a second type of FET that is different from the first type of FET.

12. A heating circuit for generating heat when coupled to an energy storage device having a core with an electrolyte, the energy storage device having inputs and internal surface capacitance between the inputs which can store electric field energy between internal electrodes of the energy storage device that are coupled to the inputs, with one of the internal electrodes coupled to a first input of the inputs having characteristics of a series coupled resistor and first inductor to a voltage source, the heating circuit comprising:

at least one power source couplable to the first input of the inputs of the energy storage device, wherein the at least one power source is configured to provide a positive input current and a negative input current at the first of the inputs when coupled to the first of the inputs, wherein the positive input current flows in to the first of the inputs and the negative input current flows out of the first of the inputs;

a controller configured to
periodically obtain a measurement that correlates to the temperature of the electrolyte, and
control the at least one power source to provide alternating positive and negative input currents at the first of the inputs at a frequency sufficient to effectively short the internal surface capacitance of the energy storage device to generate heat and raise a temperature of the electrolyte when the measurement indicates that the temperature of the electrolyte is below an operational temperature of the energy storage device;

a first switch, wherein the at least one power source comprises a component configured to be charged by the energy storage device through the resistor and the first inductor of the energy storage device, and the first switch, wherein the first inductor and the component are configured to operate as a series resonant circuit with the voltage source through operation of the first switch, and wherein the controller is configured to control the first switch to start and discontinue heating of the electrolyte;

a second switch coupled to the component, wherein the second switch is configured to initiate discharging of the component, and wherein the controller is configured to control the second switch to start and discontinue discharging of the component, wherein the controller is configured to close the first switch to capture information indicating voltage and current waveforms of the energy storage device, and wherein the controller is configured to determine from the captured information at least one of a resistance of the resistor and an inductance of the first inductor; and a second inductor coupled between the second switch and the component, wherein when the second switch is coupled to control the discharge of the component with the discharge transferring a charge to the second inductor, and wherein the controller is configured to adjust an inductance of the second inductor based on the determined at least one of the resistance and the inductance of the first inductor.

13. The heating circuit of claim 12, wherein the controller is configured discontinue the alternating positive and negative input currents when the temperature of the electrolyte and/or the energy storage device is within the operational temperature range of the energy storage device.

14. The heating circuit of claim 12, wherein the controller is configured to control discharging a chargeable component when the chargeable component is charged to a voltage of the voltage source as a result of the alternating positive and negative input currents.

15. A heating circuit for generating heat when coupled to an energy storage device having a core with an electrolyte, the energy storage device having inputs and internal surface capacitance between the inputs which can store electric field energy between internal electrodes of the energy storage device that are coupled to the inputs, with one of the internal electrodes coupled to first input of the inputs having characteristics of a series coupled resistor and inductor to a voltage source, the heating circuit comprising:

at least one power source couplable to the first input of the inputs of the energy storage device, wherein the at least one power source is configured to provide a positive input current and a negative input current at the first of the inputs when coupled to the first of the inputs, wherein the positive input current flows in to the first of the inputs and the negative input current flows out of the first of the inputs;

a controller configured to control the at least one power source to provide alternating current between the positive input current and the negative input current at the first of the inputs at a frequency sufficient to effectively short the internal surface capacitance of the energy storage device to generate heat and raise a temperature of the electrolyte; and a switch, wherein the at least one power source comprises a component configured to be charged by the energy storage device through the resistor and the inductor of the energy storage device through operation of the switch, wherein the controller is configured to close the switch to capture information indicating voltage and current waveforms of the energy storage device, and wherein the controller is configured to determine from the captured information at least one of a resistance of the resistor and an inductance of the inductor, and wherein the controller is configured adjust a capacitance of the component based on the determined at least one of the resistance and the inductance.

* * * * *